Sept. 2, 1930. H. D. COLMAN 1,774,591
LACING MACHINE AND METHOD OF LACING SKEINS
Original Filed April 30, 1926 40 Sheets-Sheet 1
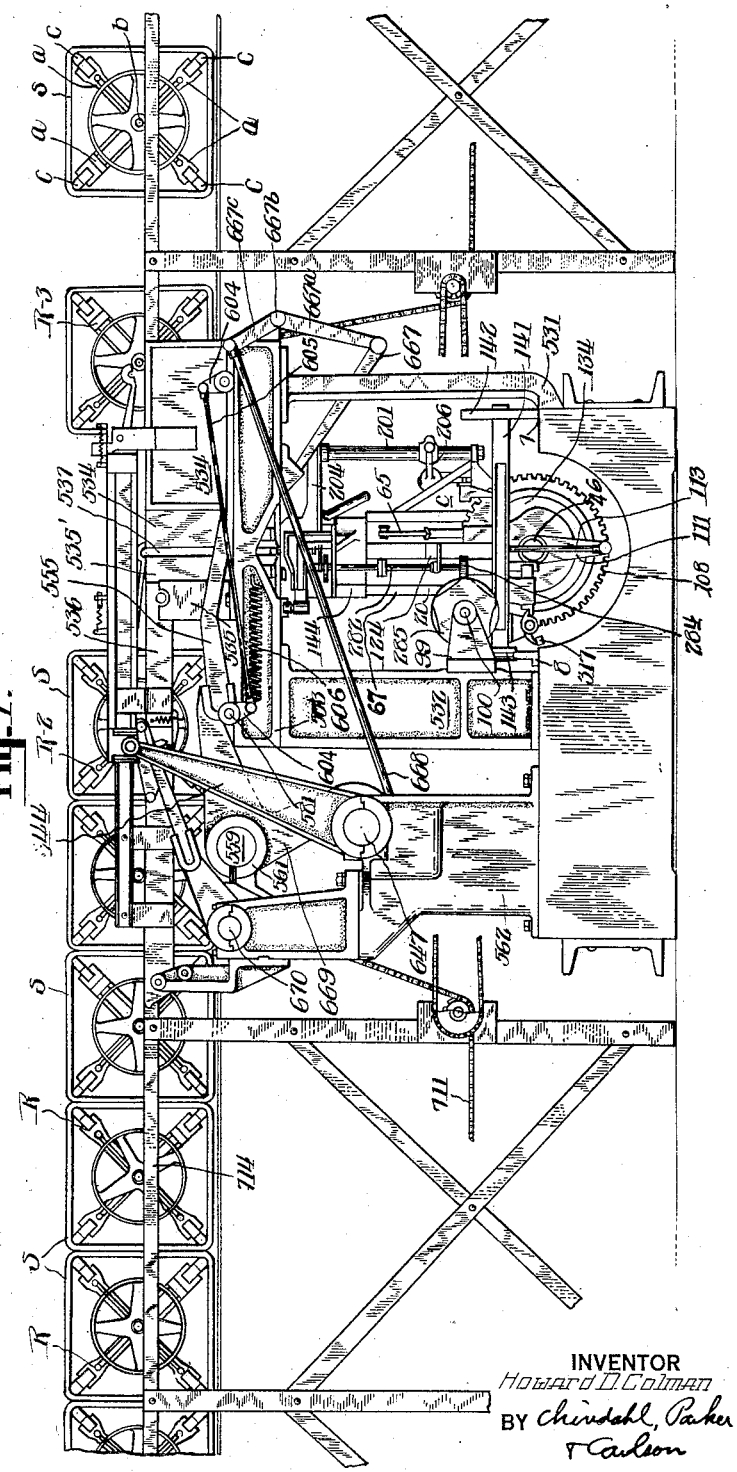
INVENTOR
Howard D. Colman
BY Chindahl, Parker
& Carlson
ATTORNEYS Sept. 2, 1930. H. D. COLMAN 1,774,591
LACING MACHINE AND METHOD OF LACING SKEINS
Original Filed April 30, 1926 40 Sheets-Sheet 2

FRONT VIEW

DIRECTION OF STEP BY
STEP MOVEMENT OF
CARRIAGE C.

INVENTOR
Howard D. Colman
BY
ATTORNEYS

Sept. 2, 1930.    H. D. COLMAN    1,774,591
LACING MACHINE AND METHOD OF LACING SKEINS
Original Filed April 30, 1926    40 Sheets-Sheet 3
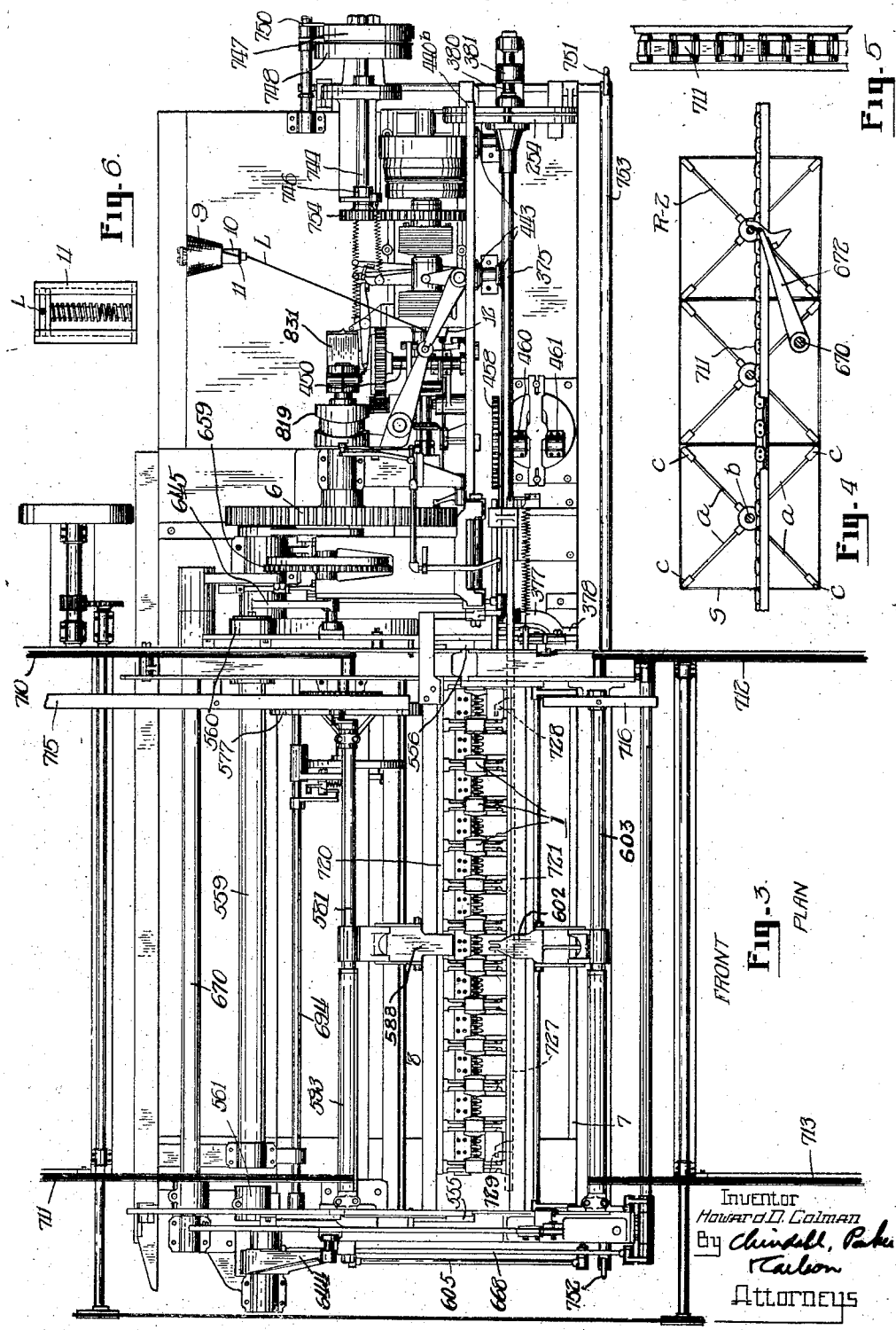

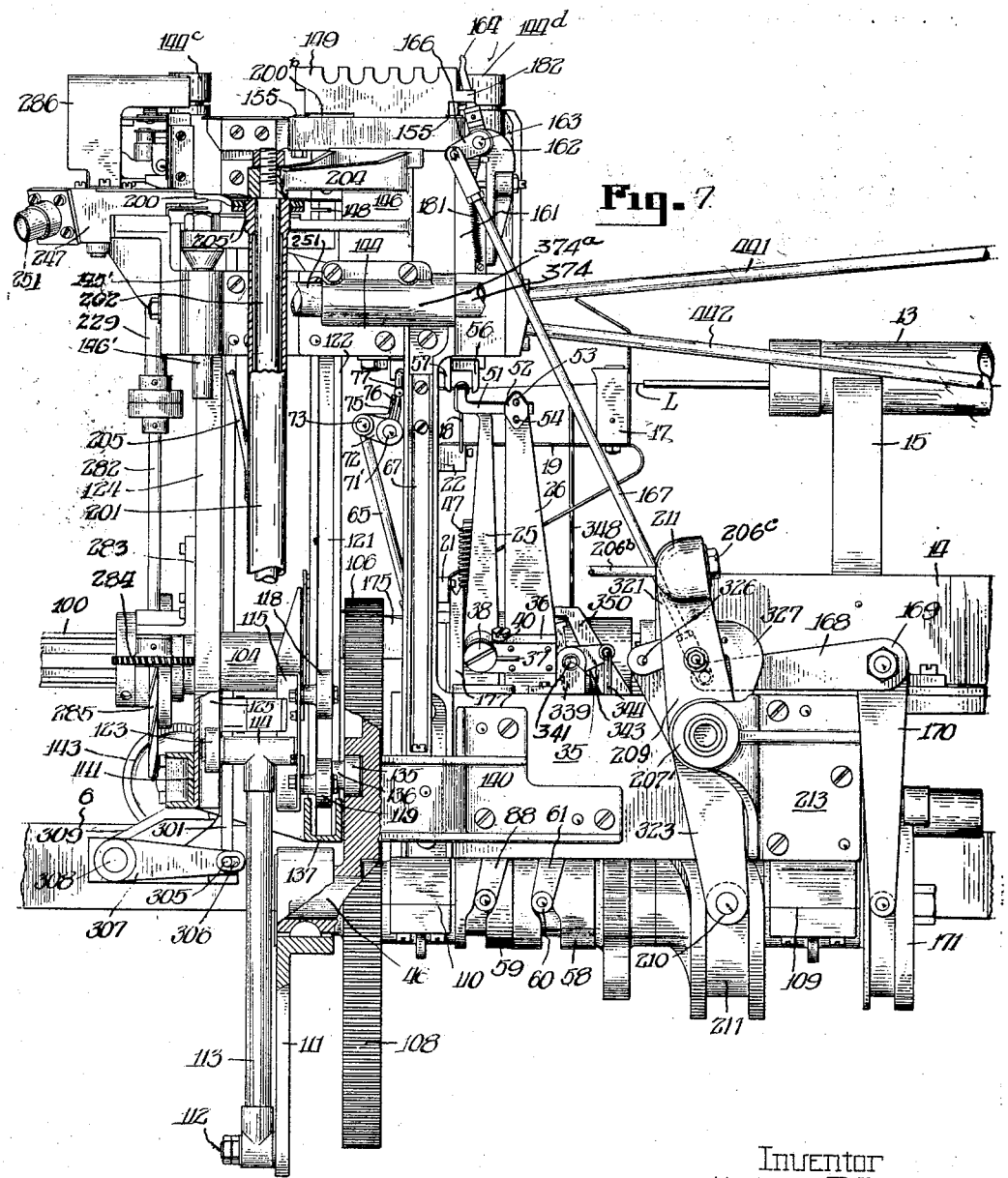

Sept. 2, 1930.  H. D. COLMAN  1,774,591
LACING MACHINE AND METHOD OF LACING SKEINS
Original Filed April 30, 1926  40 Sheets-Sheet 6

REAR VIEW.

Inventor
Howard D. Colman
By Churchill, Parker
Carlson
Attorneys

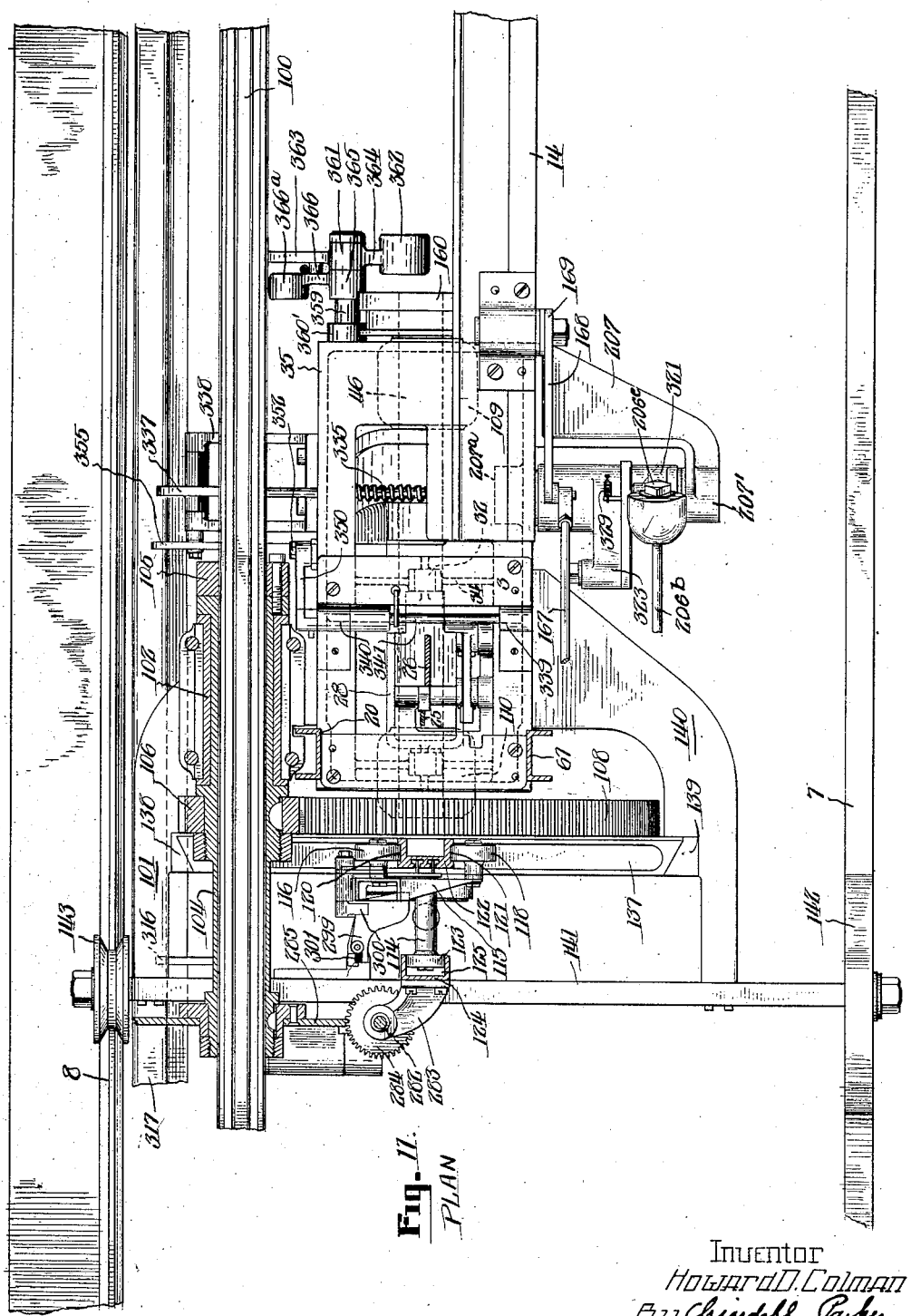

Sept. 2, 1930.                H. D. COLMAN                1,774,591
               LACING MACHINE AND METHOD OF LACING SKEINS
                    Original Filed April 30, 1926    40 Sheets-Sheet 8
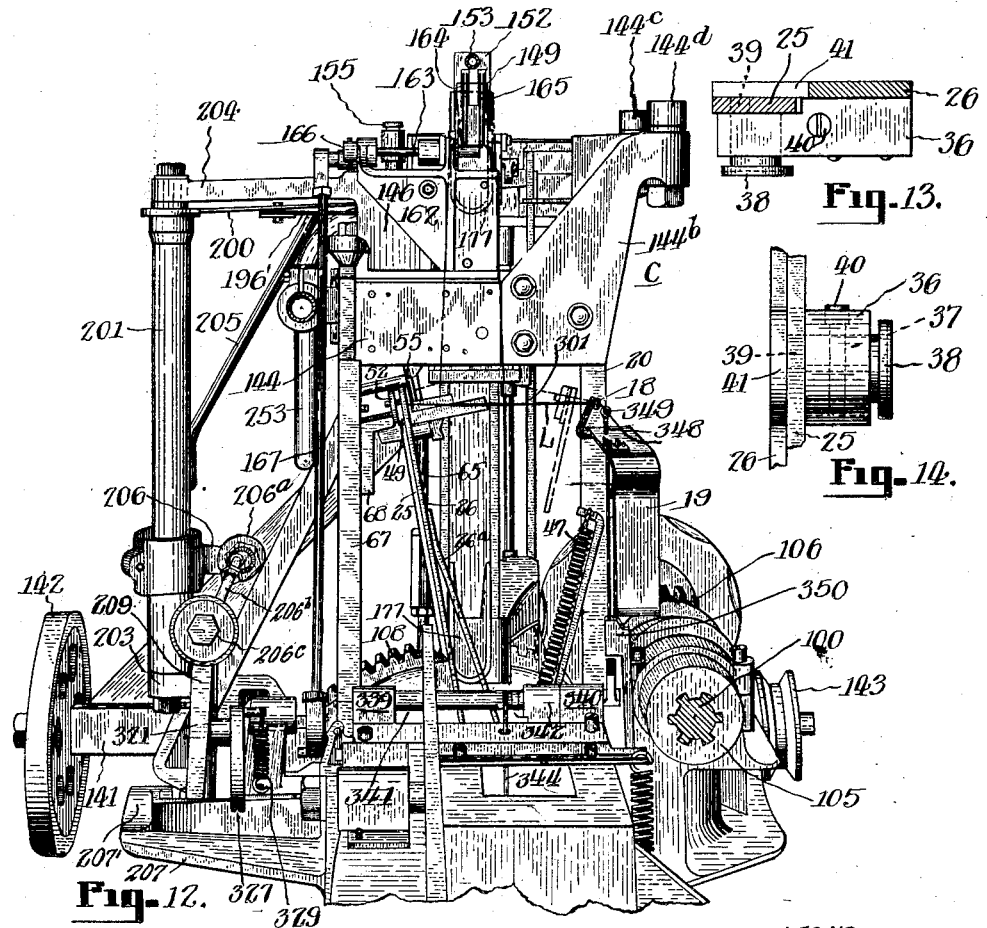
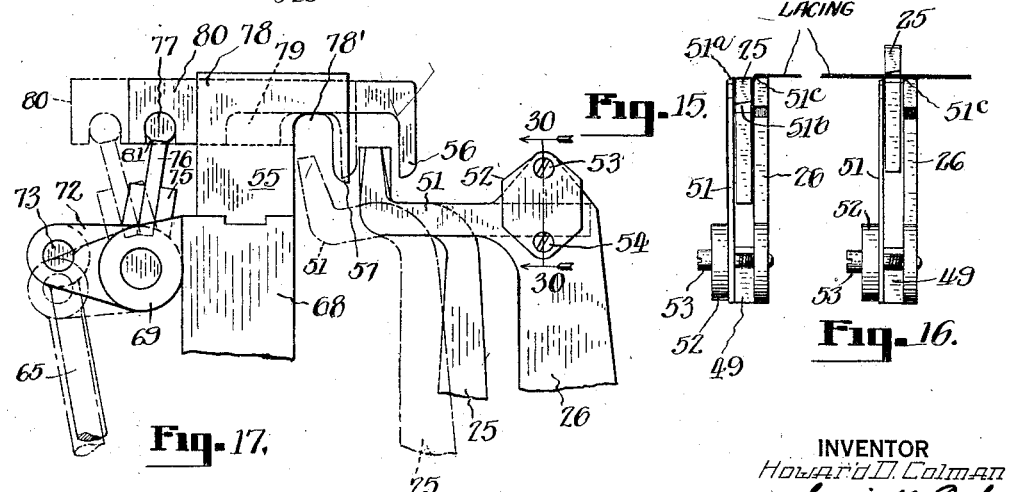
INVENTOR
Howard D. Colman
BY
ATTORNEYS Sept. 2, 1930. H. D. COLMAN 1,774,591
LACING MACHINE AND METHOD OF LACING SKEINS
Original Filed April 30, 1926 40 Sheets-Sheet 10
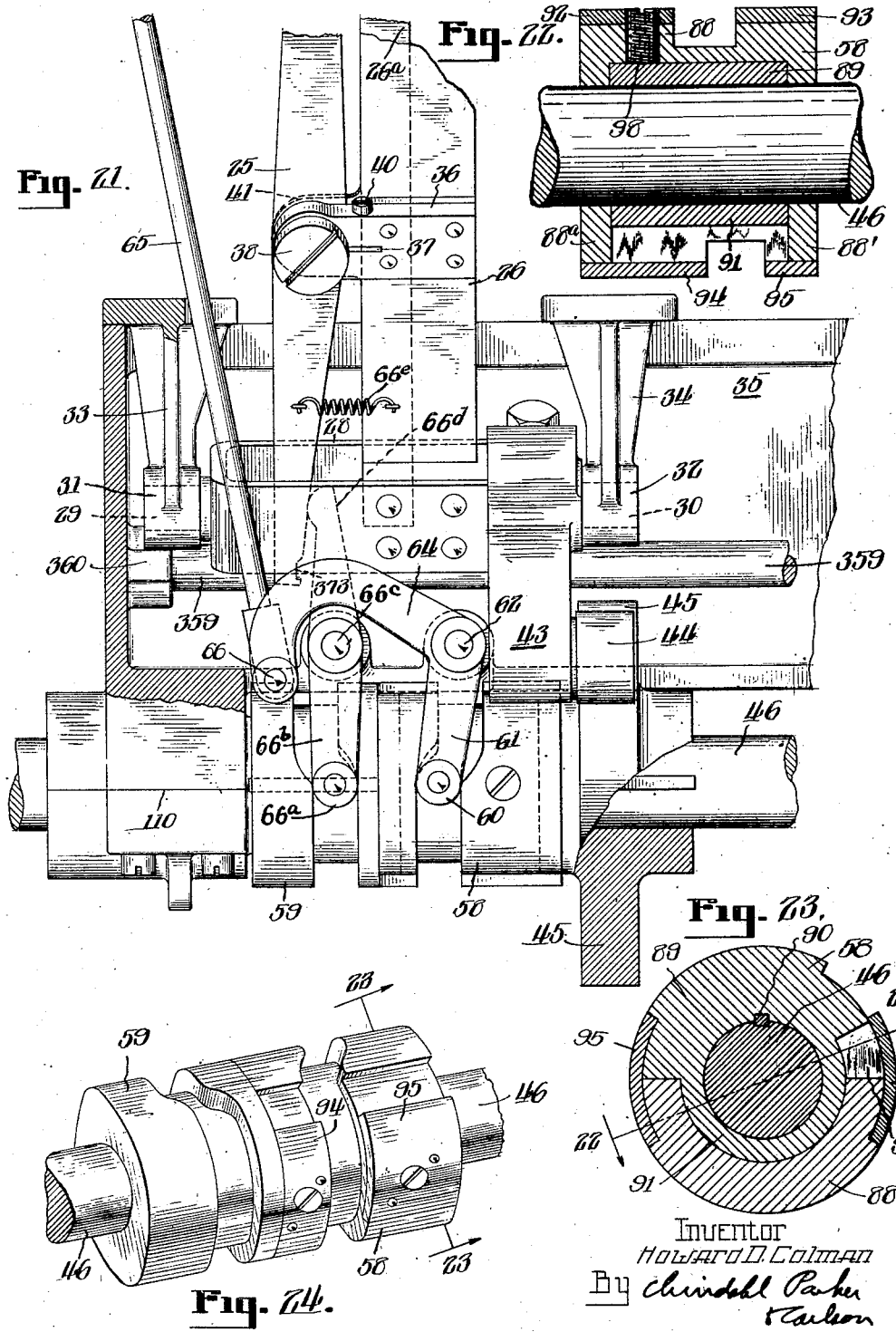

Sept. 2, 1930.    H. D. COLMAN    1,774,591
LACING MACHINE AND METHOD OF LACING SKEINS
Original Filed April 30, 1926    40 Sheets-Sheet 11

Inventor
Howard D. Colman
By *Chindahl Parker Carlson*
Attorneys

Sept. 2, 1930.   H. D. COLMAN   1,774,591
LACING MACHINE AND METHOD OF LACING SKEINS
Original Filed April 30, 1926   40 Sheets-Sheet 12
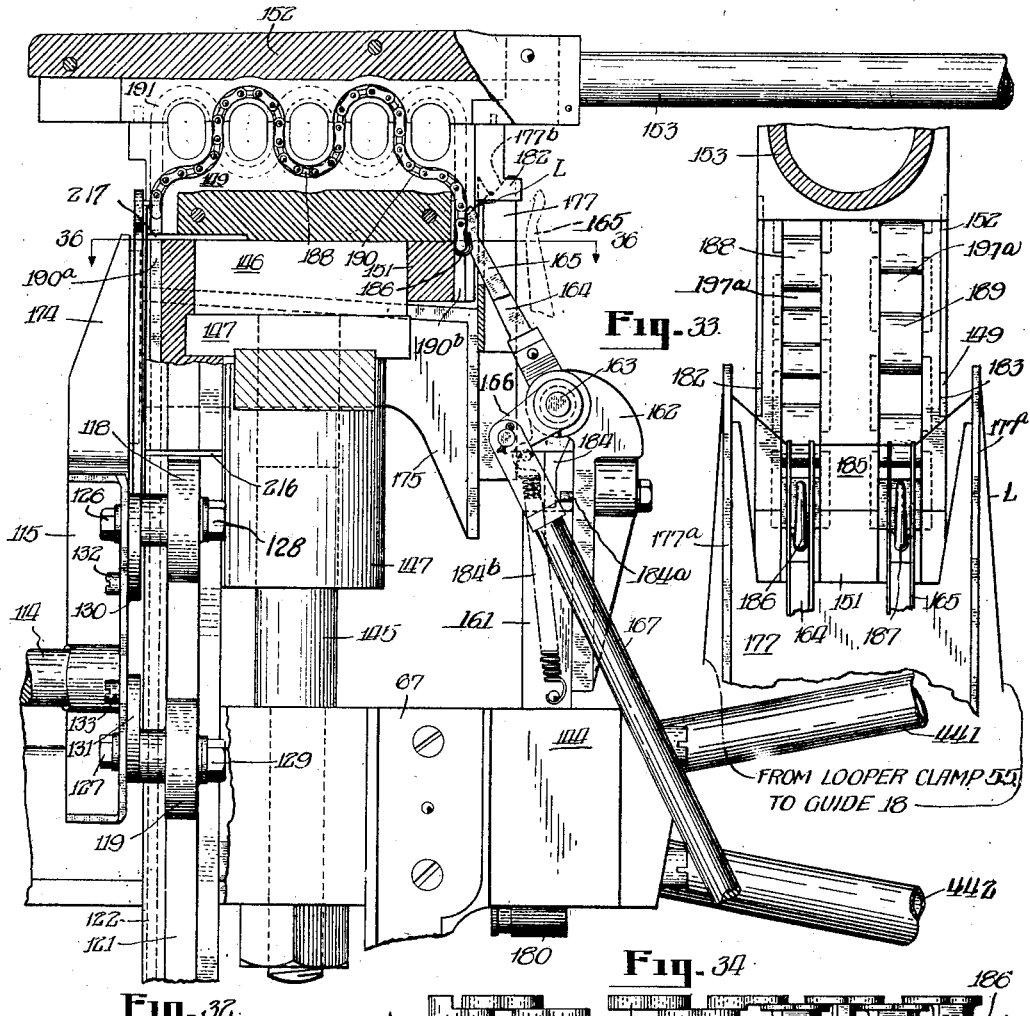
INVENTOR
Howard D. Colman
BY
Churchill Parker & Carlson
ATTORNEYS Sept. 2, 1930.  H. D. COLMAN  1,774,591

LACING MACHINE AND METHOD OF LACING SKEINS

Original Filed April 30, 1926  40 Sheets-Sheet 13

INVENTOR
Howard D. Colman
BY
Churchill Parker & Carlson
ATTORNEYS

Sept. 2, 1930.   H. D. COLMAN   1,774,591
LACING MACHINE AND METHOD OF LACING SKEINS
Original Filed April 30, 1926   40 Sheets-Sheet 14
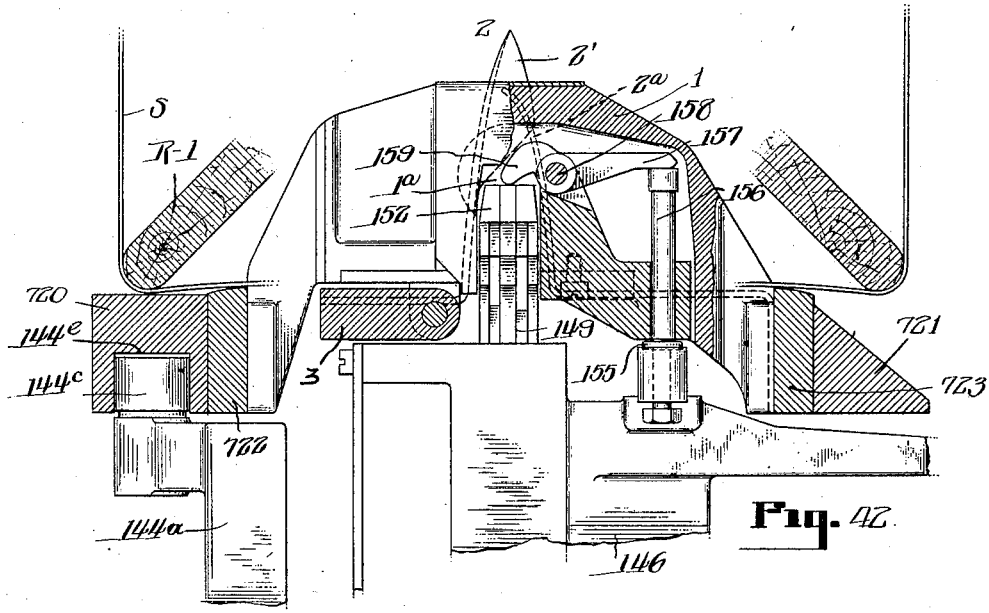
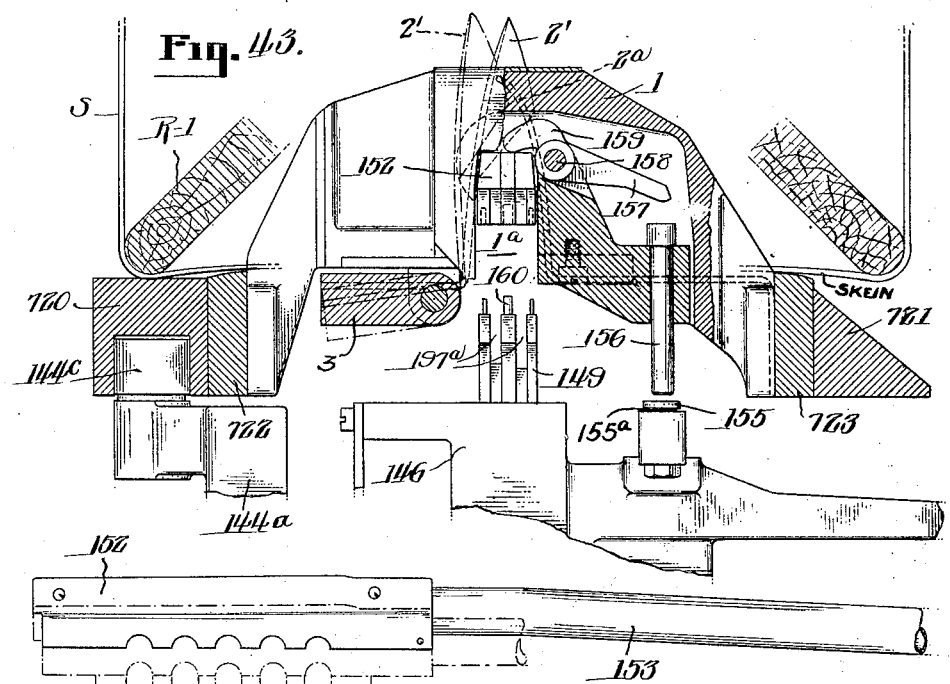
Inventor
Howard D. Colman
By
Churchill Parker Carlson
Attorneys

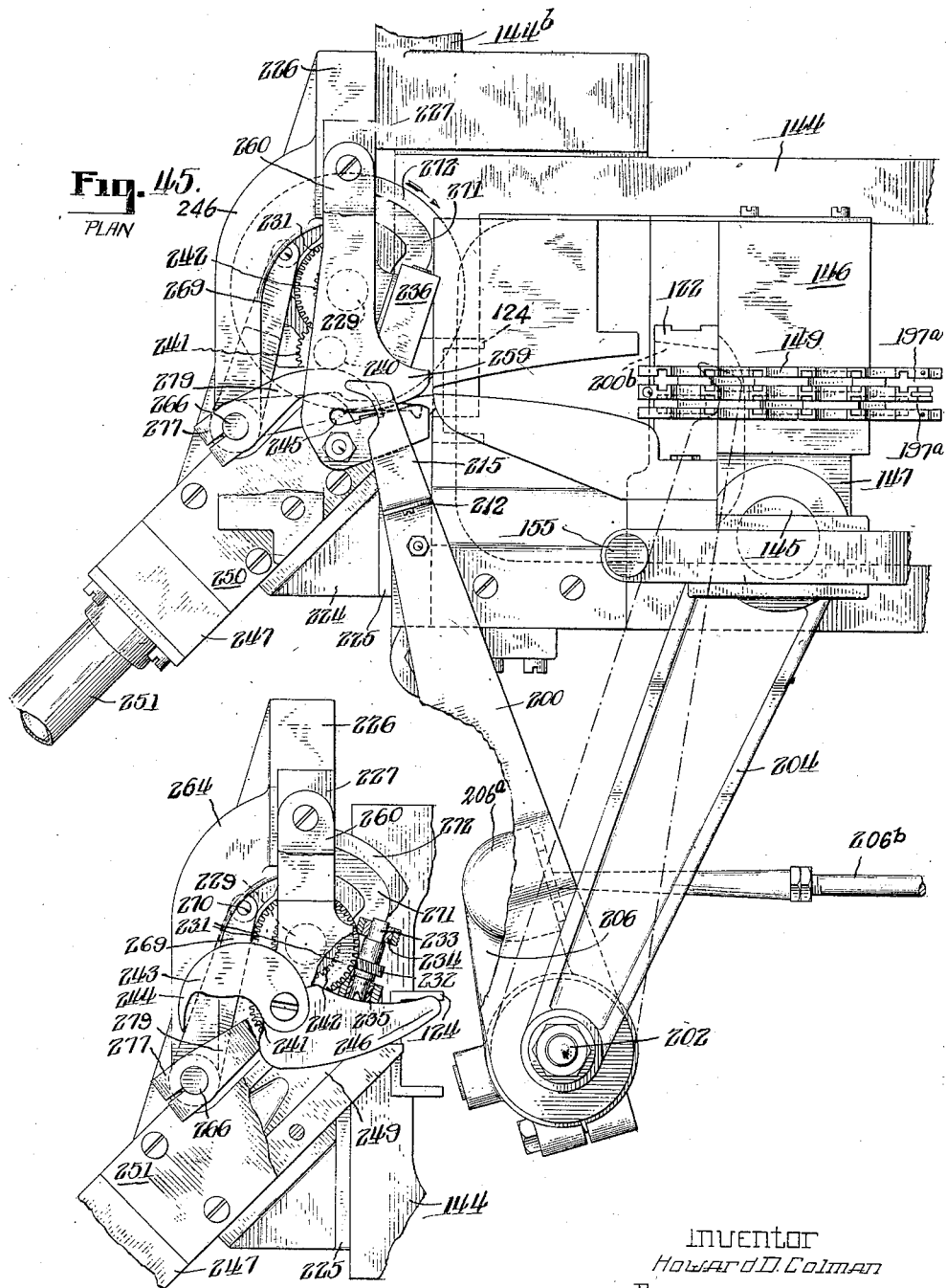

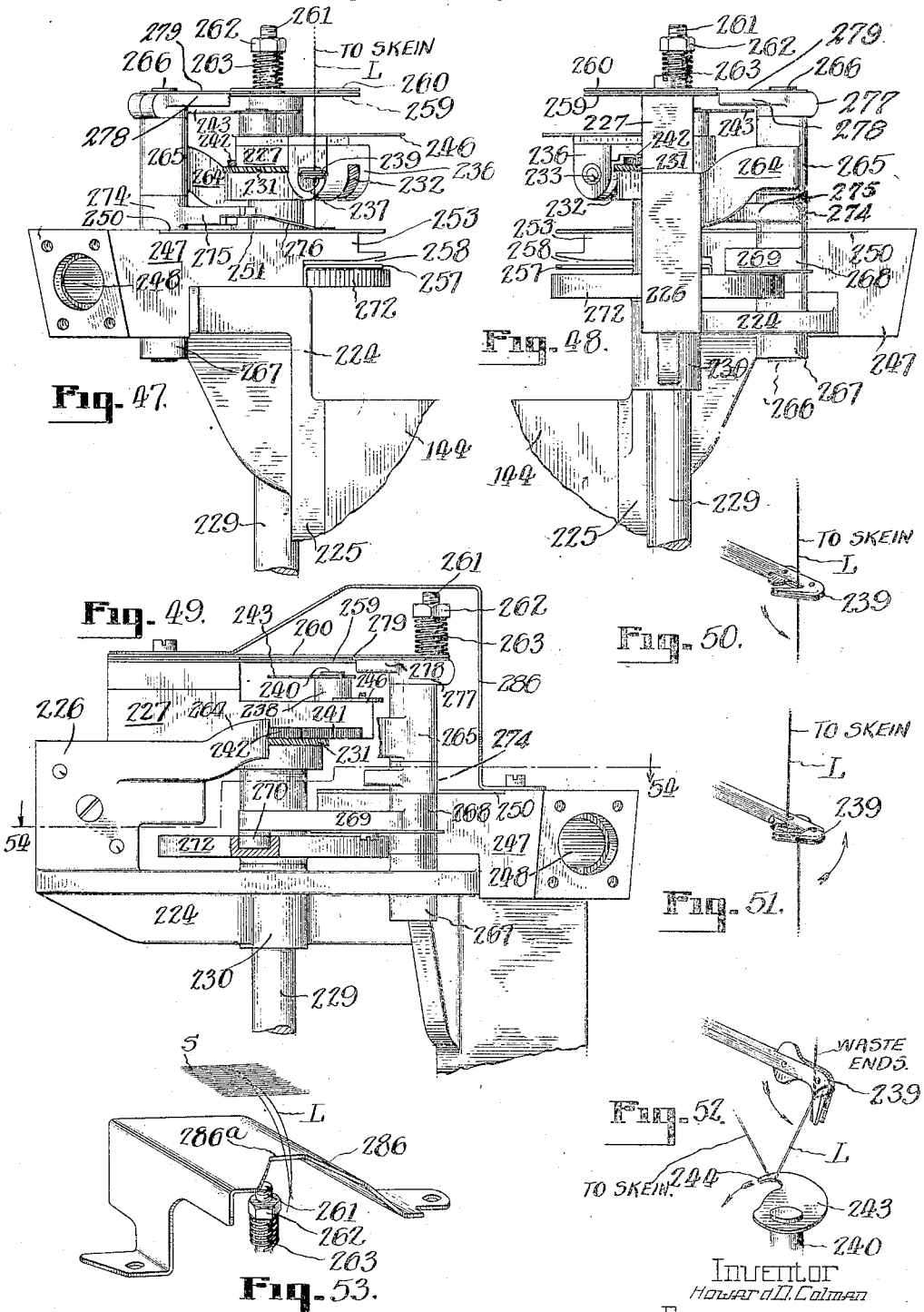

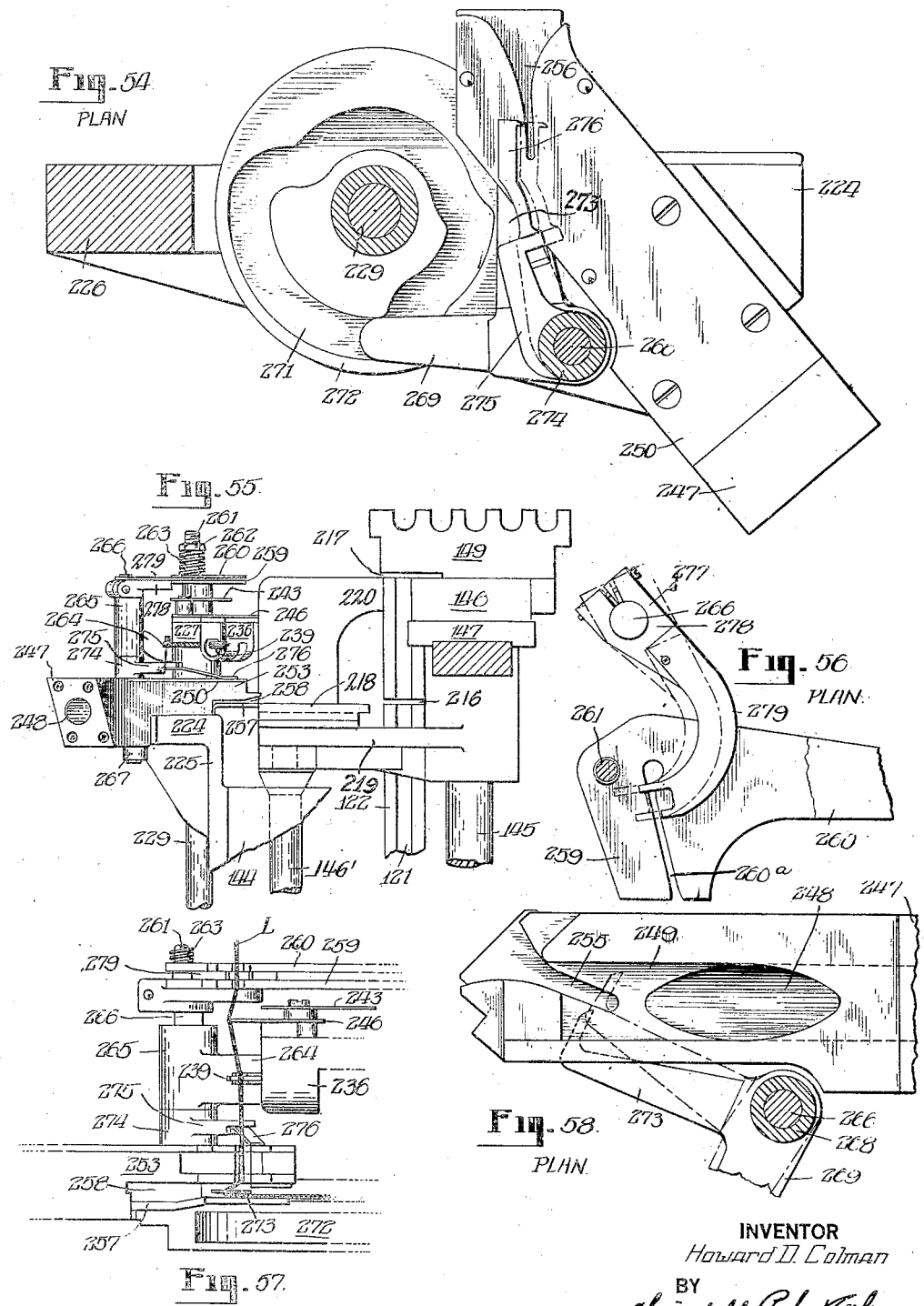

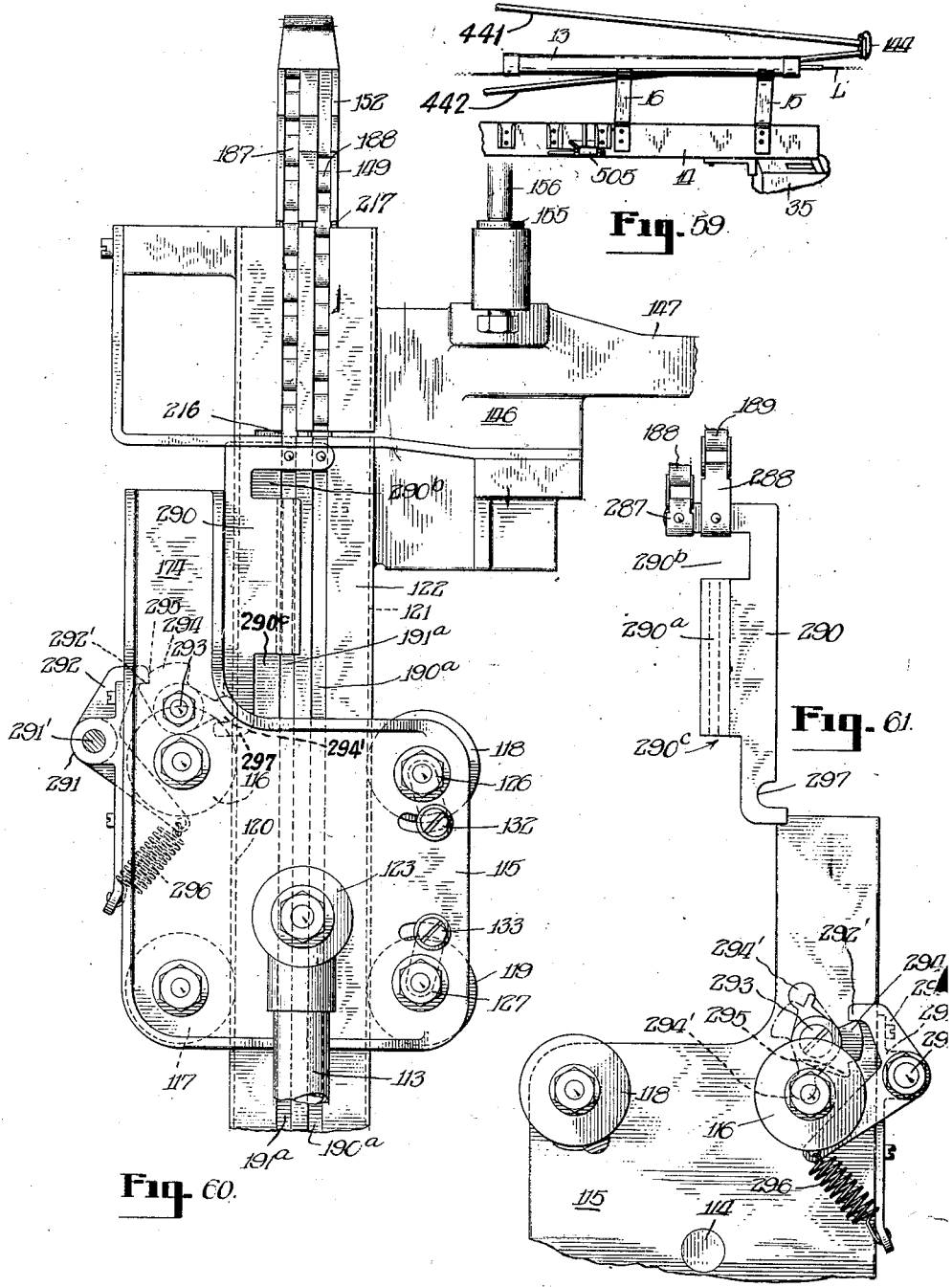

Sept. 2, 1930.   H. D. COLMAN   1,774,591
LACING MACHINE AND METHOD OF LACING SKEINS
Original Filed April 30, 1926   40 Sheets-Sheet 19
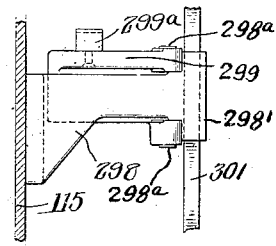
Fig. 63.
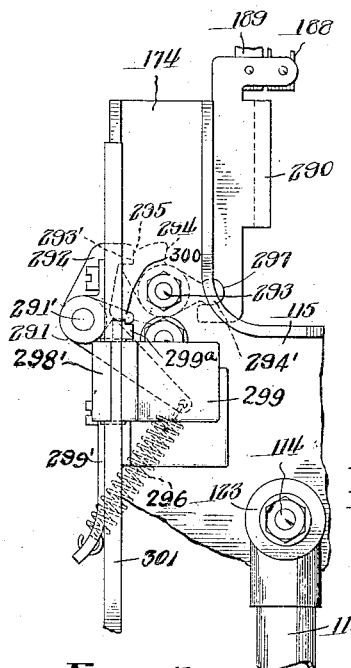
Fig. 64.
Fig. 62.
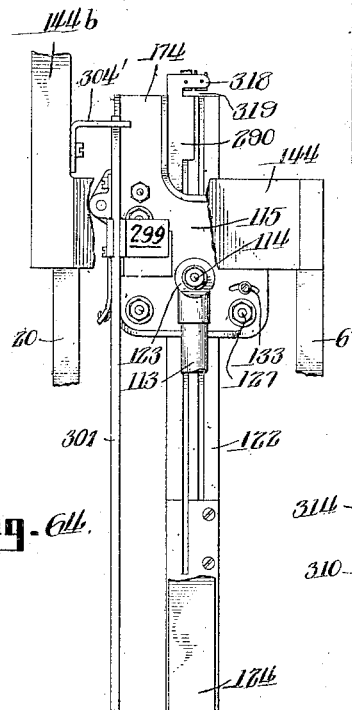
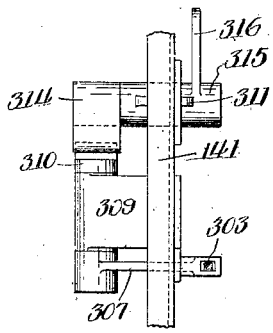
Fig. 65.
PLAN
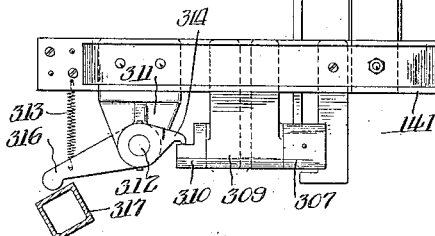
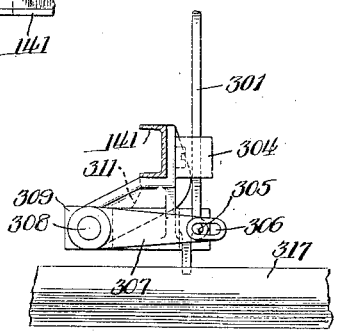
Fig. 67.
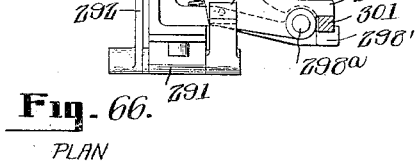
Fig. 66.
PLAN
INVENTOR
Howard D. Colman
BY
Chindahl Parker Carlson
ATTORNEYS

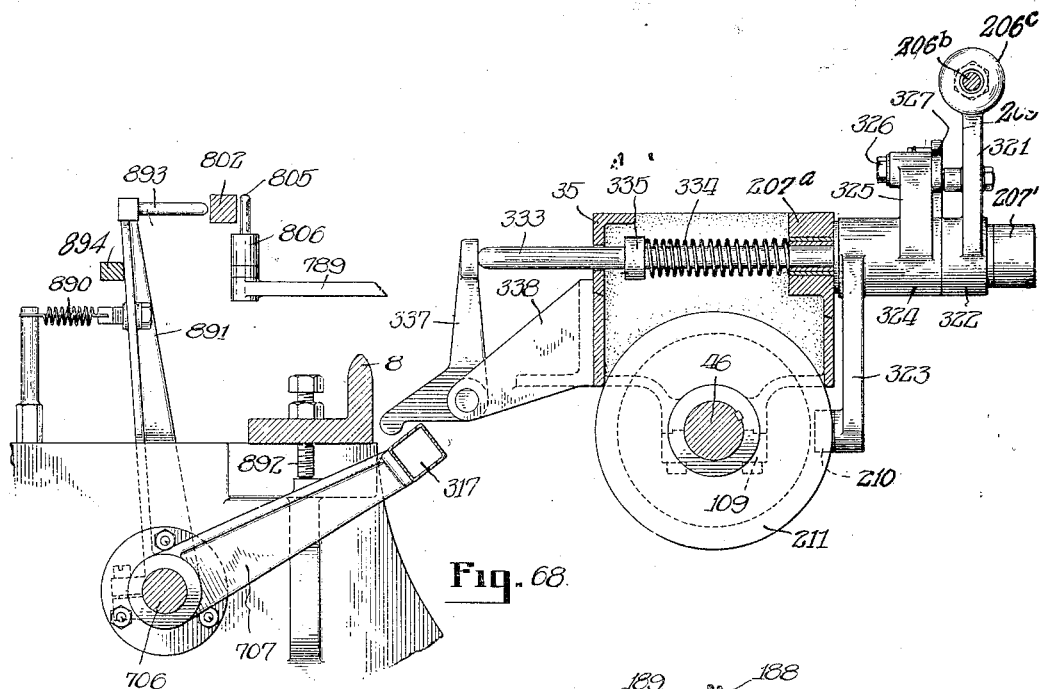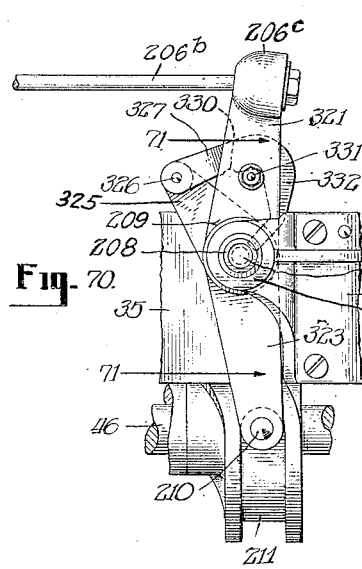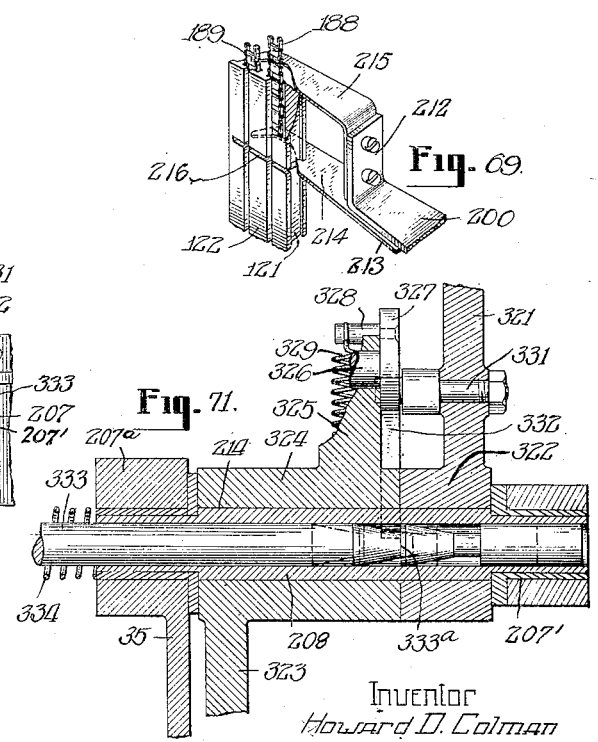

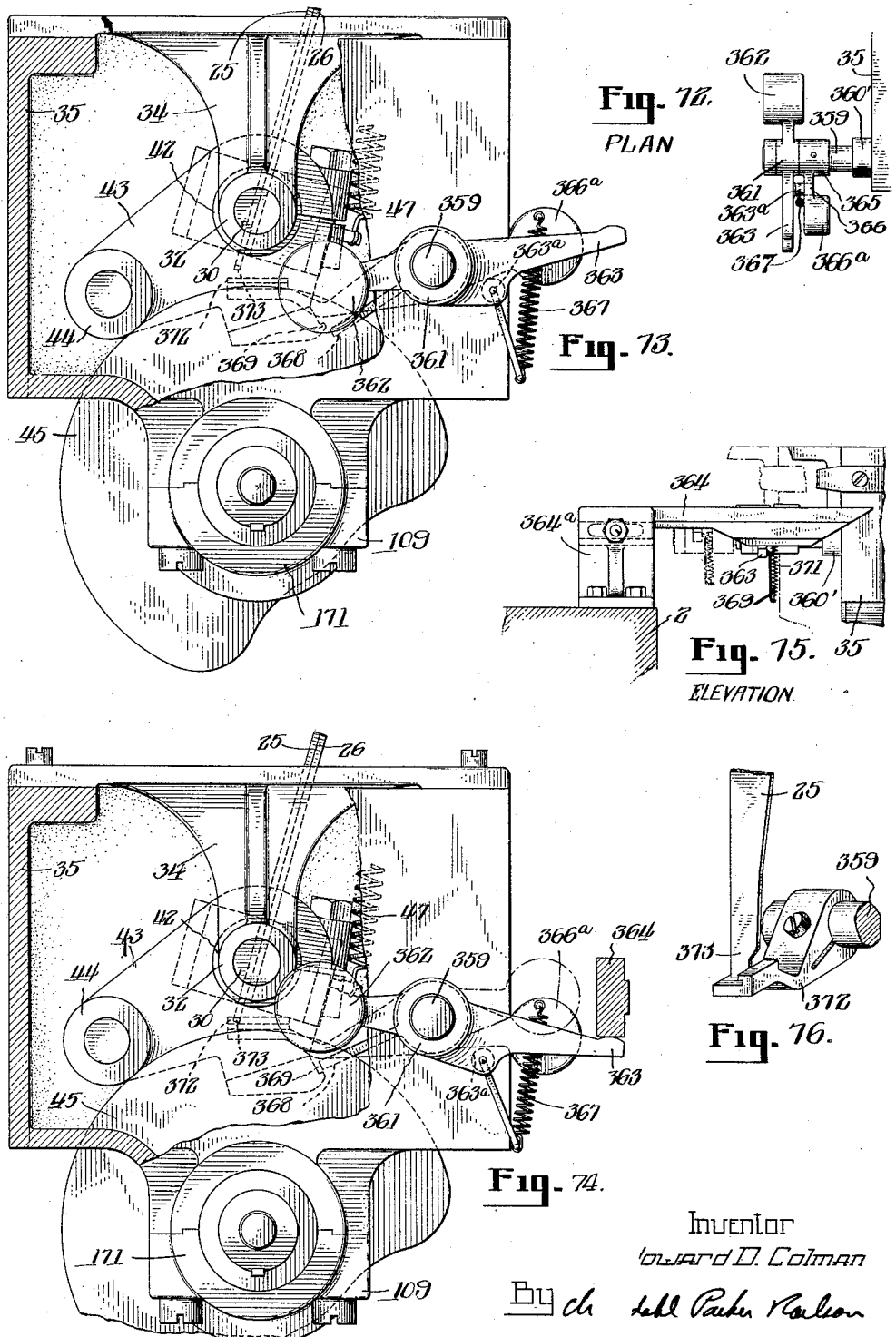

Sept. 2, 1930. H. D. COLMAN 1,774,591
LACING MACHINE AND METHOD OF LACING SKEINS
Original Filed April 30, 1926 40 Sheets-Sheet 22
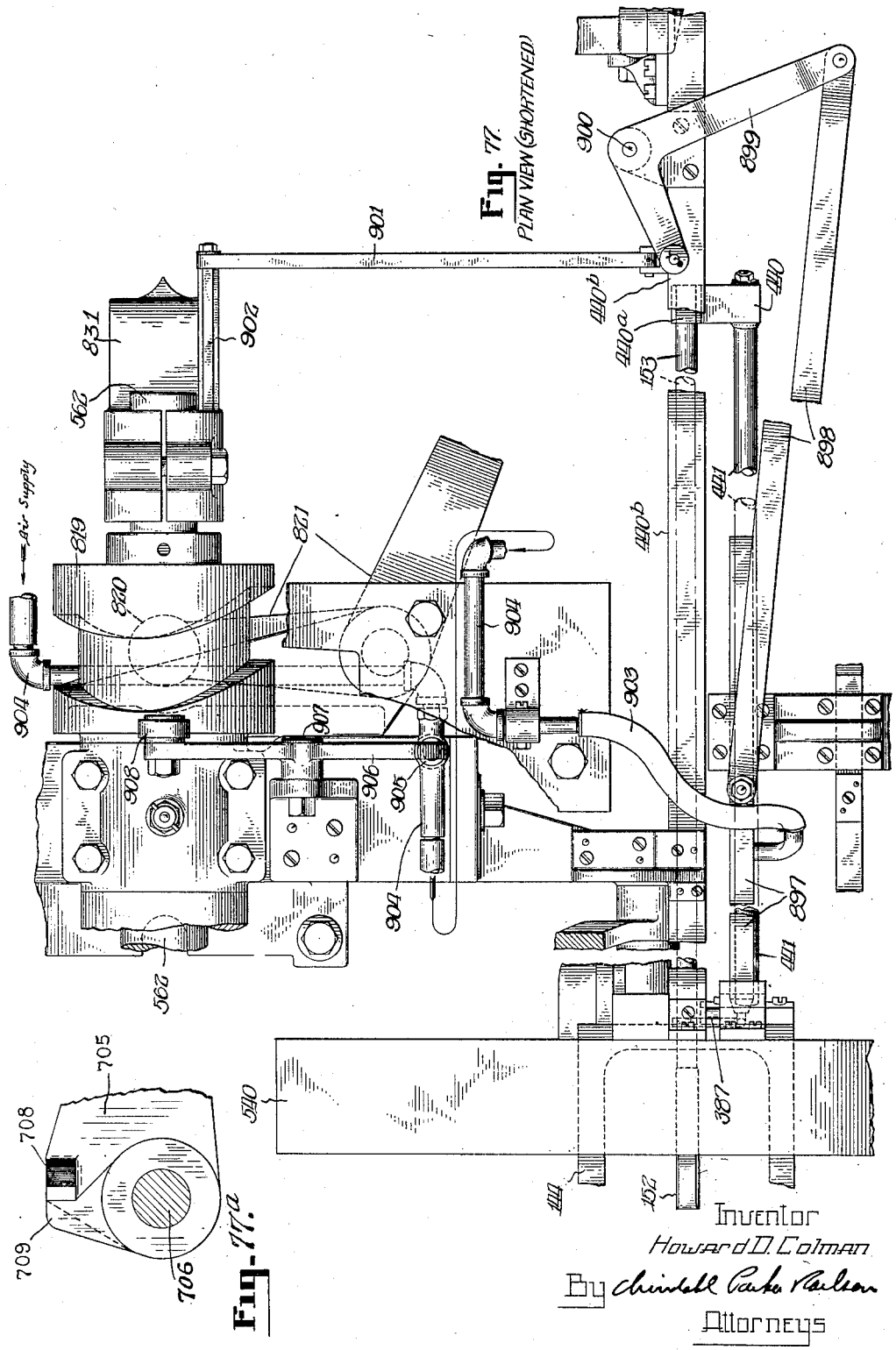
Inventor
Howard D. Colman
By [signature]
Attorneys Sept. 2, 1930.        H. D. COLMAN        1,774,591
LACING MACHINE AND METHOD OF LACING SKEINS
Original Filed April 30, 1926    40 Sheets-Sheet 23
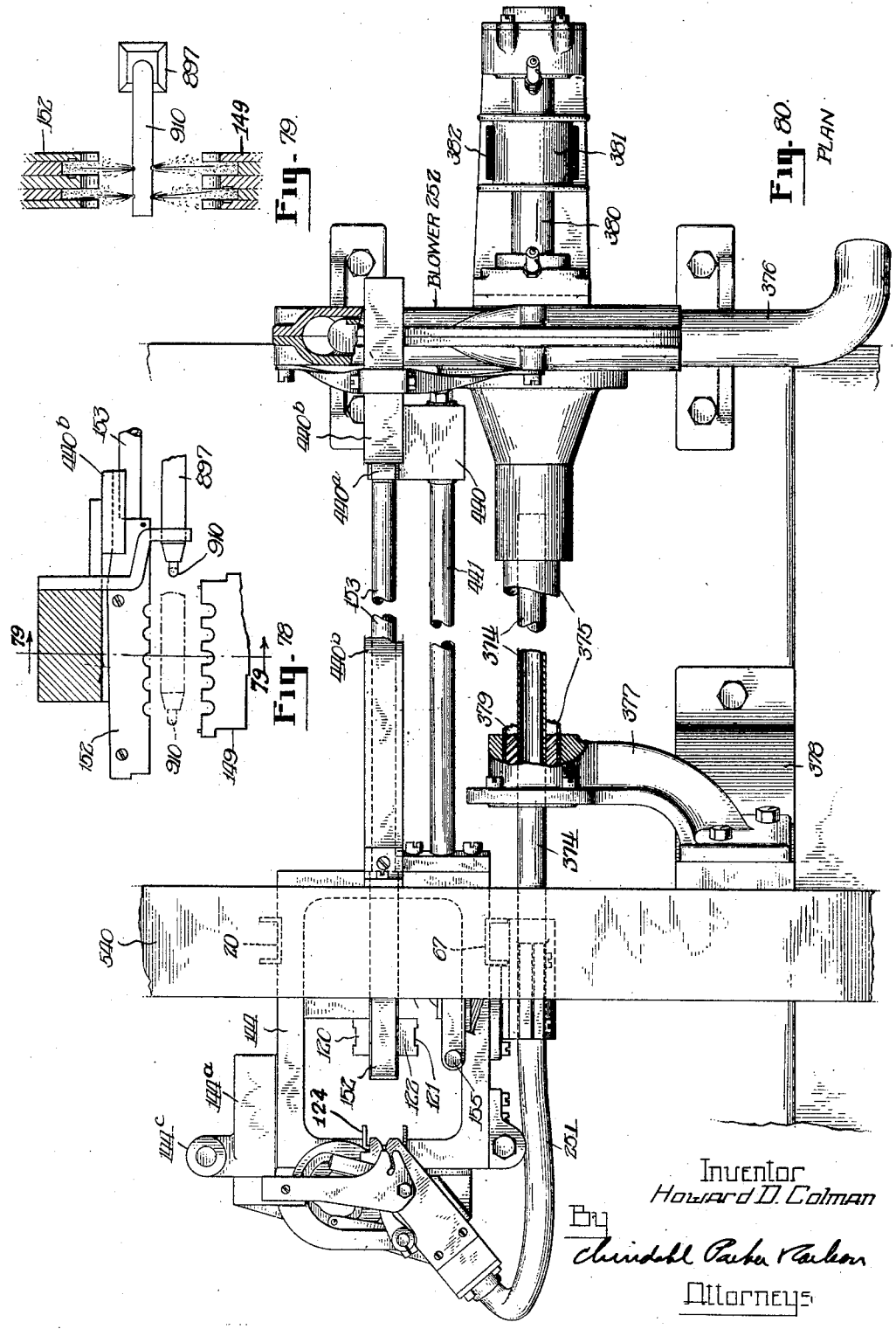

Sept. 2, 1930.  H. D. COLMAN  1,774,591
LACING MACHINE AND METHOD OF LACING SKEINS
Original Filed April 30, 1926  40 Sheets-Sheet 27
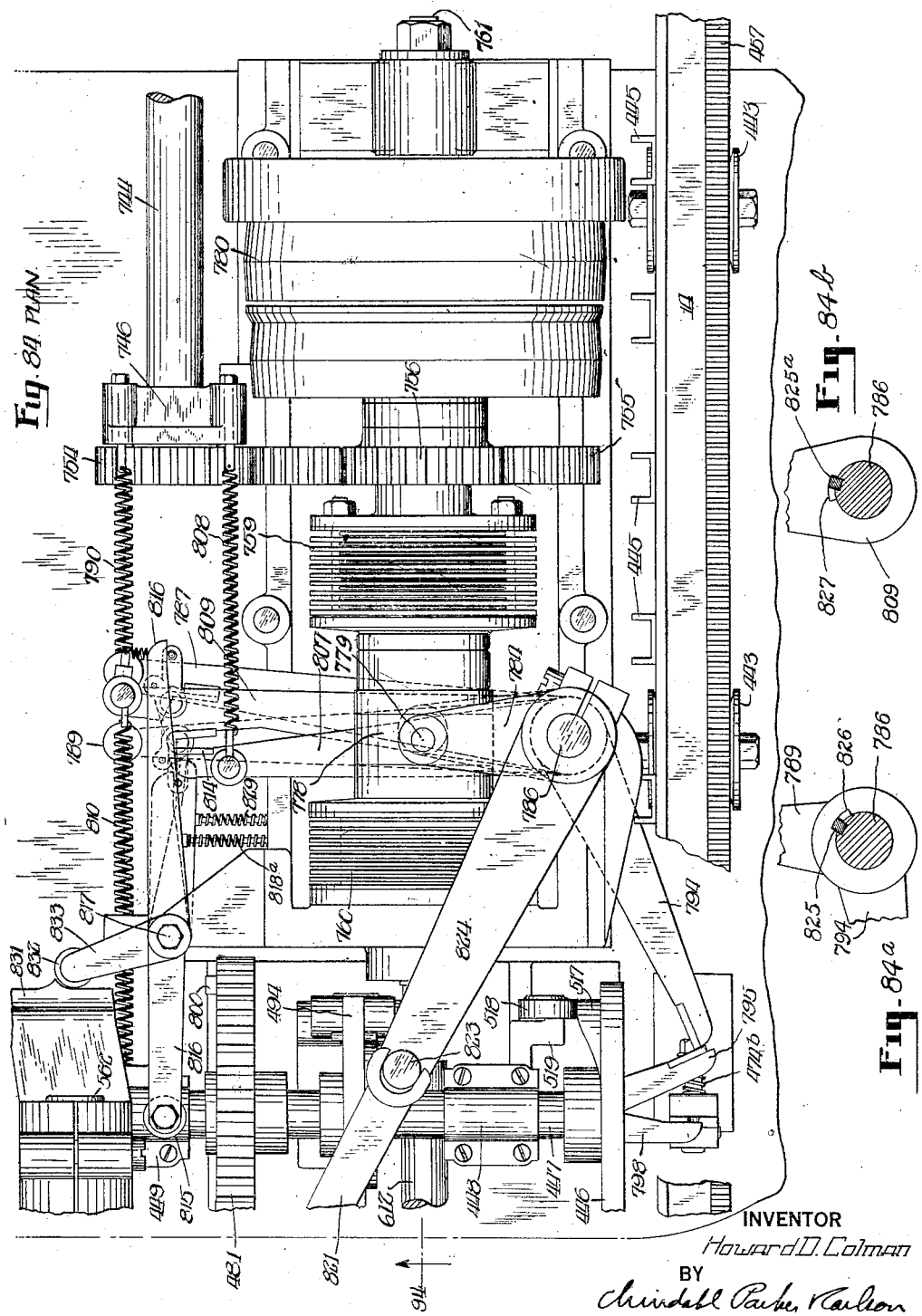
INVENTOR
Howard D. Colman
BY
Chindahl Parker Carlson
ATTORNEYS

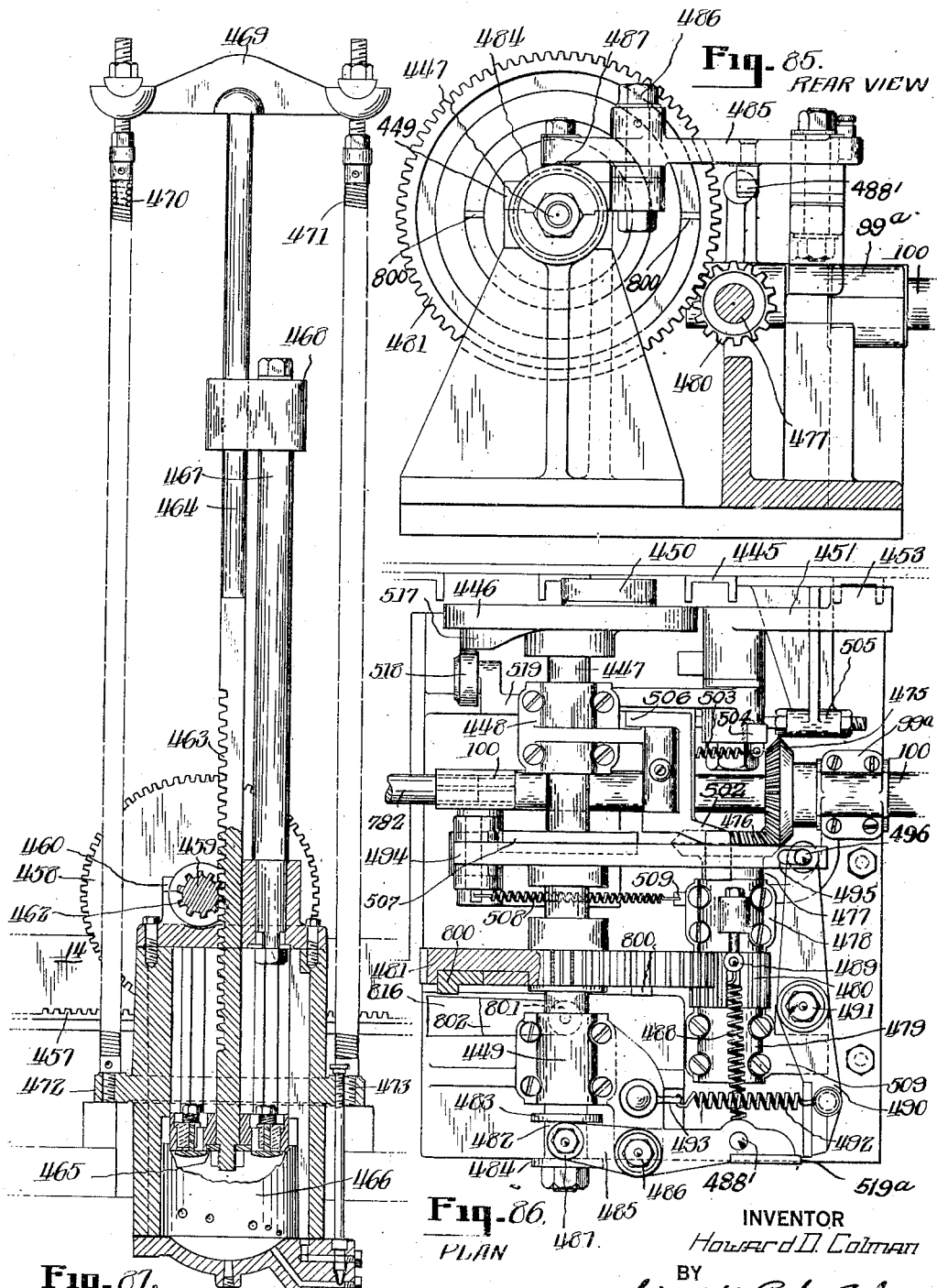

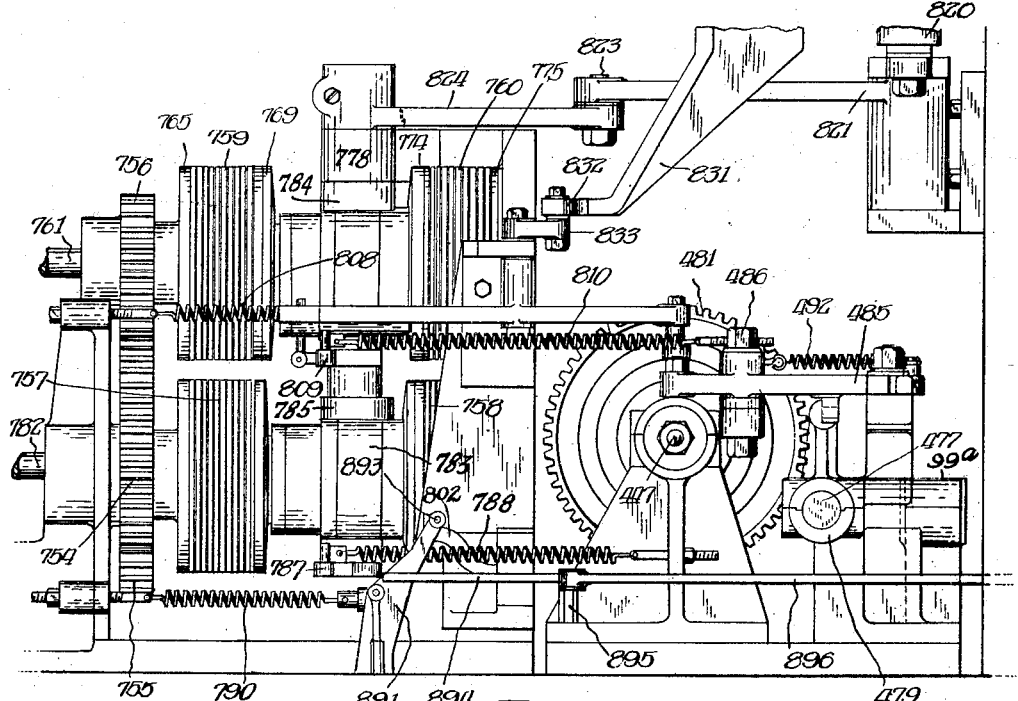
Fig. 86 REAR VIEW.
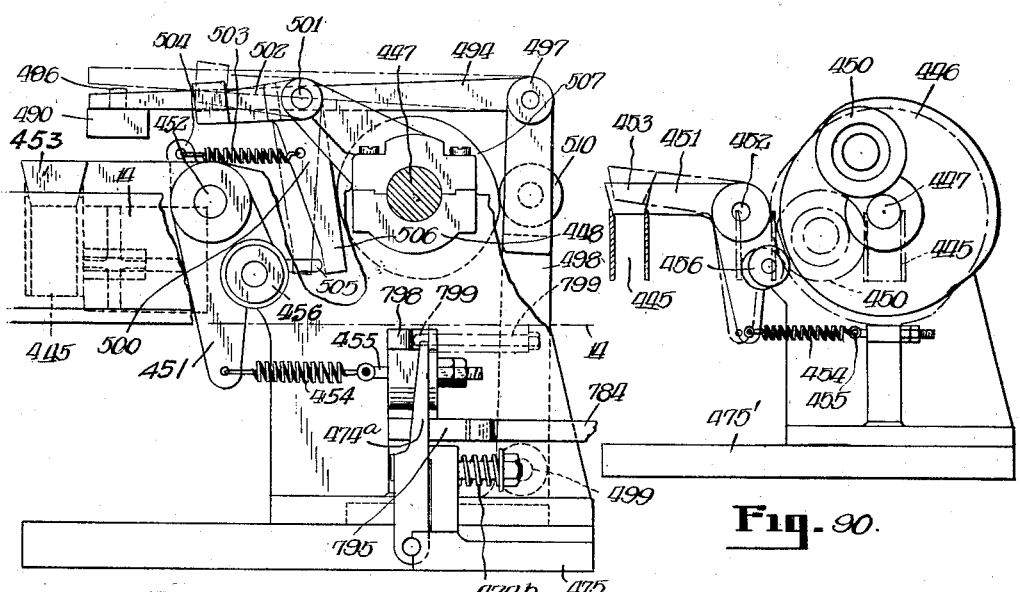
Fig. 89
FRONT VIEW
Fig. 90.
INVENTOR
Howard D. Colman
BY
ATTORNEYS

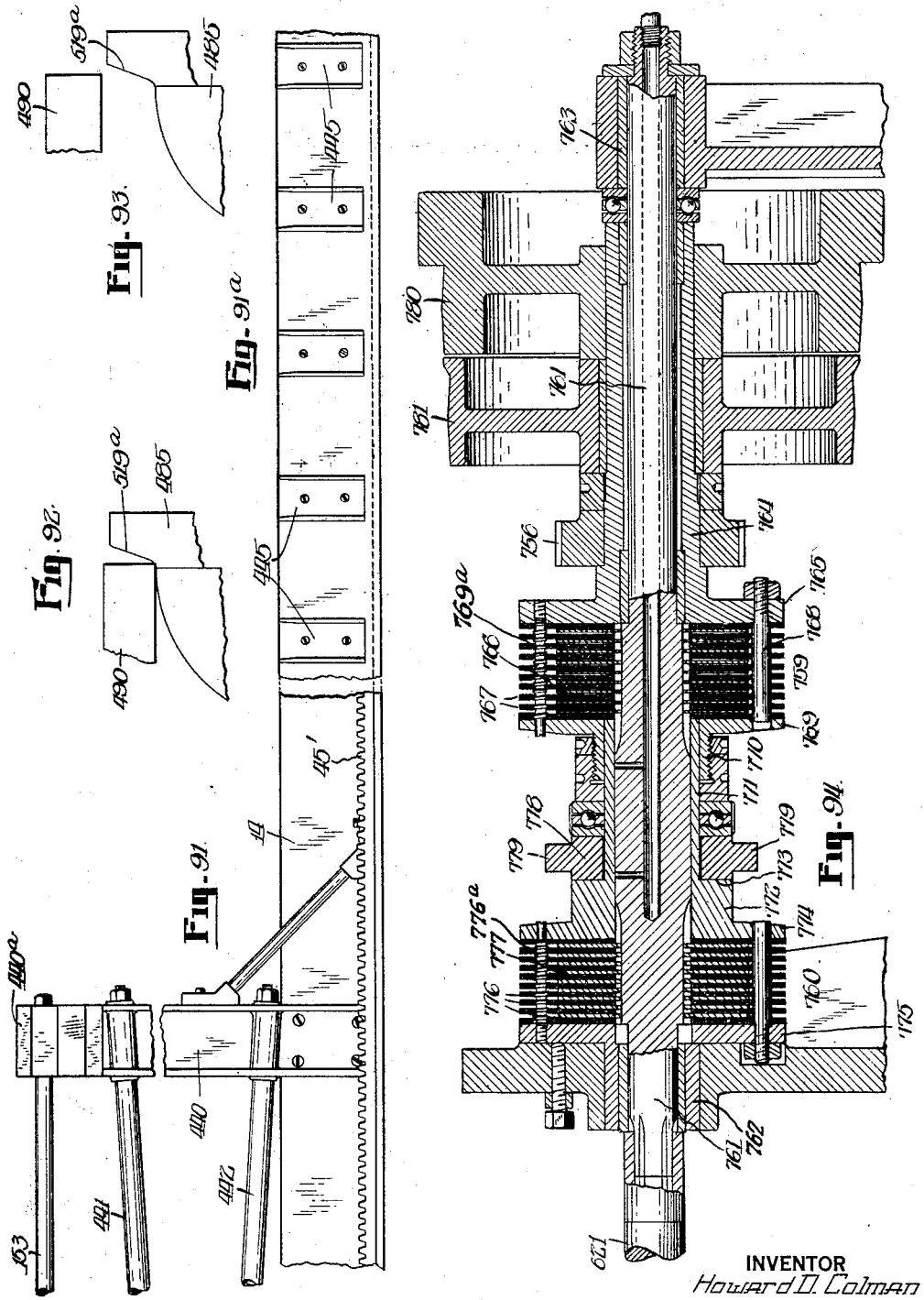

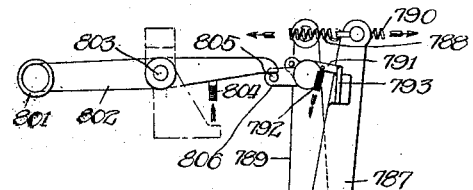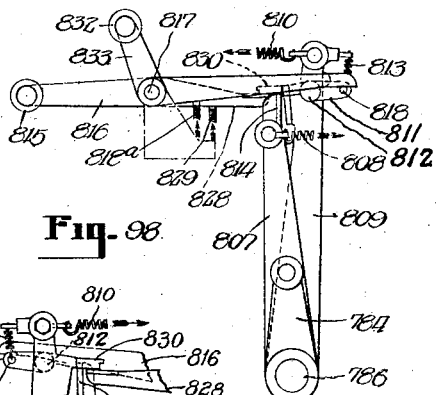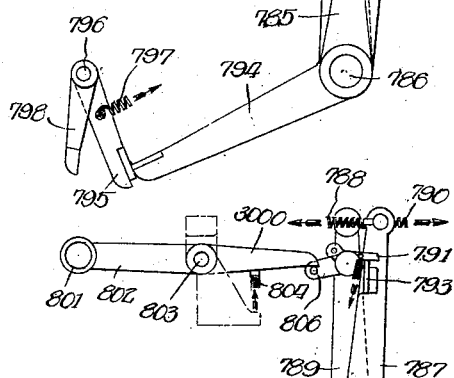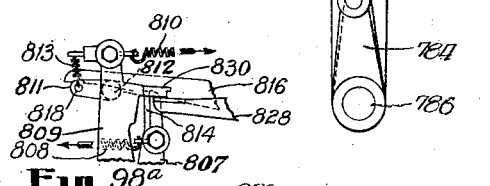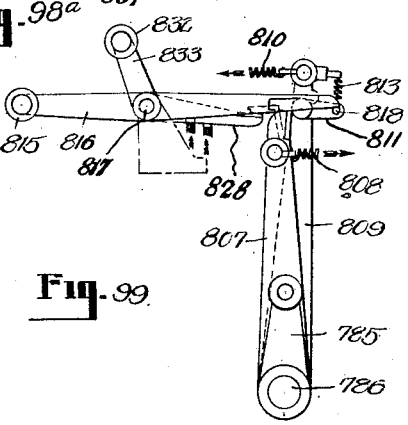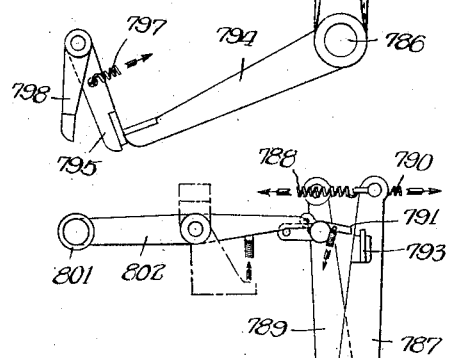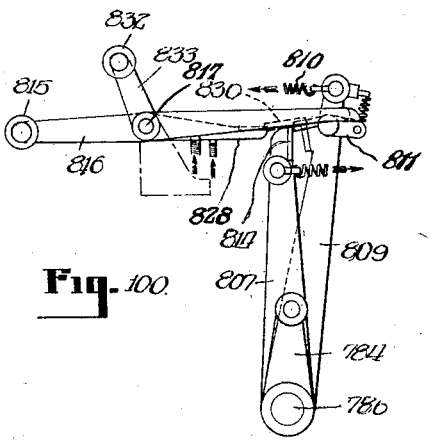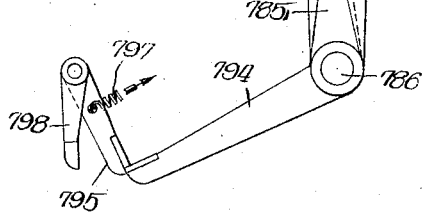

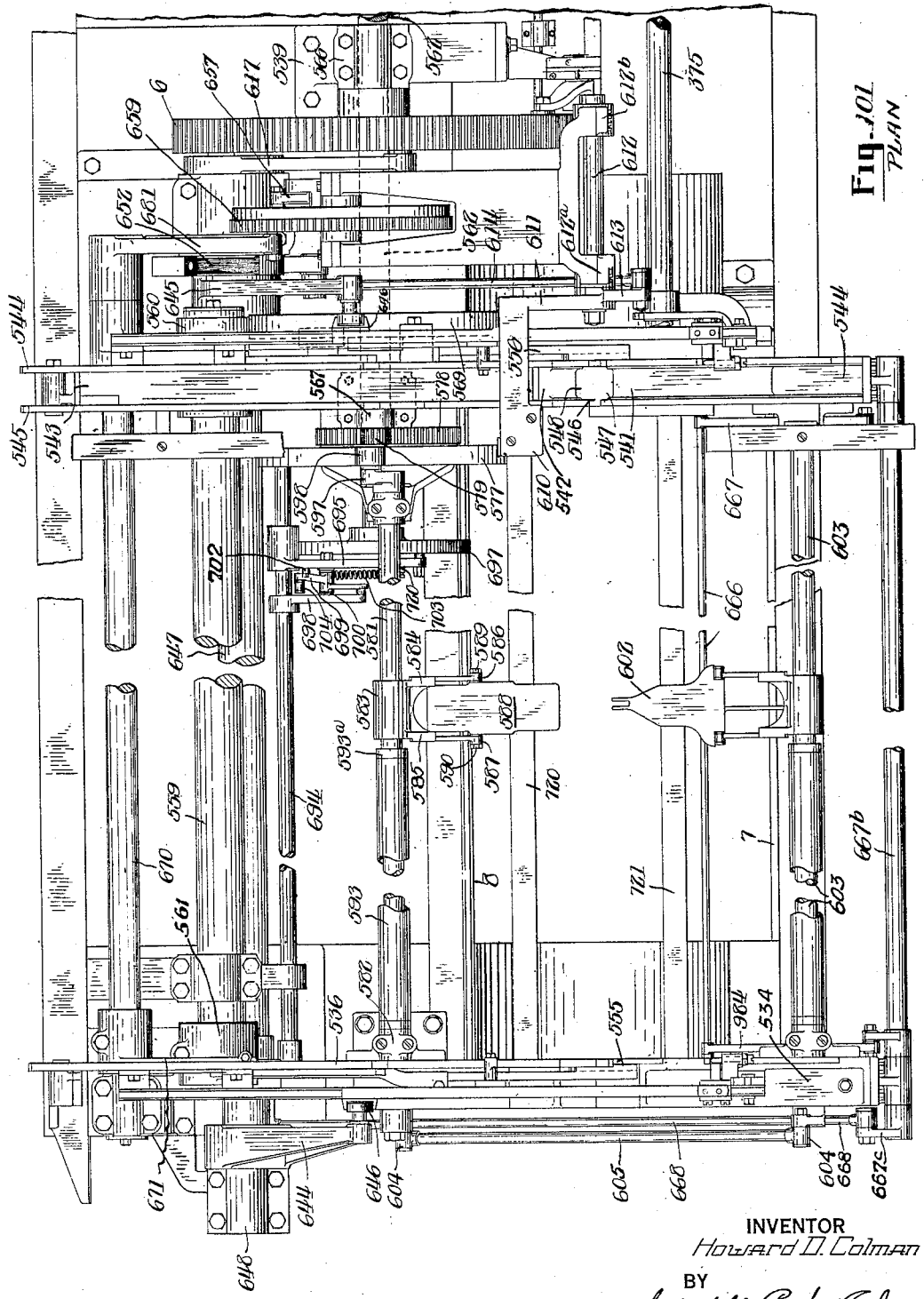

Sept. 2, 1930.  H. D. COLMAN  1,774,591
LACING MACHINE AND METHOD OF LACING SKEINS
Original Filed April 30, 1926   40 Sheets-Sheet 33
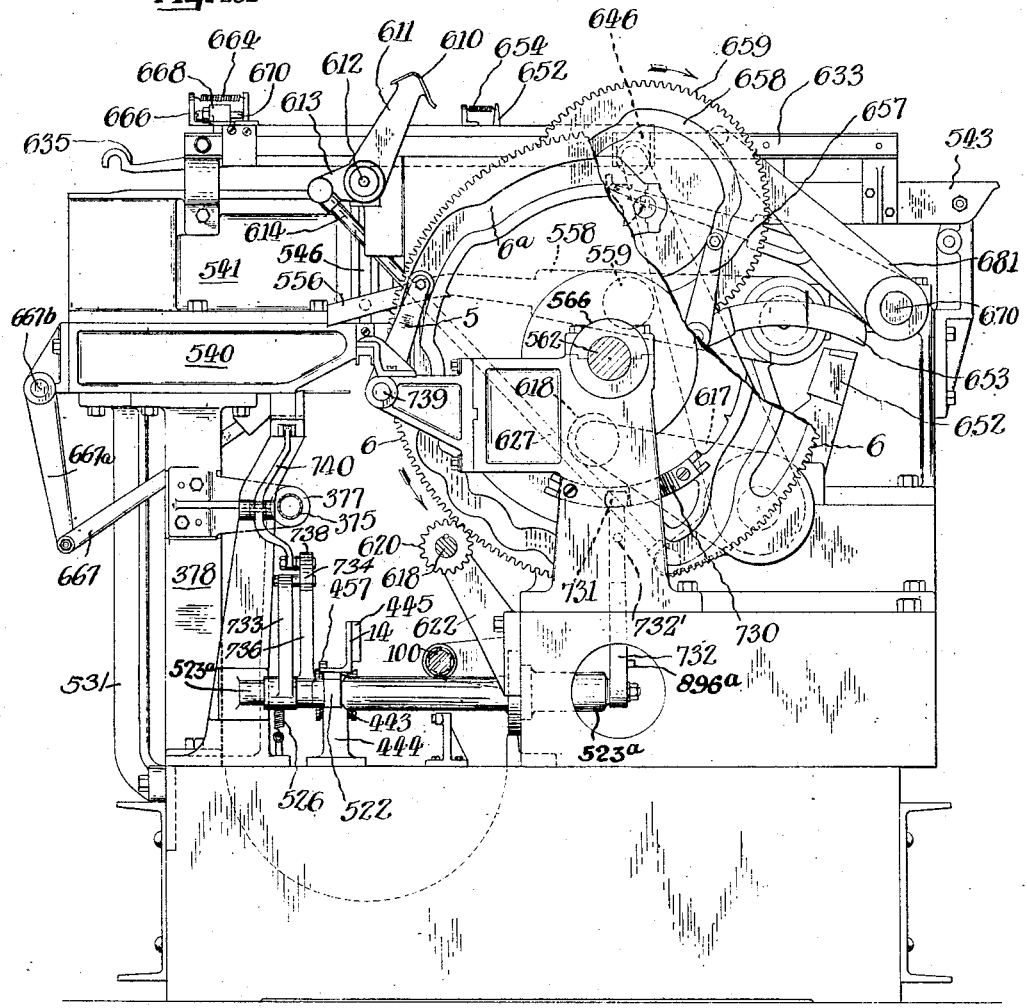
Fig. 102.
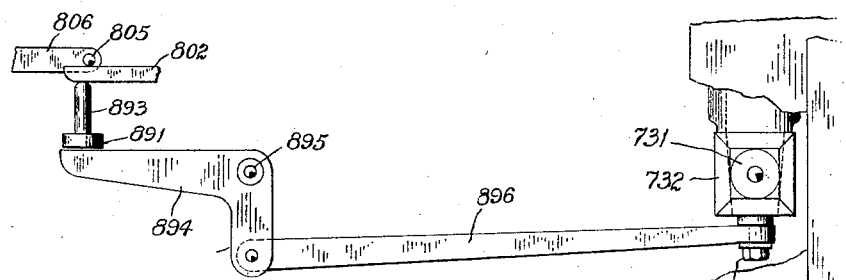
Fig. 102ª
INVENTOR
Howard D. Colman
BY
ATTORNEYS

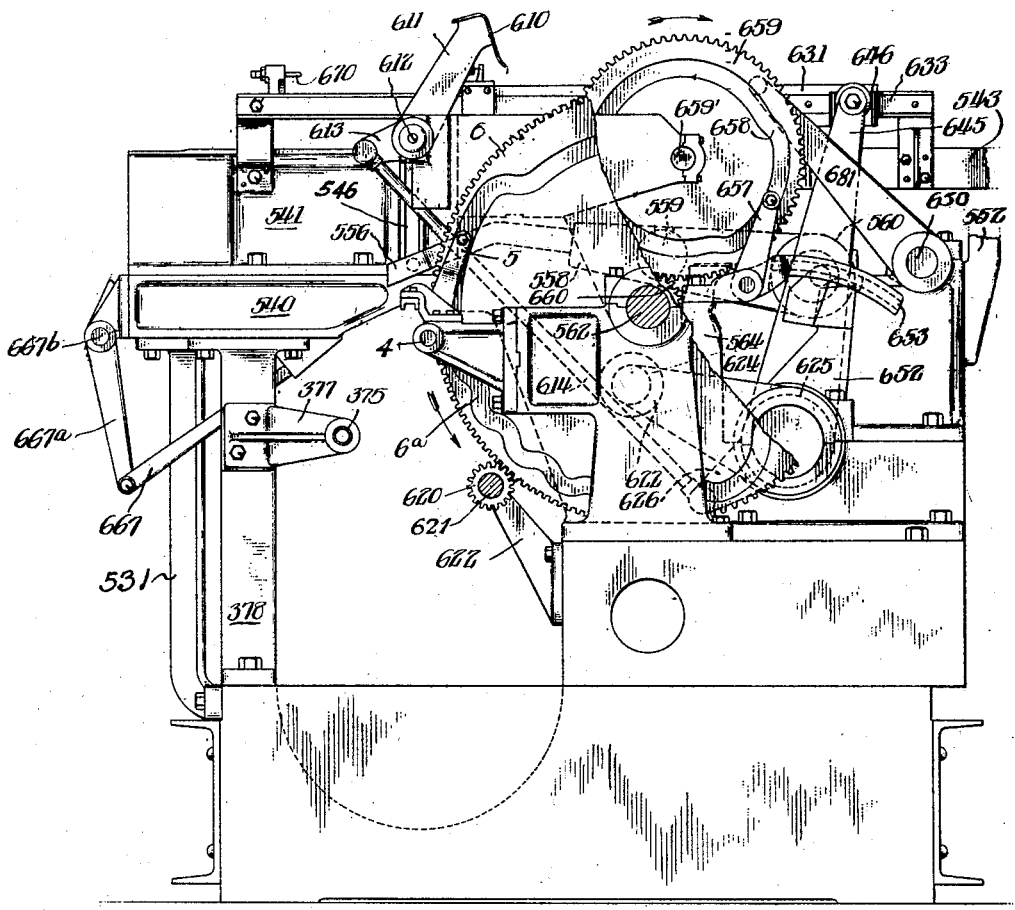
Fig_103.
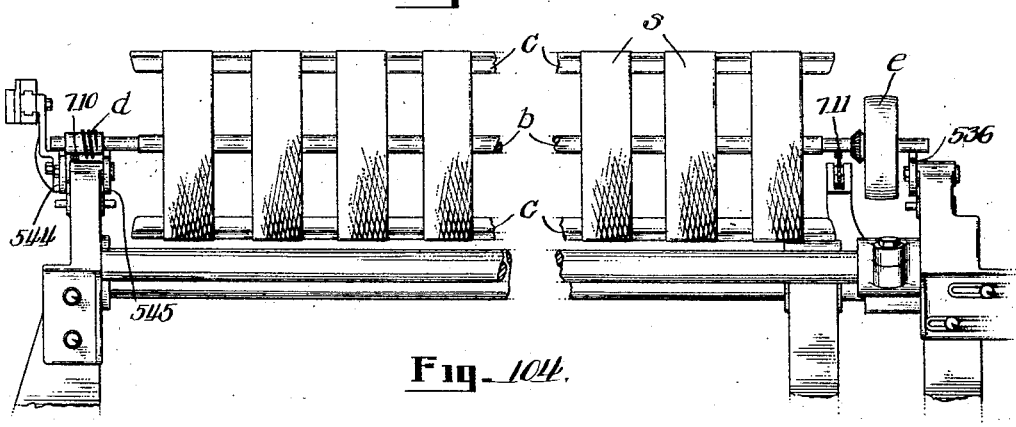
Fig_104.

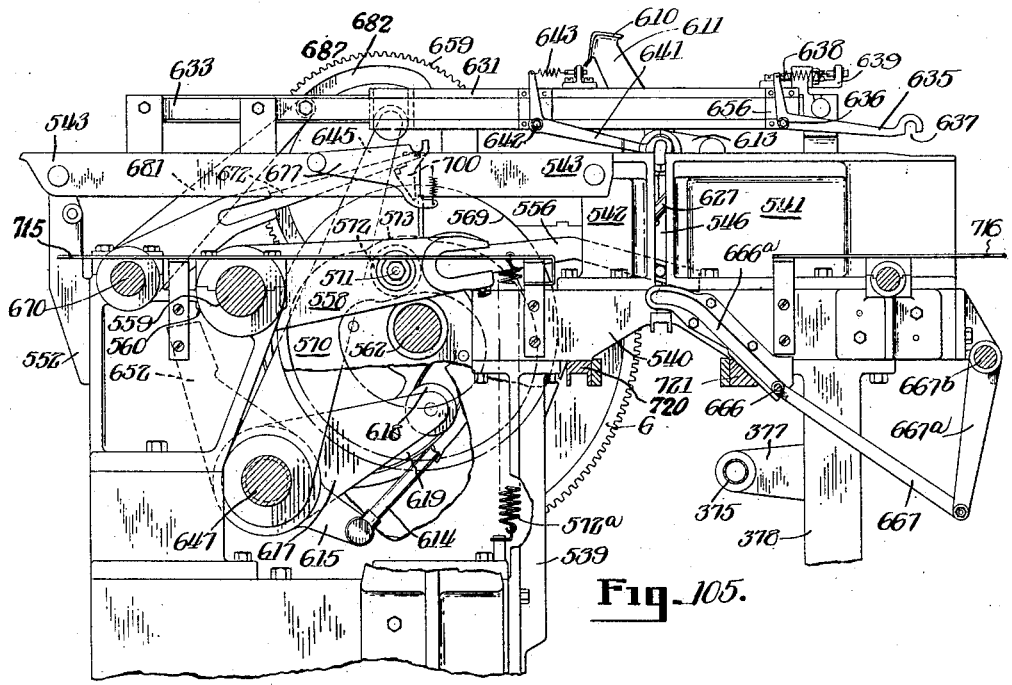
Fig_105.
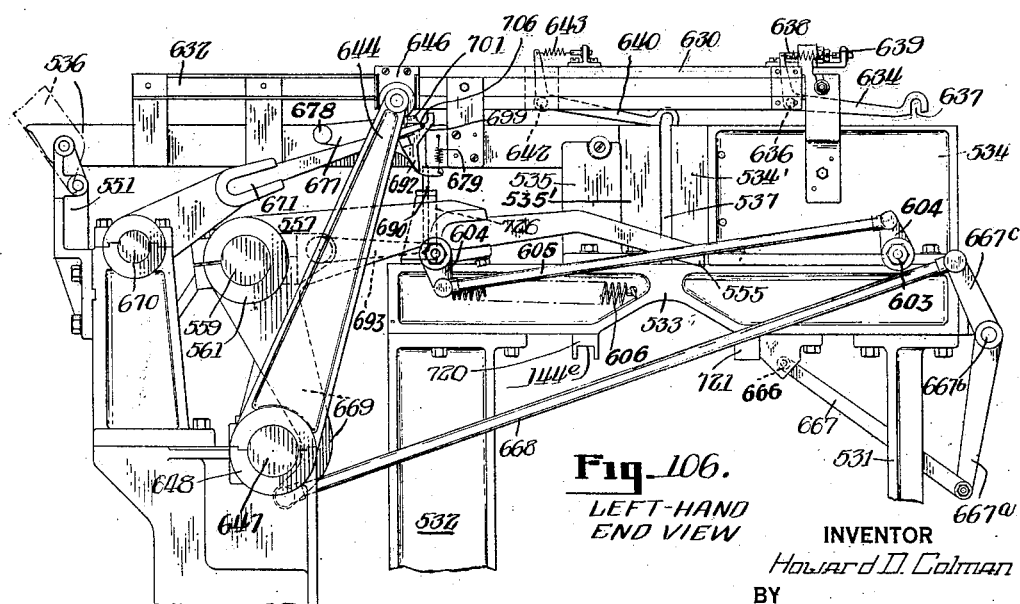
Fig_106.
LEFT-HAND
END VIEW
INVENTOR
Howard D. Colman
BY
Lindell Parker Karlson
ATTORNEYS Sept. 2, 1930.    H. D. COLMAN    1,774,591
LACING MACHINE AND METHOD OF LACING SKEINS
Original Filed April 30, 1926    40 Sheets-Sheet 36

Inventor
Howard D. Colman
By Chindell Parker Raison
Attorneys

Sept. 2, 1930.  H. D. COLMAN  1,774,591

LACING MACHINE AND METHOD OF LACING SKEINS

Original Filed April 30, 1926   40 Sheets-Sheet 37

INVENTOR
Howard D. Colman
BY
ATTORNEYS

Sept. 2, 1930. H. D. COLMAN 1,774,591
LACING MACHINE AND METHOD OF LACING SKEINS
Original Filed April 30, 1926 40 Sheets-Sheet 38
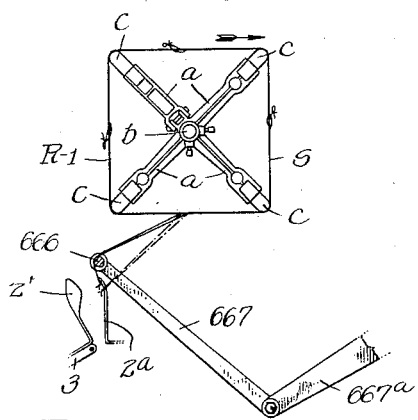
Fig. 110
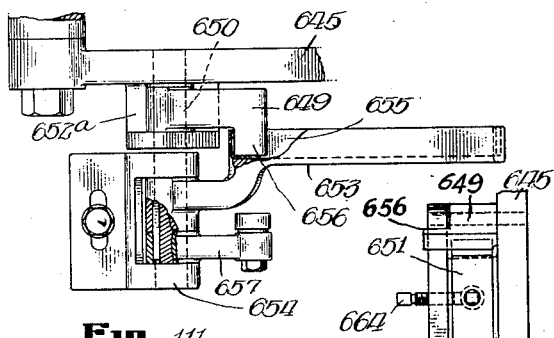
Fig. 111
Fig. 112
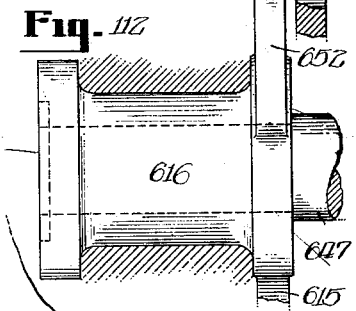
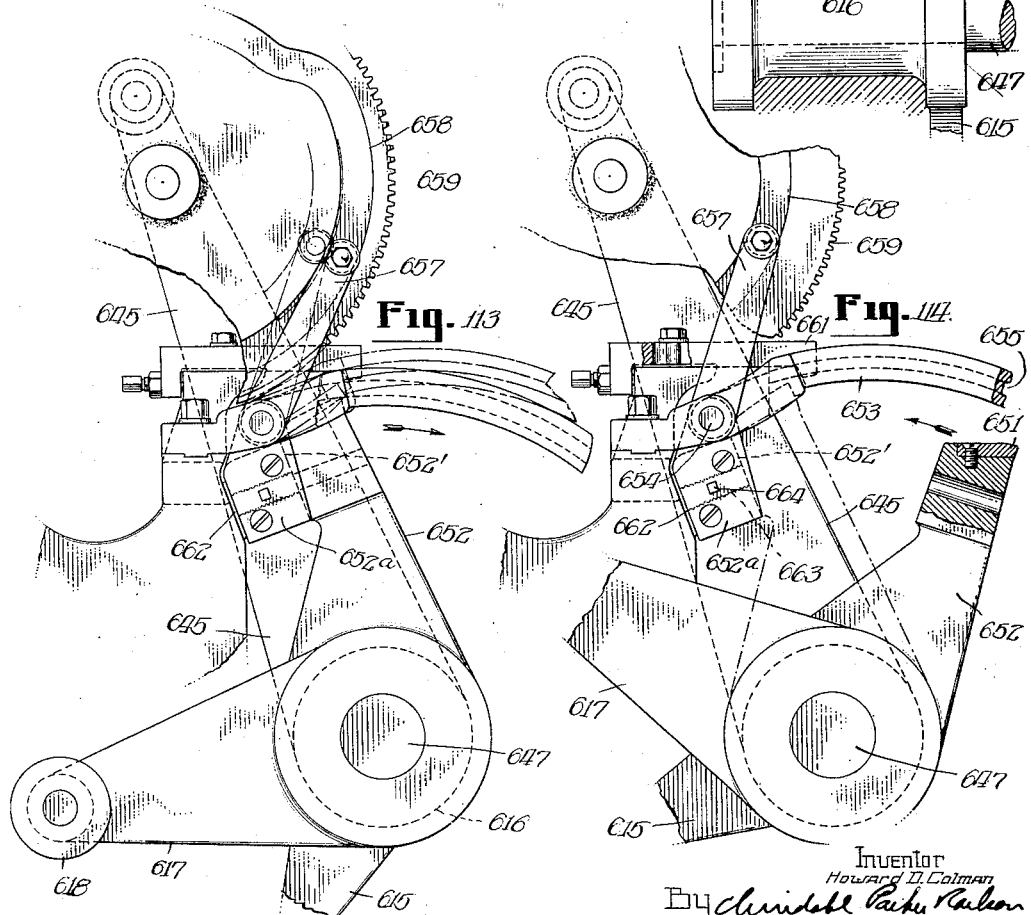
Fig. 113
Fig. 114
Inventor
Howard D. Colman
By
Attorneys Sept. 2, 1930.   H. D. COLMAN   1,774,591
LACING MACHINE AND METHOD OF LACING SKEINS
Original Filed April 30, 1926   40 Sheets-Sheet 39
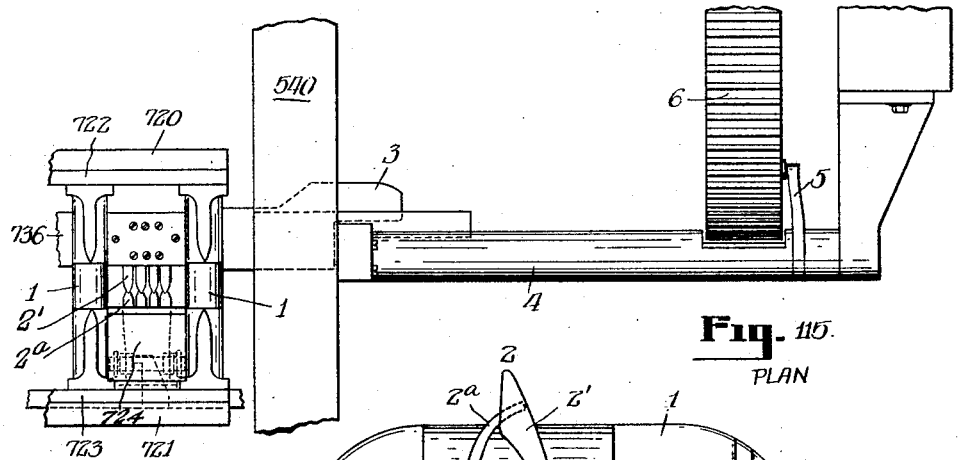
Fig. 115.
PLAN
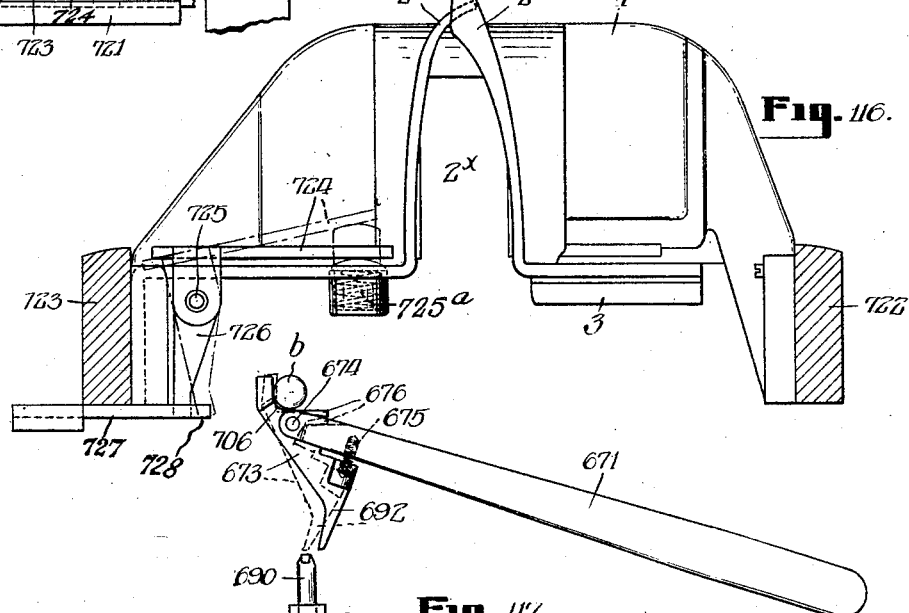
Fig. 116.
Fig. 117.
Fig. 118.
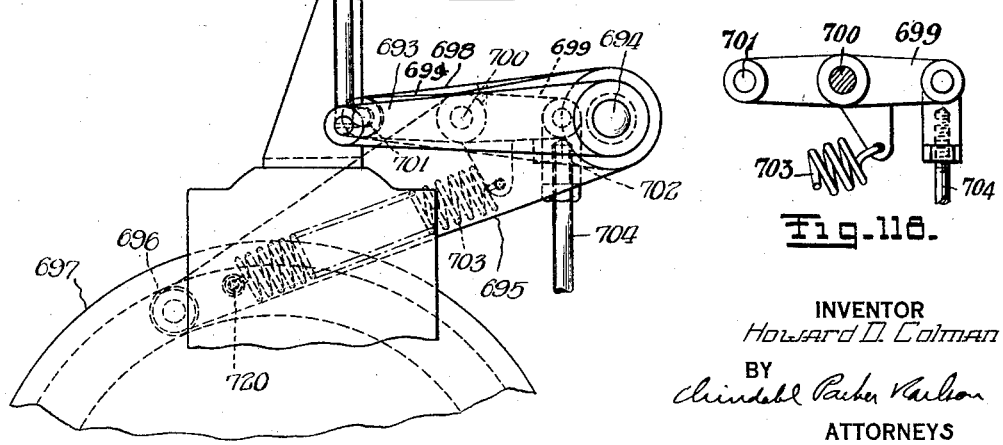
INVENTOR
Howard D. Colman
BY
*Chindahl Parker Carlson*
ATTORNEYS Sept. 2, 1930. H. D. COLMAN 1,774,591
LACING MACHINE AND METHOD OF LACING SKEINS
Original Filed April 30, 1926  40 Sheets-Sheet 40
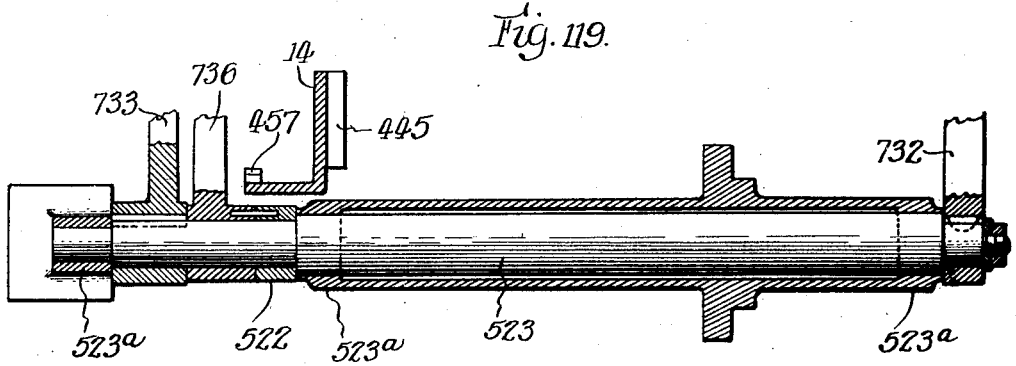
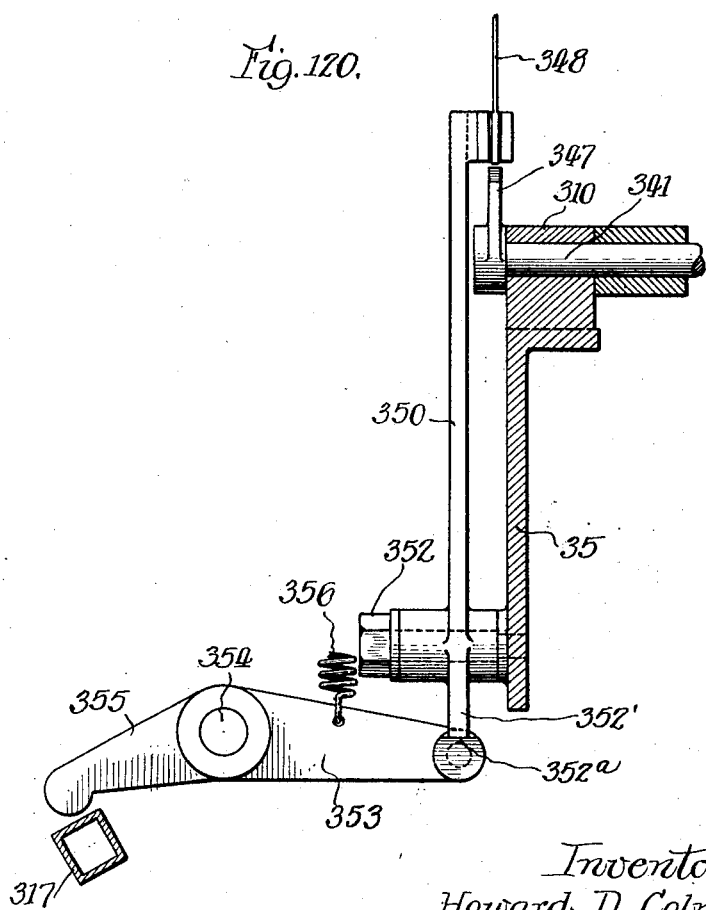
Inventor:
Howard D. Colman, Patented Sept. 2, 1930

1,774,591

UNITED STATES PATENT OFFICE

HOWARD D. COLMAN, OF ROCKFORD, ILLINOIS, ASSIGNOR TO BARBER-COLMAN COMPANY, OF ROCKFORD, ILLINOIS, A CORPORATION OF ILLINOIS

LACING MACHINE AND METHOD OF LACING SKEINS

Application filed April 30, 1926, Serial No. 105,684. Renewed January 9, 1929.

This invention relates to mechanisms for lacing skeins, the particular embodiment hereinafter described being adapted for lacing skeins of silk; silk as used herein meaning thrown silk, such as tram and organzine, and artificial silk, such as rayon.

Thrown silk is sometimes woven directly into cloth, but is more often wound into skeins in order that the natural gum or sericin may be boiled off, and that the yarn may be more easily handled while being dyed, bleached, weighted, lustred and graded. Rayon is also wound into skeins to facilitate dyeing, grading, and similar operations. Furthermore, silk of commerce is handled in the form of skeins.

A skein is unlike other yarn packages in that it has no supporting structure, such as a bobbin or spool. Skeins are wound upon reels or, as they are known in the art, flies, which consist of a set of parallel bars set at equidistant intervals around, and spaced away from, an axis; said axis during the reeling or winding operation being removably journaled in bearings located in a reeling machine. Skeins are usually wound in the form of a wide band in which the thread traverses from side to side as it is wound, and they are built up by laying one layer of yarn upon another until a predetermined number of yards are wound thereon. After being wound the skeins are laced; that is, a comb or the like is inserted through the skein, preferably midway between two of the parallel bars of the fly and then a cord or band is woven or laced around the sections of the skein, which are separated by the comb, in such a way that each section is completely surrounded by the lacing cord; the lacing cords preferably being inserted at ninety-degree intervals around the periphery of the skein. Therefore, since the skein has been wound with a side-to-side traverse, and since the lacing cords divide the skein into bundles that are surrounded by lacing cords which cross at points practically equidistant from the edges of the skein at all the points of lacing, it is readily apparent that if any given yarn bundle be taken at the point of lacing it will contain yarn of a different traverse from that of a corresponding bundle at other lacing points. In view of this, when the skein is stripped from the fly, which is so arranged that it may be collapsed to facilitate this operation, it will be preserved in its wound form by the lacing cords and may be readily unwound, even after rough handling, when placed upon a swift. The knot in the lacing cord is preferably tied well away from the skein so that sufficient slack is left to permit the skein to be spread out for examination and to facilitate dyeing.

While various mechanisms have been patented to accomplish the lacing of skeins of various kinds, they have not been sufficiently successful to warrant their adoption by silk manufacturers, and skeins are still laced by hand, an operation which is slow and arduous and requires skill and dexterity.

It is the primary object of this invention, therefore, to devise a practical mechanism for lacing skeins.

A subsidiary object of the invention is to produce a machine adapted to lace the skeins while they are still located on the flies upon which they are wound, and to lace all the skeins on a fly by consecutive operations of the machine, without the intervention of the operative.

Another object is to locate the fly in the machine in such a way that the likelihood of oil or other soiling matter coming in contact with the silk will be obviated.

A further object is to provide a machine in which the means for forming openings in the skein so that the lacing mechanism may be inserted, will operate without injury to the silk and perform this operation without altering either the skein or the fly.

Other and further objects will be apparent, to those skilled in the art, from the following description, and the appended claims, reference being made to the accompanying drawings wherein a preferred embodiment of the invention is illustrated.

In the drawings:

Figure 1 is an elevation of the left-hand end of one form of machine constructed in accordance with my invention, the loading and doffing conveyors being partly broken away.

Fig. 2 is a perspective view of the front of the machine, the doffing conveyor having been removed.

Fig. 3 is a plan view of the machine, the lacing carriage and the indexing bar being omitted.

Fig. 4 is a left side fragmental elevation of the loading conveyor.

Fig. 5 is a fragmental plan view of the chain used on the conveyors.

Fig. 7 is an elevation of the lacing carriage, looking in the same direction as in Fig. 2.

Fig. 11 is a view, partly in elevation and partly in section, of the lower part of the carriage taken in the plane of the line 11—11 of Fig. 8, some parts having been broken away.

Fig. 12 is a perspective view of the end of the carriage, looking in the opposite direction of Fig. 8.

Fig. 13 is a fragmental detail view taken in the plane of the line 13—13 of Fig. 27.

Fig. 14 is a detail view of the parts shown in Fig. 13, looking from the left-hand end of said Fig. 13.

Fig. 15 is a plan view of the shearing and clamping jaws of the passing-forward arms, in closed position.

Fig. 16 is a view of the same parts in open position.

Fig. 17 is a fragmental view of the passing-forward arms and the looper clamp.

Fig. 21 is a front view of the lower end of the parts shown in Fig. 18.

Fig. 22 is a sectional view taken on the line 22—22 of Fig. 23.

Fig. 23 is a sectional detail view taken on the line 23—23 of Fig. 24.

Fig. 24 is a perspective view of an adjustable cam used in connection with the looper clamp and passing forward arms.

Fig. 32 is a view, partly in elevation and partly in section, of the upper part of the carriage, showing the means used to convey the lacing cord around the skein.

Fig. 33 is a view on an enlarged scale looking from the right-hand end of Fig. 32.

Fig. 34 is a plan view of one of the chains used to draw the lacing cord around the skein.

Fig. 35 is a sectional view taken on the line 35—35 of Fig. 34.

Fig. 36 is a view taken in the plane of the line 36—36 of Fig. 32.

Fig. 42 is a transverse view, partly in elevation and partly in section, of the skein-spacing and piercing means and the means for closing the conduit blocks that guide the chains around the skein.

Fig. 43 is a view similar to Fig. 42, showing the parts in another position.

Fig. 44 is a fragmental elevational view showing the relative distance moved by the conduit blocks.

Fig. 45 is a plan view of the knotting mechanism used on the machine and the means herein employed to deliver the lacing cord thereto from the chains.

Fig. 46 is a fragmental plan view of the knot-tying mechanism, some parts having been broken away.

Fig. 47 is a side elevation of the knotter and

Fig. 48 is a similar view looking in the opposite direction.

Fig. 49 is an elevation looking from the left-hand side of Fig. 47.

Figs. 50, 51, and 52 are perspective views illustrating the action of the tying bill of the knot-tying mechanism.

Fig. 53 is a perspective view illustrating a guard plate that prevents the end of the lacing from becoming ensnarled after the knot has been tied and the carriage is progressing to a new position.

Fig. 54 is a sectional view of the knot-tying mechanism taken in the plane of the line 54—54 of Fig. 49.

Fig. 55 is a side elevation of the knot-tying mechanism and adjacent parts.

Fig. 56 is a detail view of a clamp arrangement used on the knotter.

Fig. 57 is a front view of the knotter and adjacent parts.

Fig. 58 is a detail view of another clamp arrangement used on the knot-tying mechanism.

Fig. 59 is a perspective view of a section of the carriage, looking in the opposite direction of Fig. 2.

Figure 6:
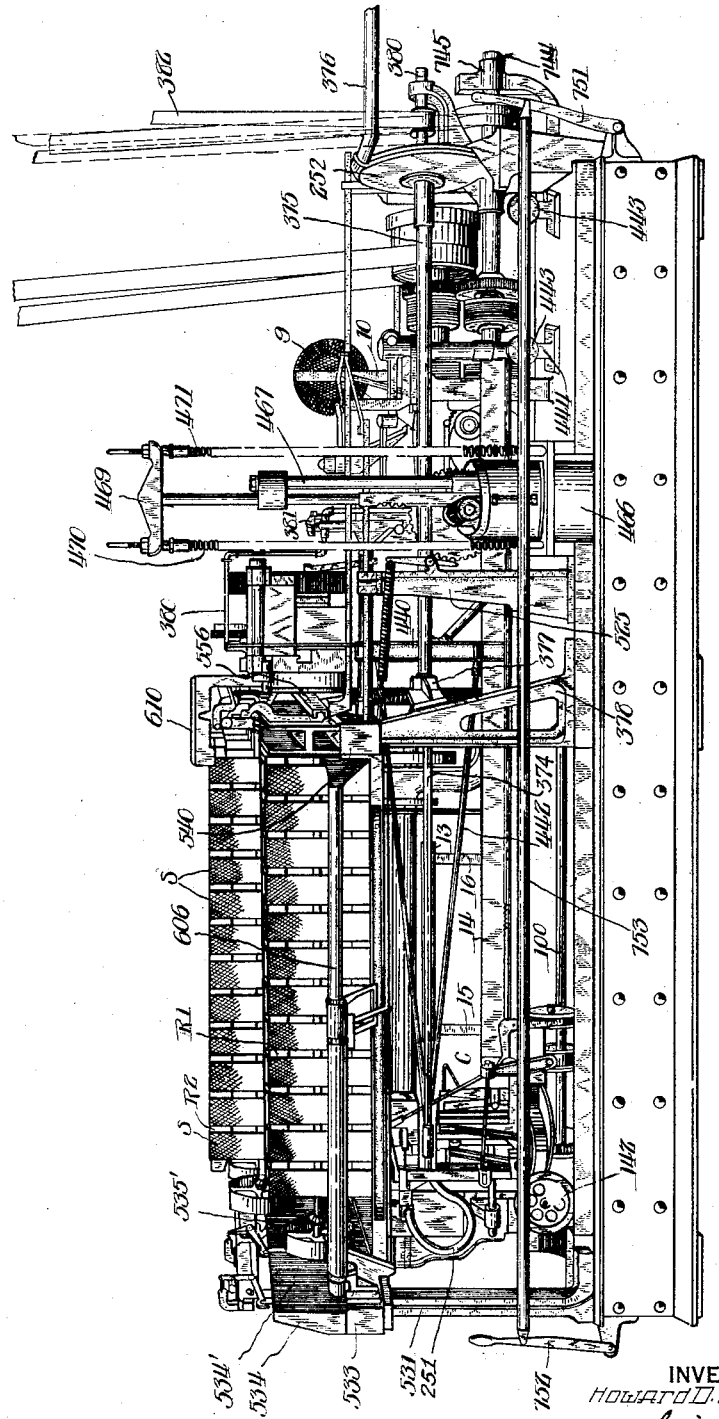
Fig. 6 is a detail view of a tension device used on the lacing cord supply.
Figure 8:
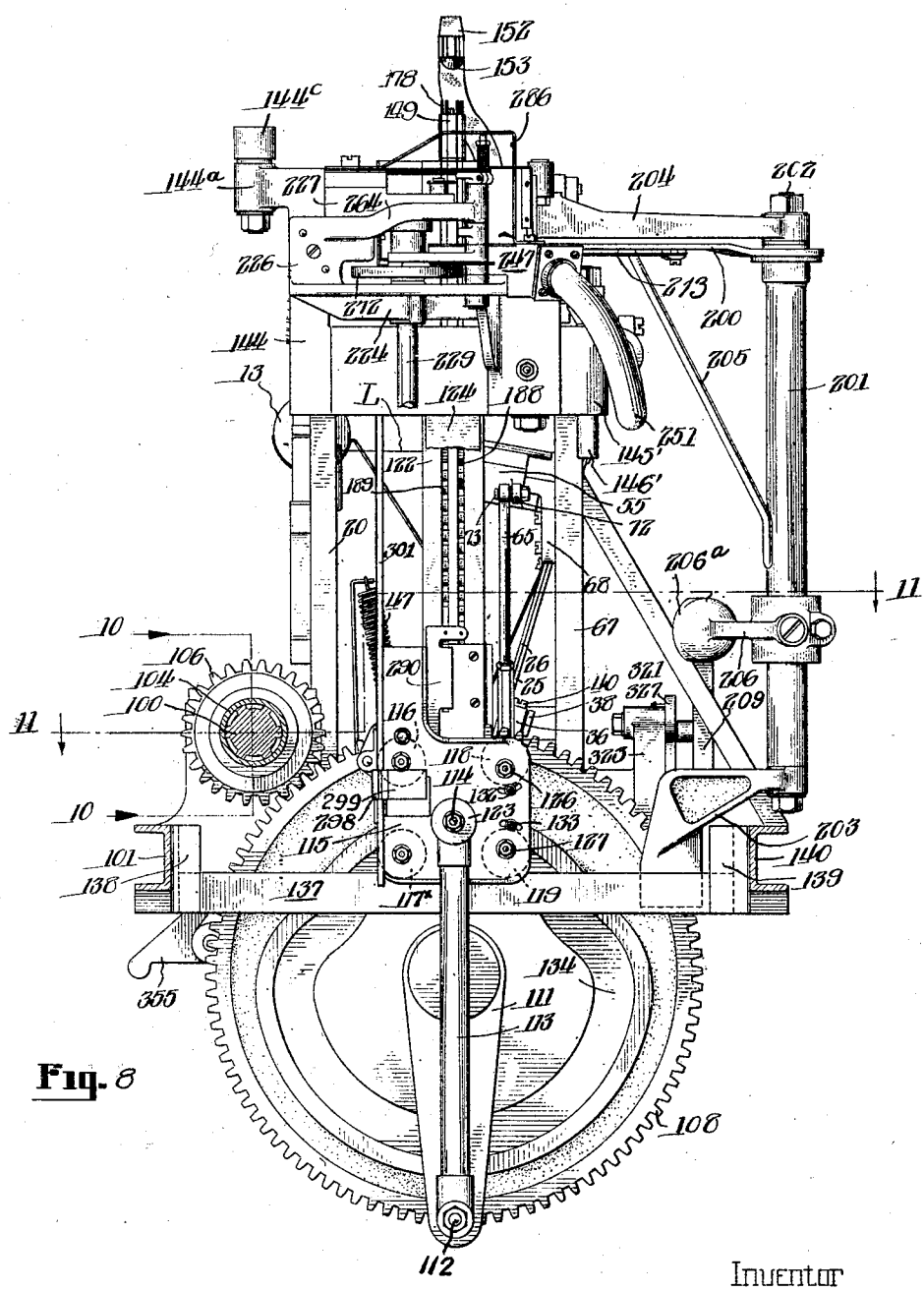
Fig. 8 is an elevation of the left-hand end of the carriage, looking in the same direction as in Fig. 1.

Fig. 60 is a fragmental view of the chain-driving mechanism looking in the same direction as Fig. 8, showing the safety mechanism used in connection with the chains in closed position.

Fig. 61 is a view, looking in the opposite direction of Fig. 60, showing the safety mechanism in open position.

Fig. 62 is a fragmental view of the chain safety mechanism as illustrated in Fig. 60.

Fig. 63 is a fragmental view looking from the left-hand side of Fig. 62.

Fig. 64 is an elevational view of the entire safety mechanism.

Fig. 65 is a plan view of the parts shown in the lower portion of Fig. 64.

Fig. 66 is a plan view of the parts shown in Fig. 63.

Fig. 67 is a view looking from the lower side of Fig. 65.

Fig. 68 is a view, partially in elevation and partially in section, of a safety mechanism used on the carriage and the stopping mechanism cooperating therewith.

Fig. 69 is a perspective view illustrating the need for the safety mechanism depicted in Fig. 68.

Fig. 70 is a fragmental view showing the cam and follower that drive the passing-in arms, said parts constituting the safety mechanism illustrated in Fig. 68, the safety latch being released.

Fig. 71 is a sectional view taken on the line 71—71 of Fig. 70.

Fig. 72 is a detail view of a weight arrangement used in connection with the mechanism illustrated in Fig. 73.

Fig. 73 is an end view of the lower part of the carriage and depicts a certain latching arrangement.

Fig. 74 is a view similar to Fig. 73, showing another position of the parts represented therein.

Fig. 75 is a detail view of the mechanism provided to actuate the latch arrangement illustrated in Fig. 73.

Fig. 76 is a perspective detail view of the latching members.

Fig. 77 is a plan view of the air supply system used on the machine, the view being shortened by breaking away various parts and relatively displacing portions of the view.

Fig. 77ª is a view of an arrangement used on the safety shaft.

Fig. 78 is a detail view of the means used to remove lint from the conduit blocks.

Fig. 79 is a sectional view taken in the plane of the line 79—79 of Fig. 78.

Fig. 80 is a fragmental plan view of the means used to remove waste ends from the knotting mechanism.

Figure 81:
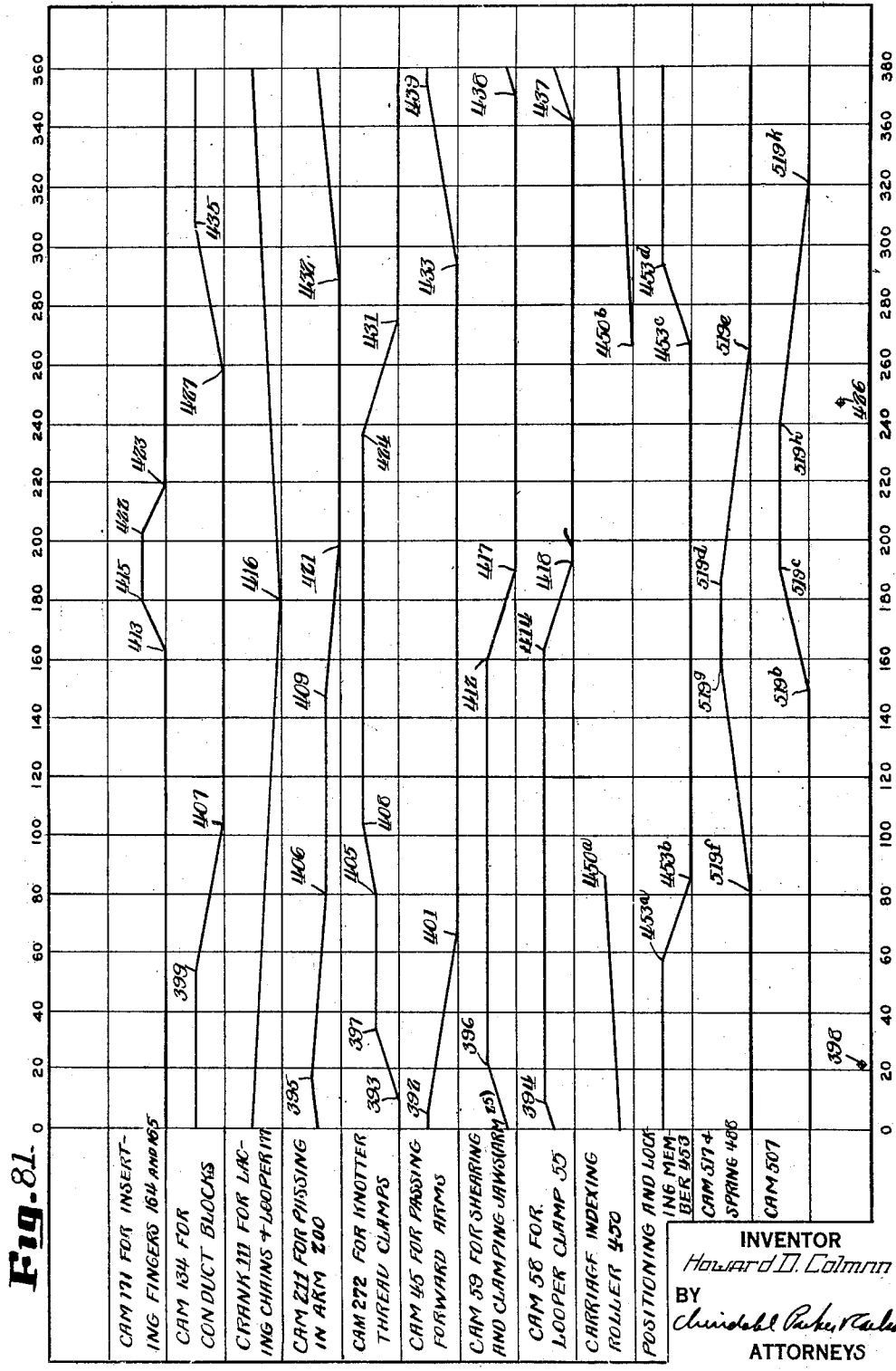

Fig. 81 is a cam time chart for the carriage.

Figure 82:
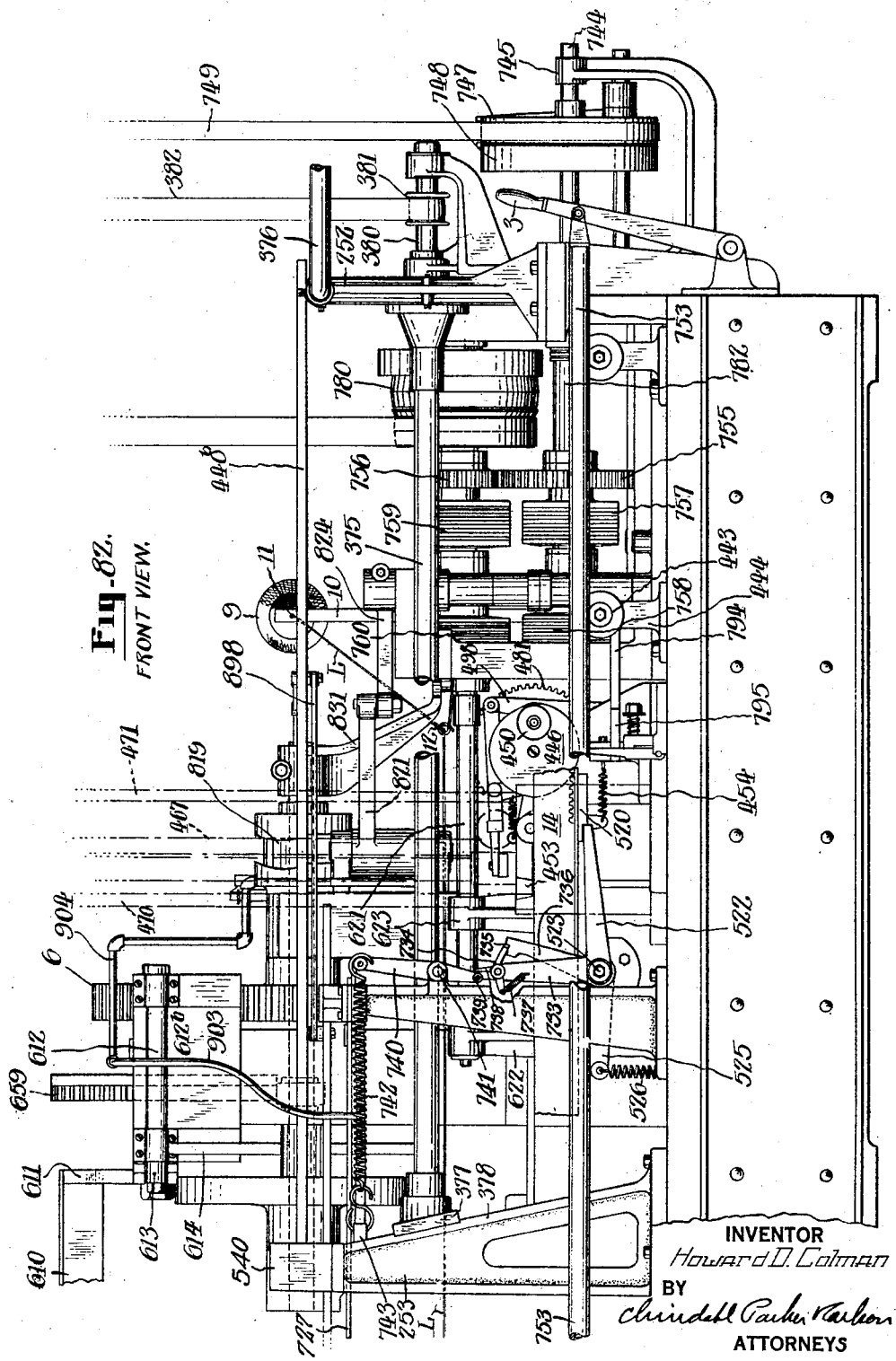

Fig. 82 is a front view of the power supply mechanism of the machine.

Figure 83:
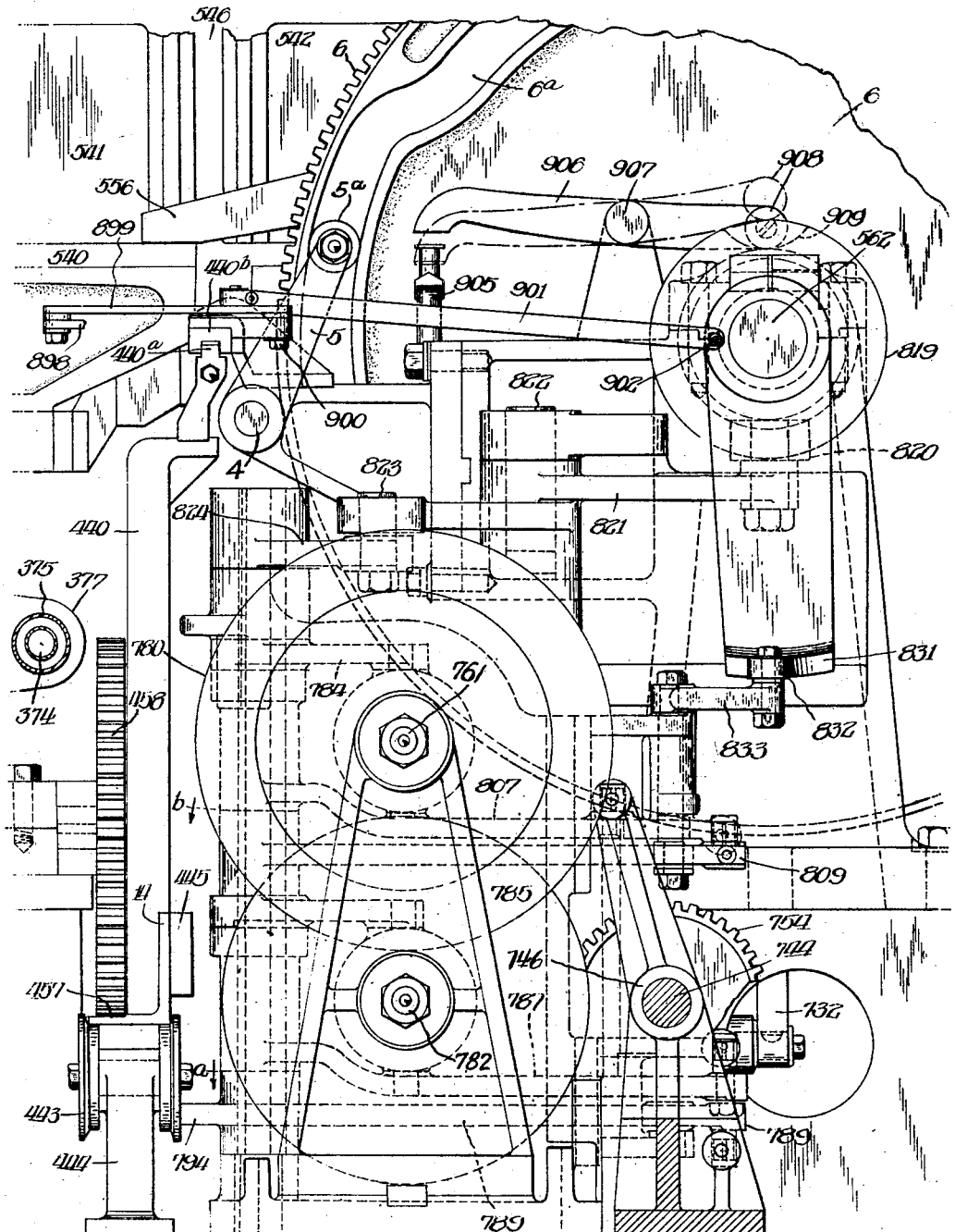

Fig. 83 is a view looking from the right-hand end of Fig. 82 with certain parts sectioned off.

Fig. 84 is a plan view of the parts shown in Fig. 82.

Figs. 84ª and 84ᵇ are sections on lines $a$ and $b$, respectively, of Fig. 83.

Fig. 85 is a view from the rear side of the machine looking at the parts shown in Fig. 86.

Fig. 86 is a plan view of the carriage indexing mechanism, the reader being at the rear side of the machine.

Fig. 87 is a view, partly in elevation and partly in section, of the means used to return the carriage.

Fig. 88 is a view of the carriage-indexing mechanism looking from the rear side of the machine.

Fig. 89 is a fragmental view of another part of the carriage-indexing mechanism looking in the opposite direction from that of Fig. 88.

Fig. 90 is a view of another part of the carriage-indexing mechanism.

Fig. 91 is a fragmental front view of the carriage-indexing bar.

Fig. 91ª is a fragmental rear view of said bar.

Fig. 92 is a fragmental view of a latching arrangement which utilizes a camming action, showing the parts in closed position, and Fig. 93 is a similar view showing the parts in open position.

Fig. 94 is a sectional view taken in the plane of the line 94 of Fig. 84.

Figs. 95, 96, and 97 are views of the lever system used to control the action of the carriage, and Figs. 98, 99, and 100 are similar views of the levers used to control the fly-handling mechanism. Fig. 98ª is a fragmental view of the other side of said levers.

Fig. 101 is a plan view of a section of the machine, chiefly depicting the fly-handling mechanism, the skein-spacing and piercing means being omitted.

Fig. 102 is a view looking from the right-hand end of Fig. 101. Fig. 102ª is a plan view of a safety arrangement.

Fig. 103 is a view similar to Fig. 102, some parts being in a different position and some parts being broken away.

Fig. 104 is a partially diagrammatic view from the rear side of the machine, showing the means by which the flys are guided as they travel into the machine.

Fig. 105 is a transverse vertical sectional view.

Fig. 106 is a view looking from the left-hand end of Fig. 101.

Figure 107:
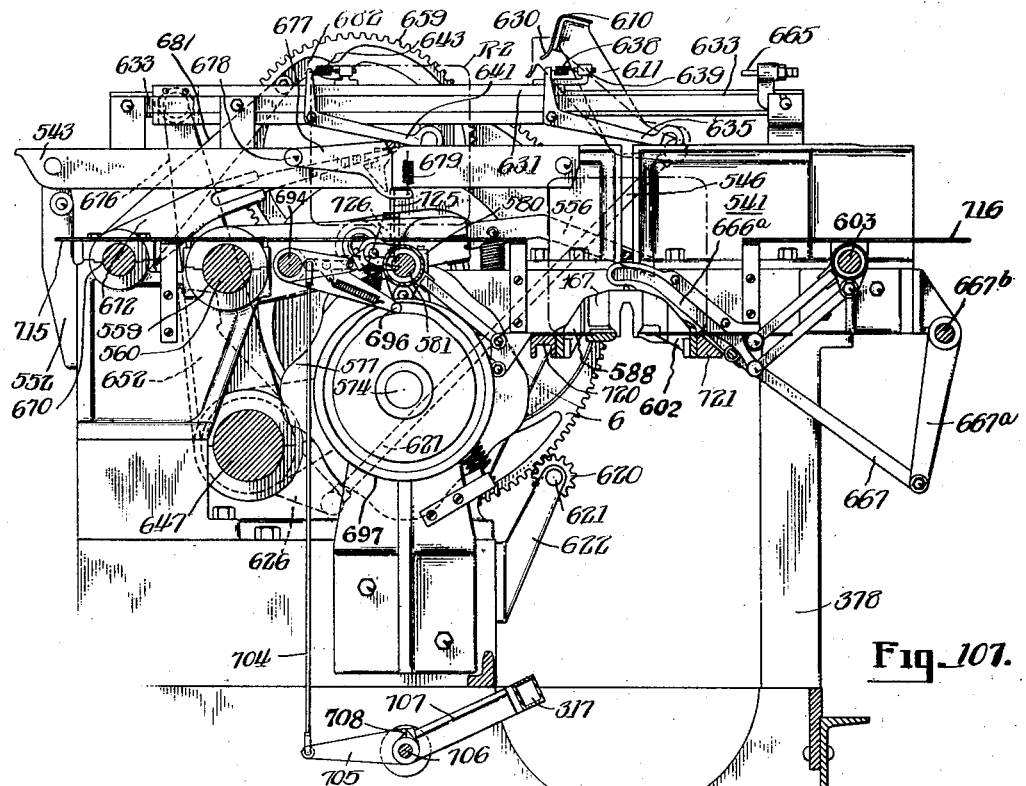

Fig. 107 is a view similar to Fig. 105.

Figure 108:
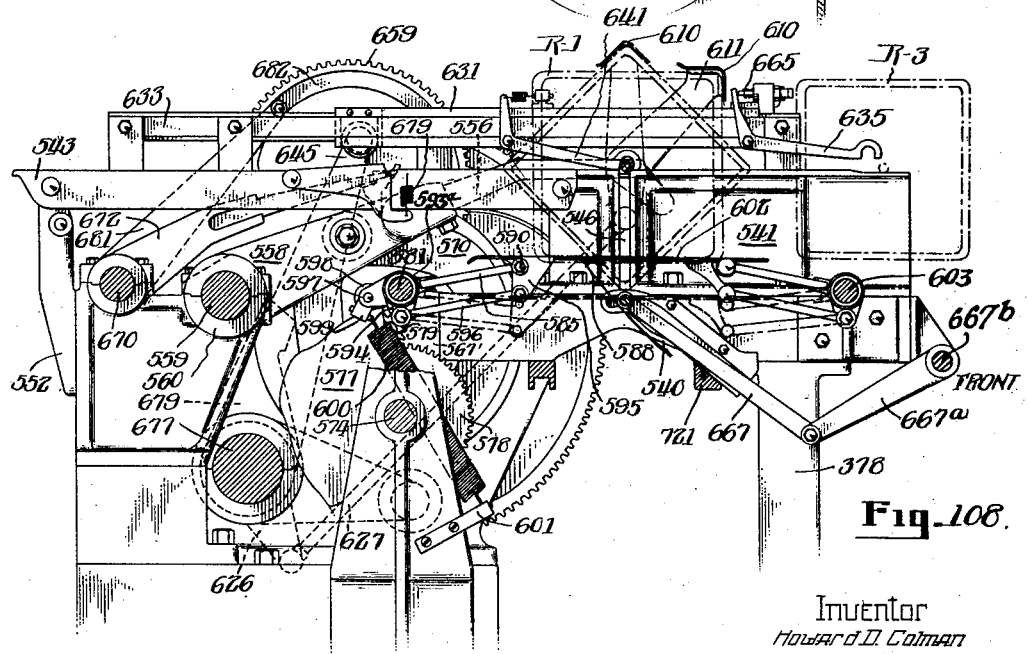

Fig. 108 is a view similar to Fig. 107, the parts being shown in another position.

Figure 109:
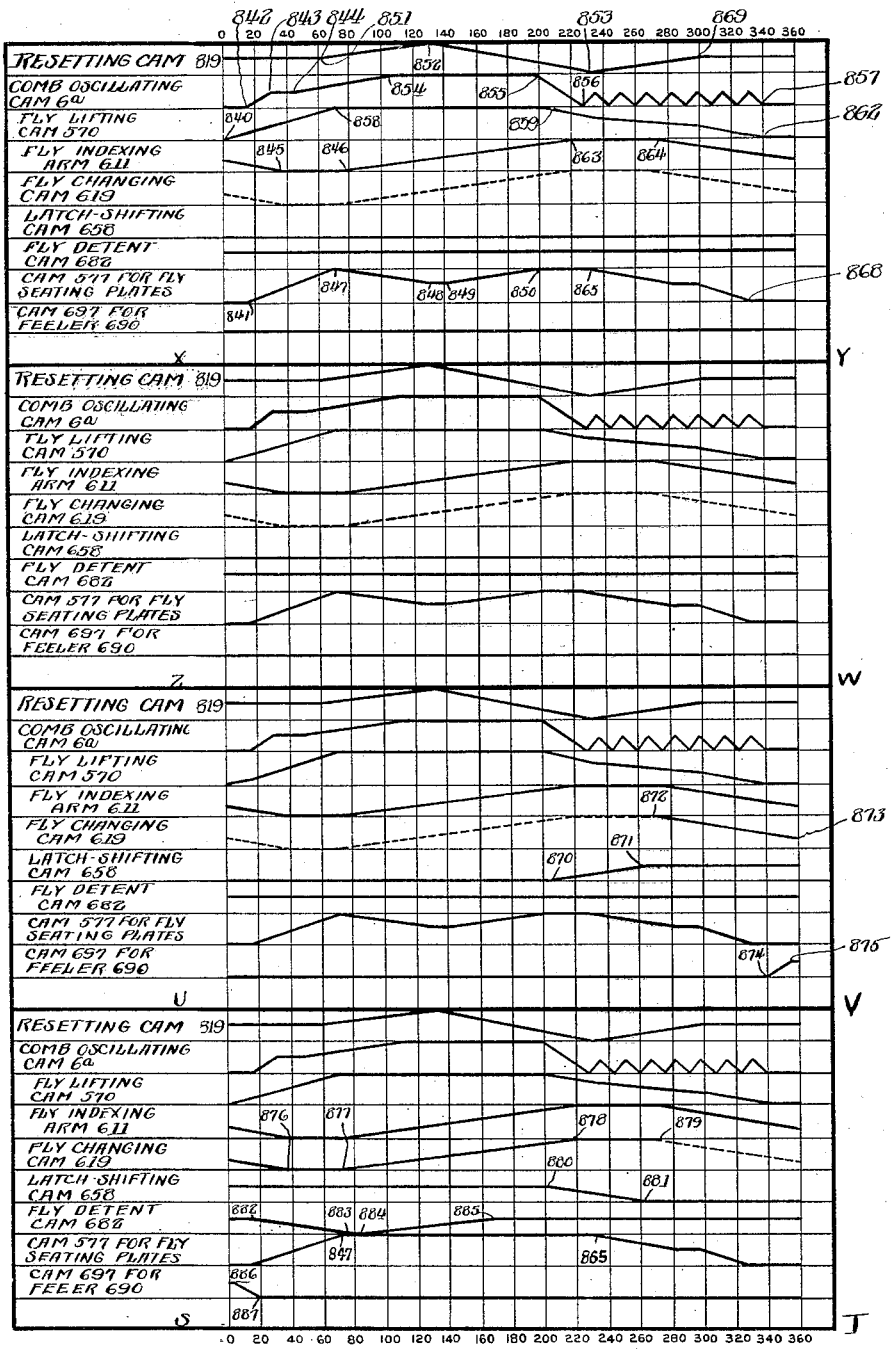

Fig. 109 contains the time tables for the cams of the fly-handling mechanism.

Fig. 110 is a partially diagrammatic view depicting a mechanism used to lessen the likelihood of a tied lacing becoming ensnarled in the comb during the fly-changing operation.

Fig. 111 is a plan view of the parts shown in Figs. 113 and 114.

Fig. 112 is a fragmentary view looking from the right-hand side of the mechanism shown in the lower part of Figs. 113 and 114.

Fig. 113 is a view of the latching mechanism used during the fly-changing operation.

Fig. 114 is a similar view of the same parts in a different position.

Fig. 115 is a plan view of the comb mechanisms.

Fig. 116 is an end elevation of the last comb structure looking from the right in Fig. 115.

Fig. 117 is a view, on an enlarged scale, of one of the fly detaining members, and a safety apparatus used in connection therewith.

Fig. 118 is a detail view of the lever 699 comprised in said safety apparatus.

Fig. 119 is a sectional view on the axis of the shaft 523.

Fig. 120 is a detail view of a means for stopping the machine in case of exhaustion of the lacing supply.

The form of fly R (Fig. 1) herein shown comprises a plurality of sets of arms $a$ radiating from a central shaft $b$ (Fig. 104) and carrying four bars $c$ on which the skeins S are wound. Near one end of the shaft $b$ is a measuring worm $d$ (Fig. 104), and near the opposite end is a driving pulley $e$.

While the particular embodiment of my invention as herein described is adapted to operate upon a four-sided fly having twelve skeins wound thereon, it is to be understood that this is in no way a limitation of my invention for, by making certain mechanical changes, the mechanism may be adapted so as to operate upon a fly of any number of sides and skeins.

The skeins are wound on the flies in a winding or reeling machine so constructed that the skeins are wound in practically the same relative positions on the different flies. Due to this fixed relative positioning, it is possible to provide a skein-piercing means that will divide the skeins into practically equal bundles by merely positioning the flies in the same location in the machine. The fly-guiding means is so constructed that it provides for variations in the size of the flies and yet guides them so that the skeins of the various flies are alined with the piercing means in congruent positions.

Figure 37:
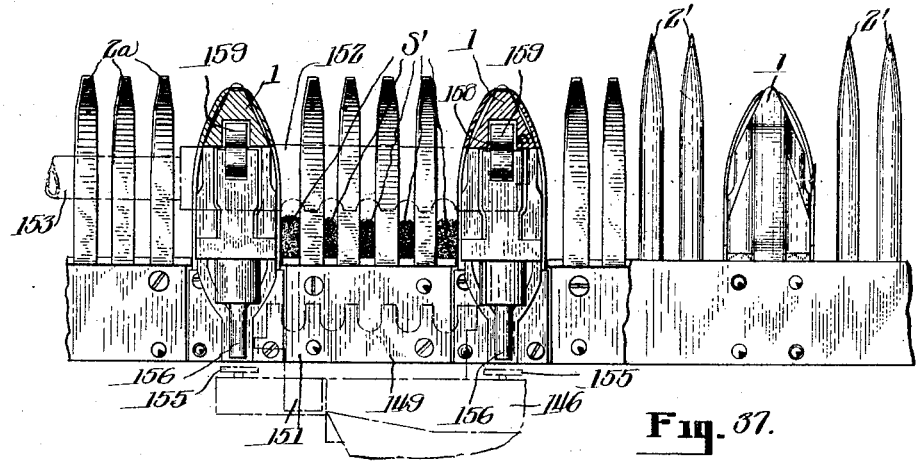
Fig. 37 is a view, partly in elevation and partly in section, of the skein spacing and piercing means, said view being taken so as to be looking in the opposite direction of Fig. 2.
Figure 38:
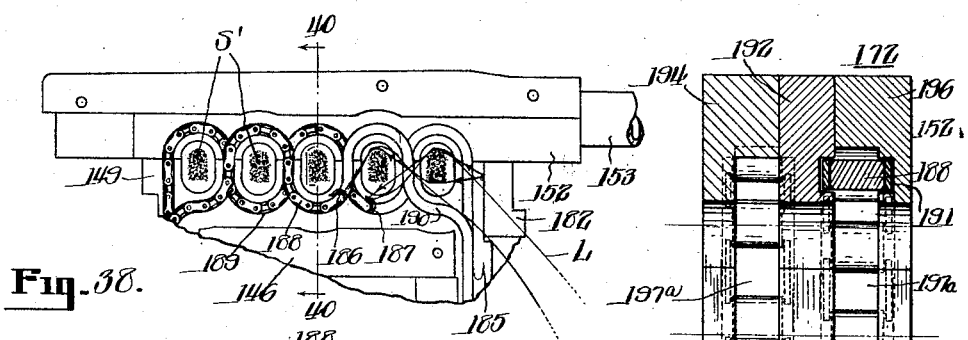
Fig. 38 is a partially diagrammatic view illustrating the manner in which the chains draw the lacing cord around the bundles of silk into which the skein has been divided by the skein-piercing means.
Figure 41:
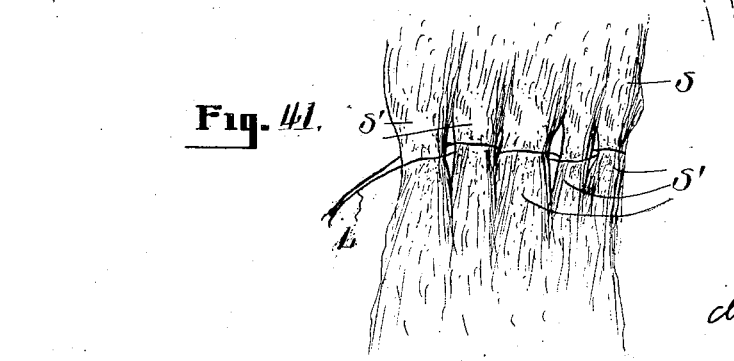
Fig. 41 is a fragmental perspective view of the laced skein after it has been stripped from the fly.

In the operation of the machine the flies carrying the unlaced skeins are placed upon a loading conveyor and are carried into the machine wherein means is provided for lowering the fly so as to pass the lower side of each skein down over the skein comb or skein spacing and piercing means, said piercing means acting to divide the skein into five bundles S' (Figs. 37, 38 and 41). When the fly is properly seated the lacing means comes into position under the first skein and after lacing it, it progresses step by step across the machine until all twelve skeins have been laced, whereupon means act to raise the fly out of engagement with the comb and to index or turn the fly so that an unlaced side will be in position to be lowered onto the comb, after which it is laced by the lacing means, which after the fly is properly seated, returns to its position below the first skein; and when all the sides have been laced the fly is expelled out upon a doffing conveyor and the succeeding fly positioned for lacing.

Referring to Figs. 1 and 2:

The flies R are carried by the loading conveyor toward the machine, the fly R—2 being retained by detents, to be described hereinafter, in readiness to be placed in the lacing position, shown as being occupied by fly R—1. In Fig. 2 the carriage C that supports the lacing mechanism is shown in position so as to be in readiness to lace the third skein on the fly R—1. The fly R—3 has been laced and expelled out upon the doffing conveyor.

The comb comprises a series of skein spacers 1 (Figs. 37, 115 and 116) which are arranged at intervals corresponding to the spaces between the skeins on the fly. In each skein-spacer is an opening 1ª (Figs. 42 and 43). Interposed between the skein-spacers 1 are groups of comb teeth or skein-piercers 2 (Fig. 116). Each of the skein-piercers 2 comprises a hood 2' and a stationary member 2ª the tip of which extends within the hood 2'. It will be seen that a space 2ˣ is provided between the members 2' and 2ª, the bases of said members being spaced apart. The hoods 2' are secured to a bar 3 which is hinged to certain of the skein-spacers. The bar 3 is attached at one end to a rock shaft 4 (Fig. 115) which has an arm 5 carrying a roller 5ª that lies in a cam groove 6ª (Fig. 83) in the side of the main gear 6. As shown in Fig. 103 the cam 6ª is provided at one place in its contour with a series of small rises and falls which cause the hoods 2' to be rapidly vibrated lengthwise of the skeins (i. e., transversely of the fly shaft). The amplitude of the vibrations is indicated in Fig. 43, wherein the full-line position of the hood represents one extreme position and the dot-dash line position the other. The vibration of the hoods occurs as the fly is traveling down and enables the comb teeth to work their way through the skeins and divide them into bundles without injuring the silk. If the points of the hoods bear directly against certain strands, the vibration causes the strands to roll off the points of the hoods, thus enabling the hoods to pass through the skein without placing excessive tension on the silk.

The means for passing a lacing cord around the bundles comprises two flexible inextensible members herein shown as consisting of chains which are guided in symmetrical wavy or tortuous passages formed in a lower conduit block and an upper conduit block hereinafter described. Said blocks are adapted to embrace the bundles of one skein after another. The upper conduit block travels through the alined spaces 1ª and 2ˣ (Figs. 43 and 116). The lower conduit block travels in the space below the series of skein-spacers and skein-piercers. Said blocks are carried by a carriage C which is arranged to travel back and forth directly beneath the series of skein-spacers 1 and skein-piercers 2. Mounted on the carriage C are various other appurtenances involved in the lacing operation, such as means for drawing the lacing across the carriage; a looper for drawing the lacing into the form of a bight and for raising it so as to be in position to be transferred to the chains which carry the lacing around the bundles; a device for knotting the ends of the lacing after it has passed around the bundles; an index bar by means of which the carriage is reciprocable; and various safety mechanisms to protect the machine in the event of failure of certain of these appurtenances. The carriage C is arranged to travel on tracks 7 and 8 (Figs. 1 and 11).

The lacing supply 9 (Figs. 2 and 3) is mounted on a bracket 10 (Figs. 3 and 82). The lacing L is passed through a tension device 11 on the bracket 10, to the pigtail guide 12 (Figs. 3 and 82), from whence it passes through the conduit 13 (Fig. 59) carried on the carriage-indexing bar 14 by the supports 15 and 16, to the tension device 17 (Fig. 7) mounted on the carriage C. The tension devices 11 and 17 serve to maintain the lacing L in a nearly taut condition as the carriage C is advanced across the machine. From the tension device 17 the lacing L passes to the pigtail guide 18 (Fig. 7) which holds it in position to be engaged by the passing-forward arms.

Both the tension device 17 and the guide 18 are carried on the support 19 which is adjustably mounted on the upright 20 (Figs. 18 and 19) of the carriage C. The support 19 is secured to the blocks 21 and 22 (Fig. 7), which are provided with the set screws 23 and 24 (Figs. 18 and 19) that serve to clamp said blocks, and thus the member 19, to the upright 20. By loosening screws 23 and 24 and sliding the blocks 21 and 22 along the upright 20, the position of the member 19 may be adjusted.

Figure 29:
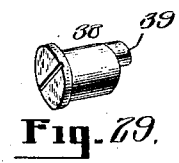
Fig. 29 is a perspective detail view of an adjusting screw used in connection with the parts in Fig. 27.
Figure 31:
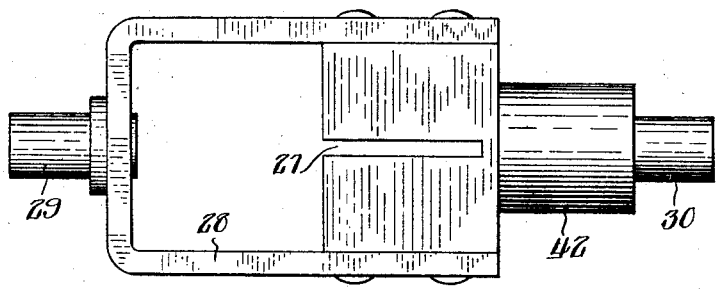
Fig. 31 is a plan view of the member that carries the passing-forward arms.

The aforementioned passing-forward arms serve to carry the lacing L across the carriage to the looper clamp so as to position the lacing for the looper which delivers it to the lacing chains. The passing-forward arms (see Fig. 18) consist of the shearing and clamping arm 25 and the clamping arm 26. The arm 26 is rigidly fastened in the slot 27 of the cradle 28 (Figs. 21 and 31). A brace 26ª is secured to the arm 26 and the cradle 28 to increase the rigidity of the passing-forward arms. The cradle 28 is provided with trunnions 29 and 30 journaled in bearing 31 and 32 (Fig. 21) which are unitary with the brackets 33 and 34, said brackets being fixed to the rectangular main casting 35 of the carriage C. Referring to Figs. 13, 14, 20, 21, and 27, wherein the passing-forward arms are illustrated, it may be seen that a block 36 is rigidly secured to the clamping arm 26. The block 36 is provided with an aperture having a cooperating slot 37, and into the aperture an adjusting member 38 (Fig. 29) is fitted. Member 38 is provided with an eccentric annular boss 39, and the member 25 has an aperture to receive said boss. A clamping screw 40 (Fig. 20) is passed through the block 36 in such a manner that it compresses the slot 37 and thus clamps member 38 in position. The arm 26 is provided with a laterally extending boss 41 that serves to retain the shearing arm 25 against the block 36, said arm 25 being pivoted on the eccentric boss 39 of the screw 38. Therefore, by loosening screw 40 and turning member 38, the distance between the members 25 and 26 may be varied, due to the eccentricity of boss 39. This changes the position of arm 25 with respect to arm 26 for a purpose to be brought forth hereinafter.

The cradle 28 is provided with an annular shoulder 42 (Fig. 31) upon which cam follower arm 43 (Fig. 21) is clamped. The cam follower arm 43 carries a roller 44 that rides on the peripheral cam 45 (Fig. 18) which is keyed to the shaft 46 (Fig. 21); and a spring 47 (Fig. 18) acts to force the roller 44 against the periphery of the cam. The shaft 46 is the one through which all of the mechanisms on the carriage are driven, with the exception of the knotting mechanism.

Figure 30:
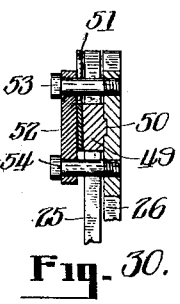
Fig. 30 is a sectional view taken in the plane of the line 30—30 of Fig. 17.

On the upper end of the arm 26 is mounted the shearing and clamping jaw assembly, illustrated in Figs. 15, 16, 17, 18, 20, 25, 26, and 30. Referring to Fig. 30 it may be seen that a spacing member 49 is fitted to the member 26 by the tongue-and-groove connection 50. A shear blade 51 is clamped against the spacing member 49 by a clamping block 52 secured to the member 26 by screws 53 and 54. This construction is provided in order that the blade 51 may be adjusted laterally so that the time at which the lacing L is severed may be changed and thus permit variation in the length of the lacing. $51^a$ (Fig. 15) is a shearing edge on the blade 51 which coacts with a shearing edge $51^b$ on the arm 25. On the arm 26 is a rounded clamping edge $51^c$ coacting with the adjacent side of the jaw of the arm 25 to clamp the end of the lacing cord L.

When the cam 45 acts through its follower arm 43 to reciprocate the passing-forward arms from the dot-dash position in Fig. 12 to the full-line position of the same figure, the lacing L is drawn across the carriage, from the pigtail guide 18 through the jaws 56 and 57 (Fig. 17) of the looper clamp 55, said jaws opening far enough to permit the shearing and clamping jaws of the passing-forward arms to pass, as depicted in Fig. 17; and during this travel across the carriage the lacing L is held clamped between the jaws of arms 25 and 26 and in the manner shown in Fig. 15. When the shearing and clamping jaws have reached the position illustrated in Fig. 25 the shaft 46 will have rotated sufficiently to operate the cams 58 and 59 (Fig. 21) and the mechanisms controlled thereby. Cam 58 controls the looper clamp, while cam 59 actuates the arm 25 so that it functions to clamp the lacing. A roller 60 follows in the groove of cam 58 and is carried by an arm 61, which is pivoted at 62 in the framework of the carriage C. The arm 61 has an extension 64 to which a link 65 is pivoted at 66, said link extending up to the looper clamp 55 (Figs. 17 and 18).

The means whereby the cam 59 actuates the arm 25 comprises a roller $66^a$ running in said cam and mounted on an arm $66^b$ which is pivoted at $66^c$ in the framework of the carriage C. Rigid with the arm $66^b$ is an arm $66^d$ that bears against the arm 25 at about the axis of the oscillatory structure 25, 26, $26^a$ and 28. It will be seen that the oscillation of said structure does not separate the arms 25 and $66^d$. A contractile spring $66^e$ normally holds the arm 25 against the arm $66^d$.

Figures 18, 19, 20:
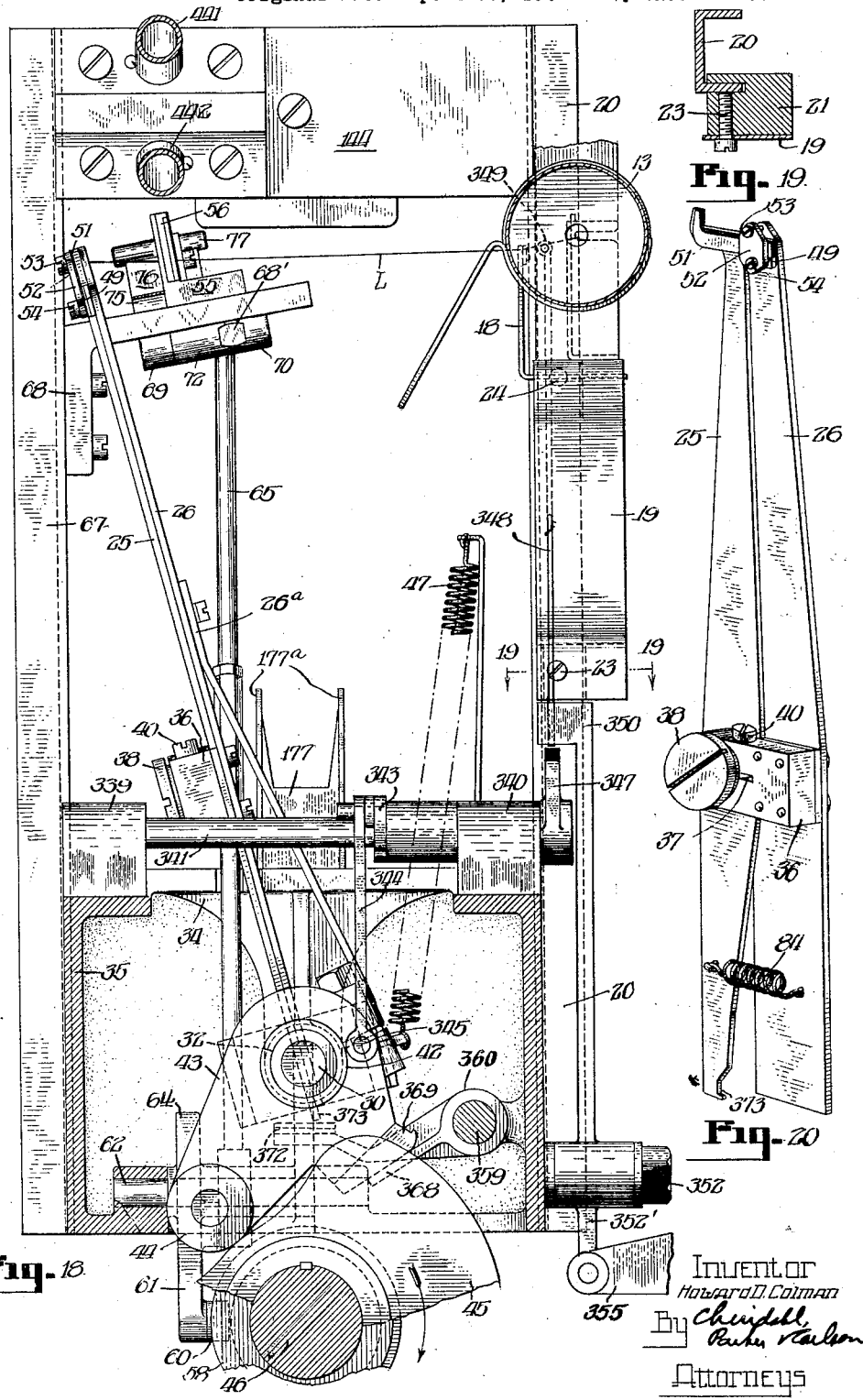
Fig. 18 is a fragmental view looking in the same direction as in Fig. 12, showing the relation of the passing-forward arms, the looper clamp, and the looper.
Fig. 19 is a sectional detail view taken on the line 19—19 of Fig. 18.
Fig. 20 is a perspective detail view of the passing-forward arms.
Figure 25:
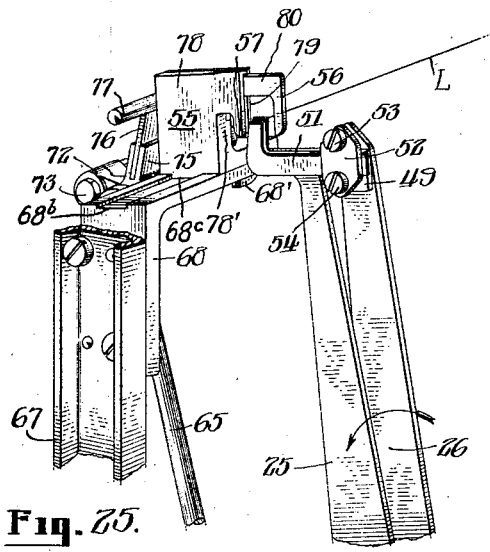
Fig. 25 is a perspective view of one position of the passing-forward arms and the looper clamp.
Figure 26:
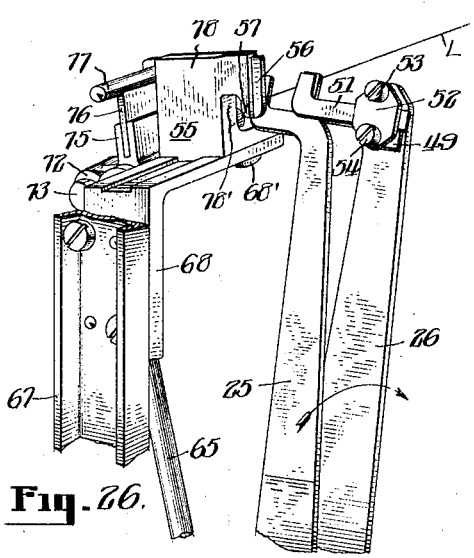
Fig. 26 is a view similar to Fig. 25, showing the parts in another position.
Figure 27:
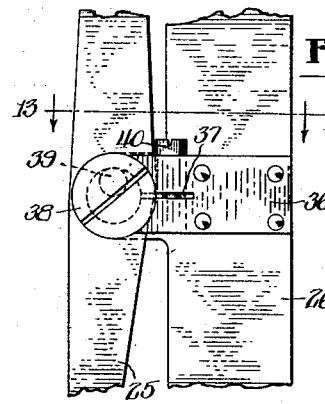
Fig. 27 is a front elevation of the parts shown in Fig. 13.
Figure 28:
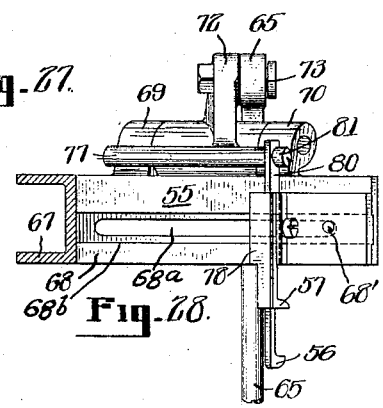
Fig. 28 is a plan view of the looper clamp.

Referring to Fig. 18, it may be seen that an upright 67 is provided on the main casting 35, similar to and oppositely disposed from the upright 20. A bracket 68 is secured to the upright 67 near its upper end, and the looper clamp 55 is mounted on the bracket 68; said bracket 68 having a slot $68^a$ (Fig. 28) and a groove $68^b$, and the looper clamp having a cooperating tongue $68^c$ which is slidable in the groove to provide adjustment, (see Figs. 25 and 28). The looper clamp may be securely fastened to the bracket 68 by means of a set screw 68' (Fig. 18). In bearings 69 and 70 on the bracket 68 is pivoted a crank arm 72 to which the link 65 is pivotally attached at 73. Unitary with the crank arm 72 and extended upwardly therefrom, so as to be nearly at right angles therewith, is a projection 75 (Fig. 17) having a slot in which a member 76, which is provided at its upper end with a rounded bar 77, is securely clamped. The main body portion 78 of the looper clamp 55 has a slot 79 containing a slide 80. The latter is provided at its rear with a slot 81 into which the rounded boss 77 is fitted in the manner shown in Figs. 17 and 28. The slide 80 carries the movable clamping jaw 56. The two cooperating stationary jaws 57 (Figs. 17, 25 and 28) are carried by the clamp body 78. Referring to Fig. 17, wherein both open and closed positions of the looper clamp are shown, it may be seen that reciprocation of the link 65 will move the jaw 56 and thus open and close the looper clamp.

As has been stated, the looper clamp 55 is opened sufficiently to allow the passage of the shearing and clamping jaws of the passing-forward arms between the jaws 56 and 57. When said arms arrive in the position shown in Fig. 25 the cam 58 acts through the previously described mechanism to close the looper clamp 55 and thus clamp the lacing L. At this same time the cam 59 (Fig. 21) acts through its follower arm $66^b$, to allow the contractile spring $66^e$ to swing the arm 25 away from the arm 26 and thus release the lacing L. The jaw of the arm 25 separates sufficiently from the jaws on the arm 26 to create an opening therebetween great enough to allow the passing-forward arms to swing back past the closed looper clamp 55, in the manner shown in Figs. 17 and 26, the jaw on the arm 25 passing through the space 78' between the main body portion 78 and the stationary jaws 57. Since the lacing L is clamped at one end in the looper clamp 55 and guided at the opposite end by the pigtail guide 18, and held taut by the tension device 17, the open passing-forward arms will swing back across the machine, the lacing extending between the open jaws of the said arms, as shown in Fig. 16. At a predetermined time after the arms arrive in the dot-dash position of Fig. 12, the cam 59 acts through the previously described mechanism to close the shearing and clamping jaws on said arms, thus severing the portion of the lacing L that extends to the looper clamp, and clamping the portion of the lacing L that extends to the supply 9.

It is apparent that the arm 25 must open to the proper extent or it would not pass through the space 78'. Therefore, the previously described adjustment, provided by the adjusting member 38, is used to control the extent of such opening movement.

It is sometimes desirable to vary the length of the lacing. This may be done by changing the time at which the looper clamp 55 opens (this time being controlled by the adjustable cam 58), or by varying the position of the shear blade 51. As has been described, the blade 51 is clamped between the clamping block 52 and the spacing member 49.

It is desirable that the ends of the lacing as presented to the knotter be of the same length. This result may be attained by suitably determining the points between which the passing-forward arms swing. While the length of the arc through which the passing-forward arms rock is constant, the points to which they rock may be varied by changing the position of the cradle 28 with respect to the cam follower arm 43. It is apparent that if the points to which the passing-forward arms rock be varied, the position of the pigtail guide 18 and the looper clamp 55 must also be varied.

As has been stated, the cam 58 (Fig. 21) is adjustable, that is, it is arranged so that the first and second dwell periods may be lengthened or shortened, it being apparent that if one of them is made longer the other will, of necessity, be made shorter. This, of course, varies the timing of the cam. The cam 58 is made up of two major parts 88 and 89, each of which is provided with a proportionate part of each of the two dwells. Therefore one of these contains the rise and the other the fall of the cam groove, the rise being in the adjustable member 88. The fixed member 89 is keyed to the shaft 46 by the key 90 and is provided with the annular portion 91 which completely surrounds said shaft 46. By referring to Fig. 22, it may be seen that the member 89 is positioned between the end members 88' and 88ª of the member 88, said end members having apertures through which the shaft 46 passes. In Fig. 23 the manner in which the member 88 surrounds the member 89 is shown, the plates 92, 93, 94 and 95 being provided to furnish walls for the cam groove through the space between the members. A set screw 98 secures the member 88 in position and prevents it from turning on member 89. By loosening the set screw 98 and turning the member 88 around so that the space 96 shall be located on the opposite side, or so that said space is divided proportionately between the two sides, the time at which the rise occurs may be varied.

A spline shaft 100 (Figs. 11 and 12) through which the shaft 46 is driven, extends across the machine parallel to the track 8 and is journaled at one end in a bearing in a bracket 99 (Fig. 1) forming part of the machine frame. Near its opposite end the shaft 100 is journaled in a bearing 99ª (Fig. 86) in the machine frame. The shaft 100 is driven at predetermined periods to be described hereinafter.

An arm 101 (Figs. 9, 10 and 11) secured to the casting 35 of the carriage C, carries a bearing 102 (Fig. 10) for a sleeve 104 through which the spline shaft 100 extends. The sleeve 104 reciprocates with the carriage C. To one end of the sleeve 104 is secured a collar 105 provided with splines that are adapted to travel in the keyways of the spline shaft 100 as the carriage C reciprocates. A pinion 106 is rigidly secured to the sleeve 104 by means of a collar 107, and meshes with a spur gear 108 (Fig. 8) secured to the shaft 46, as shown in Fig. 7, said shaft 46 being journaled in bearings 109 and 110 (Fig. 7) unitary with the main casting 35. Keyed to the hub of the spur gear 108 is a crank 111 (Figs. 7 and 8), provided with a stud 112 on which a link 113 is pivotally mounted. The upper end of the link 113 is pivoted at 114 to a vertically movable car 115 (Figs. 8 and 60) which reciprocates the chains that draw the lacing around the bundles of the skein. The car 115 has rollers 116, 117, 118 and 119 (Figs. 7 and 8) which travel in tracks 120 (Fig. 9) and 121 (Fig. 7) provided on the sides of a chain-guiding member 122 (Figs. 8 and 11). The pivot stud 114 (Fig. 11) has a guide roller 123 that runs in a track 125 in an upright 124.

The rollers 118 and 119 are mounted in such a manner that they may be adjusted to take up wear. In Figs. 8 and 60 it is shown that studs 126 and 127 are eccentric with respect to the rollers. By referring to Fig. 32 it may be seen that rollers 118 and 119 are mounted on studs 128 and 129, the studs 126 and 127 being unitary and eccentric with studs 128 and 129, respectively. Unitary with the studs are the bosses 130 and 131, and the clamp screws 132 and 133 are provided for securing these bosses in position. By loosening the clamp screws 132 and 133 and the nuts on studs 126 and 127 and changing the positions of the bosses 130 and 131, and thus of the rollers 118 and 119, adjustment may be made for wear.

In the side of the spur gear 108 is a cam groove 134 (Fig. 8). A roller 135 (Fig. 7), mounted on a stud 136 which is secured to the chain-guiding member 122, runs in the groove 134. Fig. 8 shows an elevation of the cam groove 134 and from this figure it may be seen that the contour of said groove is such that the member 122 is raised and lowered at predetermined periods.

To the lower end of the chain-guiding member 122 a horizontally extending guiding member 137 (Fig. 8) is rigidly secured. The ends of said member 137 are beveled as shown in Fig. 11 to slide on gibs 138 and 139 on the arms 101 and 140, respectively. The arms 101 and 140 are rigidly secured to opposite sides of the main casting 35 (this construction being best shown in Fig. 11) and carry at their ends an axle 141 provided with wheels 142 and 143 adapted to travel on the tracks 7 and 8, respectively. The upright 124 is rigidly secured to the axle 141.

Figures 9, 10:
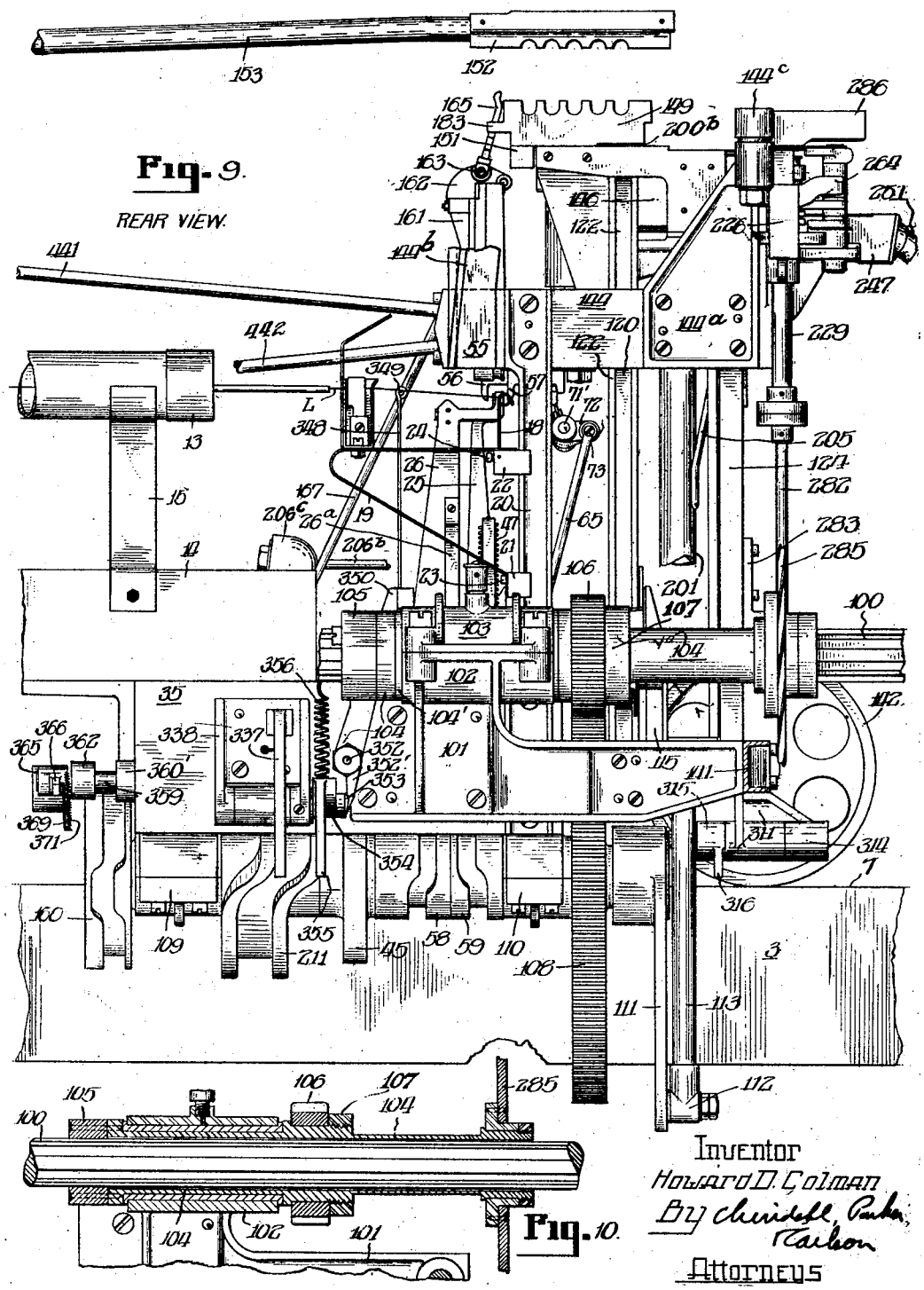
Fig. 9 is an elevation of the rear of the carriage looking in the opposite direction of Fig. 7.
Fig. 10 is a sectional view taken in the plane of the line 10—10 of Fig. 8.

The uprights or carriage-frame members 20, 67 and 124 carry at their upper ends a rectangular casting or frame member 144 (Figs. 8, 9 and 80).

As is shown in Fig. 9 brackets 144$^a$ and 144$^b$ are rigidly secured to the frame member 144, these brackets respectively carrying rollers 144$^c$ (Fig. 42) and 144$^d$ (Fig. 12) which travel in a guideway 144$^e$ (Fig. 42) formed in one of the supporting members for the skein-spacers 1. The rollers 144$^c$ and 144$^d$ aid in maintaining the carriage C rigid and in alinement as it reciprocates along the tracks 7 and 8.

To the frame member 144 is secured a guide pin 145 (Fig. 32) and a guide sleeve 145′ (Fig. 7). A slide or casting 146 rigidly secured to the vertically reciprocated member 122 has a projection 147 (Figs. 36 and 45) in which there is an aperture to receive the guide pin 145. The slide 146 also has a guide pin 146′ which slides in the sleeve 145′ (Fig. 7). Mounted on the slide 146 is the lower conduit block 149 (Figs. 32, 33 and 38). Secured to the block 149 is a member 151 (Fig. 32) which is provided with a continuation of the chain-guiding passages of said block. As shown in Figs. 38 and 44 the upper side of the lower conduit block and the lower side of the upper conduit block are recessed to accommodate the bundles of a skein. The upper conduit block 152 (Figs. 42, 43 and 44) is attached to one end of a rod 153 which is arranged to travel with the carriage C. The rod 153 is resilient and tends to lift the upper conduit block 152 away from the lower block.

Means is provided for moving the upper conduit block 152 down into engagement with the lower conduit block in the upward movement of the latter, said means comprising pressers 155 (Figs. 7, 37, 42 and 43) yieldingly supported on the slide 146 by springs 155$^a$. In Fig. 37 these pressers are shown diagrammatically in their operating positions. When the roller 135, in the cam groove 134, acts through member 122 (said member 122 being rigidly secured to the slide 146) to raise said slide and the cooperating parts just described, the pressers 155 engage pins 156 mounted in the skein-spacers 1. The upper ends of the pins 156 are arranged to bear against arms 157 pivoted at 158 in the skein-spacers 1. Rigid with the arms 157 are arms 159 arranged to depress the upper conduit block 152 into contact with the lower conduit block 149, and thus close the conduit blocks so they assume the position depicted in Fig. 32 and also shown in dotted lines in Fig. 44. Dowel pins 160 (Fig. 43) on the block 149 are adapted to engage alinement holes in the block 152, to insure positive alinement of the passageways in the two blocks when the latter are closed so as to insure free and unbinding movement of the lacing chains.

It will be evident from Figs. 37 and 42 that the skein-spacers 1 serve to house the pins 156 and arms 157 and 159 and prevent any possibility of entanglement with the silk.

Any preferred construction and arrangement may be employed to associate the lacing with the chains. The means herein employed comprises an upwardly-extending member 161 (Fig. 32) which is secured at one end of the frame casting 144 and carries a bracket 162 in which a bearing is provided. A shaft 163 (Fig. 7) is journaled in said bearing and carries at one end the lacing-inserting fingers 164 and 165 (Figs. 7, 9, 12, 35 and 36). An arm 166 (Fig. 7) secured to the opposite end of shaft 163 is connected by means of a link 167 to the arm 168 of the bell crank 169. The arm 170 of the said bell crank carries the follower of a cam 171 mounted on the shaft 46.

The cam 134 (Fig. 8) reciprocates the members 122 and 146 carrying the lower conduit block 149 through the relatively short distance required to move said conduit block in and out of operative relation to the skein. The crank 111 (Fig. 8) reciprocates the car 115 through the longer distance required to draw the lacing up to the inserting fingers. As shown in Figs. 32, 36 and 60, the car 115 is provided with an upwardly extending portion 174 to which a bracket 175 is rigidly secured, said bracket extending around the casting or slide 146. The looper 177 (Figs. 33 and 36) is rigidly secured to the bracket 175, and thus moves up and down with the car 115. The purpose of the looper 177 is to engage the lacing L, after the latter has been drawn across the carriage so as to occupy the position shown in Figs. 12 and 18, and carry it up in the form of a bight so that it will be in position to be operated upon by the inserting fingers 164 and 165 which deliver said lacing L to the lacing chains. As shown in Figs. 18 and 33, the looper comprises two arms 177$^a$ having lacing-receiving notches 177$^b$ (Fig. 32) in their upper ends, said arms being spaced apart so as to pass at opposite sides of the inserting fingers. The length of travel of the looper is indicated by full and dotted lines in Fig. 12.

After the lacing L has been clamped by the looper clamp 55, the passing-forward arms swing to the dot-dash position shown in Fig. 12 and after reaching this position remain open for a time. While the looper 177 is traveling upwardly to engage the lacing, one end of said lacing is held by the closed looper clamp 55 and the other end is positioned by the pigtail guide 18, said lacing being in a semi-taut condition, it being retained in this condition by the tension device 17, and as has been described, the arms 25 and 26 of the passing-forward arms are positioned so that the lacing is between them. As the looper 177 continues to travel upwardly and form the loop, additional lacing must be supplied. The tension devices 17 and 11 are constructed so as to be sufficiently yieldable to permit the looper to withdraw lacing, with which to form the loop, from the lacing supply 9. During the time the looper 177 is traveling upwardly the lacing is guided, so as to trail the looper, by the guides 179 and 180 (Figs. 32 and 36) carried on the lower end of the bracket 161, said guides being located slightly above the horizontal plane of the guide 18 and looper clamp 55 and at opposite sides of the path of the looper 177. When the looper reaches the top of its stroke, the lacing occupies the position shown in Fig. 33, whereupon the looper clamp 55 opens and the passing-forward arms 25 and 26 sever the lacing, both ends of the lacing being then free. The arms 177ª of the looper extend up past positioning stops 182 and 183 secured to one end of the lower conduit block 149 between the paths of said arms. These stops are provided so that when the lacing strikes them and the looper continues to travel upwardly for a short distance the portion of the lacing between the stops 182 and 183 will be drawn taut.

Secured to the hub that carries the inserting fingers is a downwardly extending finger 184 adapted to engage a stop 184ª which limits the movement of the inserting fingers, this construction being shown in Fig. 32. Also secured to the hub of the inserting fingers is a contractible spring 184ᵇ fastened at its opposite end to the member 161, which tends to remove the slack in the various mechanisms employed in the operation of the inserting fingers.

At the time the looper draws the lacing taut between the stops 182 and 183, the cam 171 swings the inserting fingers against the lacing. Located at one end of and between the two chain-conducting passages in the conduit block 149 is the outwardly projecting dividing web or rib 185 (Fig. 33), said web being fixed to the block 149. The inserting fingers draw the lacing down around the web 185 (the midpoint of the lacing being held against said web) and into the path of hooks 186 and 187 (Figs. 33 and 35) on the ends of the lacing chains 188 and 189, respectively. The lacing chain 188 is adapted to travel in the passage 190 (Fig. 32) of the conduit blocks, the passage 190ª of the member 122, and the passage 190ᵇ of the member 151 (see Figs. 36 and 60). The chain 189 is arranged to travel in the passage 191 of the conduit blocks, the passage 191ª of the member 122, and the passage 191ᵇ of the member 151.

Figure 40:
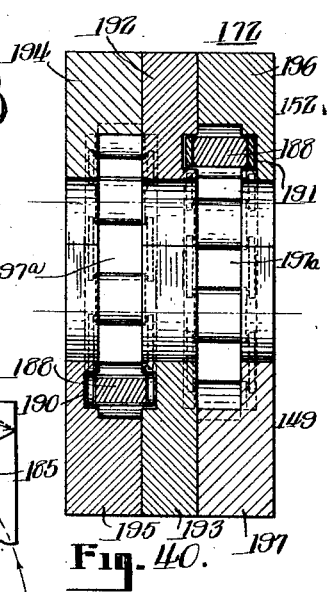
Fig. 40 is a sectional view taken on the line 40—40 of Fig. 38.

By referring to Fig. 40 it may be seen that each of the conduit blocks is made up of three sections; that is, the middle sections 192 and 193, and the outer sections 194 and 195, and 196 and 197, thus providing each of the conduit blocks with two longitudinal slots 197ª (Figs. 43 and 45). The chain passages 190 and 191 are located so as to be partly in the outer sections and partly in the middle sections. Further, as is shown in Figs. 32 and 38, the passages 190 and 191 are so positioned that they are oppositely disposed in their contour; that is, if the lower phase of one of the passages is in the lower block 149 the corresponding phase of the other passage will be in the upper block 172. Therefore, as is shown in Fig. 38, these passages completely surround the bundles of the divided skein. The slots 197ª may be described as intersecting the passages 190 and 191. Hence, the lacing which is pulled through by the chains is able to come into direct contact with the bundles of silk.

The hooks 186 and 187 are integral with the first links of the lacing chains, and these hooks are bent inwardly so that when they travel through the passages 190 and 191 they shall not catch on the skein. Since these hooks are bent inwardly it is necessary that the first few links of the lacing chains be of relatively narrow cross section in order that the inserting fingers shall be able to deliver the legs of the bight of lacing cord into them.

The construction of the lacing chain 188 is illustrated in Fig. 34, the chain 189 being similar, except for a connecting means, located on the opposite end from the hook, which will be described later. By referring to Fig. 34 it may be seen that the first four links of the chain 188 are constructed in such a manner that only a thin strip located at the bottom edge binds the opposite sides together. These lacing chains are of the block type and the majority of their links are made up of blocks 198 and side bars 199. Since the inserting fingers 164 and 165 are divided into two sections, at their ends, as is shown in Fig. 33, it is apparent that the hooks 186 and 187 may pass between them and that said inserting fingers will therefore be enabled to pass below the outline of the chains, this, of course, being necessary since the ends of the hooks lie below the outline of the chain. At the time the inserting fingers deliver the lacing into the lacing chains the looper clamp 55 opens and the shearing and clamping arms 25 and 26 act to sever the lacing.

Figure 39:
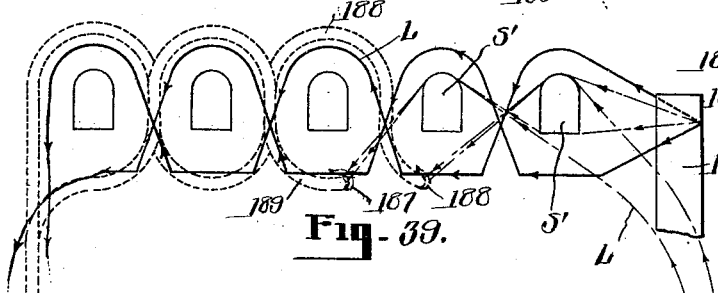
Fig. 39 is a diagrammatic view illustrating the manner in which the lacing cord passes around the skein.

Since the mid-point of the lacing is in contact with the web 185, and the chain hooks 186 and 187 engage the lacing at opposite sides of and close to the web 185 as shown in Fig. 33, it will be seen that when the chains are retracted through the passages they will draw the legs of the bight of lacing around the bundles of the skein and will deliver the ends of the lacing to the opposite end of the conduit blocks. While the chains are being retracted as just described, the midpoint of the lacing is held by the web 185, and the legs of the bight slip through the hooks 186 and 187. This is illustrated in the diagram entitled Fig. 39. The full line in this view indicates a lacing that has been completely drawn around and through a skein. The dotted lines indicate the chain about half way back through the conduit blocks, that is, the position shown in Fig. 38; and the dot-dash lines indicate a lacing that is being drawn through by the chains. It will be noted that the approximate mid-point of the lacing is retained against the dividing web 185, that diverging from this point and extending to the hooks 186 and 187 is the lacing, and that extending back from the hooks are lengths of lacing terminating in the trailing ends that have shortly before been released by the looper clamp and the shearing and clamping arms 25 and 26. As the chains travel back through the conduit blocks they draw the lacing around the bundles of the skein and continually shorten these trailing ends. Each portion of the lacing diverging from the web 185 is now in the form of a bight. One leg of each bight is a trailing end. Upon the chains arriving in such a position that they are wholly within the chain-guiding member 122 the ends of the lacing will have become free and will be hanging within the passages 190ª and 191ª, as indicated diagrammatically by the arrowheaded full lines at the left-hand side of Fig. 39. Referring to Fig. 38 or Fig. 39 it may be seen that due to the T-shaped structure of the chain-guiding passages the lacing is free to engage the respective bundles of the divided skein as soon as the lacing chains have passed; in fact, the lacing will be pulled against said bundles, since there are no intervening obstructions. When the ends of the lacing have been delivered into the chain-guiding member 122 the conduit blocks are caused to separate by the cam 134 that controls them. When the lower conduit block 149 descends, the dividing web 185 slides away from the mid-point of the lacing, and the latter engages the first bundle of the skein.

By referring to Fig. 38, it may be seen that the passage 191 is longer than the passage 190, and therefore the chain 189 is made longer than the chain 188. In view of this it is necessary that the leg or strand of the lacing L which is to be drawn around the skein by the chain 189 be longer than the leg which is engaged by the chain 188. To accomplish this, the point at which the shearing and clamping jaws of the passing-forward arms 25 and 26 sever the lacing is at a greater distance from the center line of the conduit blocks than the looper clamp 55.

Various means may be used to pass the ends of the lacing from the chain-guiding member 122 to the knot-tying mechanism. Herein a swinging arm is employed. The general relation of the parts to one another is best shown in Figs. 45 and 55. The knotter is not reciprocated up and down, but is located as close as practicable to the horizontal plane of the skeins. The passing-in arm 200 transfers the lacing to the knotter when the vertically reciprocatory structure 122 and 149 is in its lower position. Said arm is rigidly attached to a vertical tubular rock shaft 201 (Figs. 7 and 8) which is mounted on a fixed shaft or tie-rod 202 extending between brackets 203 and 204 (Fig. 8) rigid with the brace 137 and the slide 146, respectively. A brace 205 extends from the shaft 201 to the passing-in arm 200 to make the latter more rigid. Fixed to the shaft 201 is an arm 206 (Figs. 8 and 12) that terminates in the socket of a ball and socket joint 206ª, the ball for said socket being carried on the end of a link 206ᵇ. The link 206ᵇ is provided with a standard means for altering its length (shown in Fig. 45) and carries a ball at each end, one of which operates in the ball and socket joint 206ª and the other operates in the similar joint 206ᶜ (Fig. 11). Rigidly secured to the main casting 35 of the carriage C is a bracket 207 (Figs. 7 and 11) having a bearing 207'. Alined with said bearing is a bearing 207ª (Fig. 71) on the frame 35. Journaled in said bearings is a sleeve 208 carrying a lever 209 (Fig. 68) of special construction described more fully hereinafter. On one end of the lever 209 is the socket of the ball and socket joint 206ᶜ, and on the other end the follower 210 of the box cam 211 is mounted. The box cam 211 is secured to and carried by the cam shaft 46 of the carriage C (see Fig. 7).

Since both the brackets 203 and 204 are mounted on parts that reciprocate, it is apparent that some yieldable power-transmitting mechanism must be provided in order to transmit the power from the cam 211 to the rock shaft 201. For this reason the ball and socket joints 206ª and 206ᶜ and the link 206ᵇ have been provided.

Fig. 69 shows the construction of the end of the passing-in arm 200. As there shown, the passing-in arm terminates in an upturned bracket 212. An arm 213 (Fig. 8) secured at one end to the arm 200 terminates in a finger 214. To the bracket 212 is secured a finger 215 substantially parallel with the finger 214. In the structure formed of the chain-guiding member 122, the slide 146 and the conduit block 149 are two horizontal slots 216 and 217 (Fig. 55). These slots extend across the chain-guiding passages 190$^a$ and 191$^a$ in the member 122. The finger 214 is adapted to operate in the slot 216, while the finger 215 is adapted to operate in the slot 217. At the time the lacing chains extend through the conduit blocks, the chain-guiding passages 190$^a$ and 191$^a$ in member 122 are clear; that is, the lacing chains have passed out of these passages and are contained entirely within the conduit blocks and the member 151. The controlling means for the passing-in arm 200 then causes said arm to travel from a dwell position, midway between the knot-tying mechanism and the member 122, into the slots 216 and 217, it being apparent from Fig. 45 that these slots are of sufficient depth to permit the arm 200 to swing in past the chain-guiding passages 190$^a$ and 191$^a$. The fingers 214 and 215 dwell in this position for a predetermined time.

As the lacing chains travel back through the conduit blocks and draw the lacing with them, they pull the ends of the lacing cord down into the chain-guiding passages into a position which will cause them to extend across the slots 216 and 217. When the lacing chains have released the ends of the lacing cord, the fingers 214 and 215 of the passing-in arm 200 travel out of their respective slots so as to engage the lacing and carry it over into the knot-tying mechanism. As shown in Fig. 69, these fingers are notched to receive and retain the lacing until it is delivered into the knot-tying mechanism. In Fig. 55 it is shown that a horizontal plate 218 is positioned between the knot-tying mechanism and the chain-guiding member 122, this plate being carried by two brackets 219 and 220 which are rigid with the casting 146. When the finger 214 receives the lacing in the chain-guiding member 122 and starts to swing toward the knotting mechanism, the ends of the lacing are caught between the plate 218 and said finger 214. As the arm 200 continues to travel, the ends of the lacing cord are dragged across the plate 218, since they are held between said plate and the arm. This dragging aids in controlling the lacing as it is carried from the member 122 to the knotter. The arm 213 is resilient and an adjusting screw (not shown) is provided which determines the distance between the arm 213 and the plate 218 in order to maintain proper tension in the lacing. The finger 215 is provided in order that the lacing shall be maintained in nearly a vertical position, this being necessary inasmuch as the lacing cord must be delivered to the tying bill in the manner shown in Fig. 50.

The cam 211 that operates the passing-in arm has three dwell periods, one of which allows the passing-in arm to dwell adjacent to the knot-tying mechanism, another midway between the knot-tying mechanism and the chain guiding member 122, and the other inwardly of said member 122.

The knotting mechanism is illustrated in detail in Figs. 45 to 58, inclusive, and is generally similar to the knotter disclosed in the patent to Burt A. Peterson, No. 959,592, dated May 31, 1910.

The knotter comprises a frame 224 (Fig. 47) having pads 225 and 226 (Fig. 45) which are rigidly secured to casting 144 and bracket 144$^b$, respectively. A member 227 (Fig. 49) is secured to the upper side of the pad 226 and carries a bearing in which the shaft 229 (Fig. 49) is journaled. Shaft 229 is also journaled in a bearing 230, provided in the knotter frame 224. Mounted on the upper end of the shaft 229 is a spiral gear 231 (Fig. 46) arranged to mesh with a pinion 232 fixed upon the knotter shaft 233, said shaft being rotatably journaled in bearings 234 and 235 in the knotter barrel 236 (Fig. 45). The knotter barrel 236 is secured to the member 227. In the forepart of the knotter barrel 236 is an aperture, the surface of which is shaped so as to provide a cam 237 (Fig. 47). The purpose of the cam 237 is to actuate the shearing and clamping jaw of the tying bill 239. For a detailed description of this device reference may be made to said Peterson patent.

On the member 227, juxtaposed to the bearing 228, a boss 238 (Fig. 49) is mounted, said boss being provided with a bearing in which a shaft 240 (Fig. 45) is journaled. To the lower end of the shaft 240 is secured a gear 241 which meshes with a gear 242 unitary with the shaft 229 adjacent to the gear 231. Secured to the upper end of the shaft 240 is a stripper disk 243 (Figs. 46, 47 and 52) having a hook 244. Mounted in a position so as to be able to cooperate with the stripper disk 243 is the stripper guide blade 246.

The gear trains just described, namely, the drive for the knotter bill and the drive for the stripper disk, are in the ratio of 2 to 1, that is, the tying bill 239 makes two revolutions to one of the stripper disk 243.

The means for controlling the lacing and for withdrawing the waste ends trimmed off from the knot by the tying bill comprises a member 247 (Fig. 49) secured to one end of the knotter frame 224 and having a passage 248 extending angularly therethrough. The inner end of the passage 248 terminates in the lateral passage 249 (Fig. 58) of member 247. The upper side of member 247, in the region of passage 249, is cut away in such a manner that the upper side of passage 249 is opened. A plate 250 (Fig. 54) closes the open side of passage 249. The passage 248 is connected at its outer end with a suction tube 251 (Fig. 45) which has connection with a blower 252 (Figs. 2 and 80). The air intake of the blower, and therefore the point at which the waste ends are collected, is adjacent to the tying bill.

A unitary projection 253 (Figs. 55 and 57) is provided on one end of the member 247, and the underside of said projection constitutes the lower side of the passage 249. In the lower side of the passage 249 and in the plate 250 are formed registering slots 255 and 256, respectively (see Figs. 54 and 58). Below the projection 253 a plate 257 (Fig. 57) is mounted in such a manner that there is a gap 258 (Fig. 55) between the members 253 and 257.

Mounted on the upper side of member 227 are two plates 259 and 260 (Figs. 56 and 57) which are identical in shape and have slots 260ª therein. These slots register with the slots 255 and 256. When the passing-in arm delivers the lacing ends into the knot-tying mechanism, the ends are received and positioned by said slots. The plates 259 and 260 are resilient and are preferably arranged so that they will tend to spring together. To supplement the resiliency of the plates I provide means tending to draw the plates toward each other, said means comprising a bolt 261 (Fig. 47) which carries a nut 262, a spring 263 being mounted between the plate 260 and the nut 262, said spring acting to force the nut 262 upwardly and the plate 260 downwardly; and inasmuch as the nut 262 is attached to the bolt 261 and the bolt 261 is riveted to the plate 259 these plates will be yieldingly held slightly spaced apart.

Extending out from pad 226 is an arm 264 (Fig. 48) carrying at its end a bearing 265. A shaft 266 is journaled in bearing 265, and also in a bearing 267 provided in the main frame 224. The fingers and clamping members adapted to receive and position the lacing for the tying bill are mounted on the shaft 266. Positioned just above the bearing 267 on shaft 266 is a hub 268 having a unitary arm 269. On the end of the arm 269 is a cam follower 270 (Fig. 49) adapted to travel in the cam groove 271 (Fig. 54) of a cam 272 mounted on the shaft 229 just above the bearing 230. Adjacent hub 268 and secured to arm 269 is a hooked retaining finger 273 (Fig. 58) adapted to act in the gap 258 and to cooperate with slot 255. Positioned above the hub 268 on shaft 266 is a hub 274 (Fig. 54) having a unitary arm 275 to which a cord-positioning finger 276 is secured. The finger 276 is adapted to cooperate with slot 256. On the upper side of bearing 265, a hub 277 (Fig. 49) is secured to shaft 266, said hub having a unitary arm 278 to which a clamping finger 279 is attached, said finger being adapted to operate between the plates 259 and 260. It is to be noted that the fingers 273, 276, and 279 are all mounted on the shaft 266, the movement of which is controlled by the cam follower 270 that travels in the cam groove 271. These fingers occupy three positions, the first position being shown by the full-line positions of the respective fingers in Figs. 54, 56, and 58 and the third and last position being indicated by the dotted lines in the same figures, the second or middle position being half way between these two. The cam groove 271 is arranged so as to provide dwell periods for the fingers in each of the aforementioned positions.

The shaft 229 is detachably connected to a shaft 282 (Fig. 7) supported in a bearing provided in a bracket 283 carried by the upright 124. Pinned to the lower end of shaft 282 is a gear 284 that meshes with a spiral gear 285 on the sleeve 104 (Figs. 9 and 10). When the sleeve 104 is rotated by the spline shaft 100, power is translated through the mechanism just described to the knotter.

Fig. 53 illustrates a guard plate 286 which is mounted over the knotting mechanism in the manner shown in Fig. 49. The purpose of this plate is to prevent the knotted lacing from becoming ensnarled in any of the various mechanisms on the knotter as the carriage is being indexed. The plate 286 has a notch 286ª in its upper portion through which the lacing is withdrawn as the carriage travels to the next skein.

After the lacing chains 188 and 189 have drawn the ends of the lacing L down into the passages in member 122 and into the paths of the fingers 214, and 215 of the passing-in arm 200, said arm is swung over to the knotting mechanism, the reciprocatory structure 122—149 being then in its lower position, as in Fig. 55, with the slots 216 and 217 opposite the gap 258 and the clamp 259—260, respectively. The finger 214 enters the gap 258 and stops below the finger 273, and the finger 215 comes into position above the plate 260 and stops above finger 279. As has been described, the lacing is held in a vertical position between the fingers 214 and 215, and when the fingers reach the extent of their stroke toward the knotter they will have drawn the lacing into the slots 255, 256 and 260ª, thus positioning the lacing within the circle described by the point of the tying bill 239 as it is rotated. (See Figs. 50, 51 and 52.) As stated, the inlet end of the passage 249 is adjacent to the tying bill, and inasmuch as there is suction in said passage it is apparent that when the ends of the lacing are delivered into the gap 258, the suction will pick them up and tend to retain them. The position the lacing occupies just as it is delivered into the knotting mechanism is represented in Fig. 57, and Fig. 50 shows the position of the lacing relative to the tying bill 239 at this time. As soon as the ends of the lacing are so positioned the cam 272 causes the fingers 273, 276, and 279 to move into their second position. In these positions the fingers act to lightly retain the lacing in the following manner: The finger 273 (Fig. 58) is positioned so that it just closes the slot 255; the finger 276 (Fig. 54) just closes the slot 256 and lightly clamps the lacing; and the finger 279 moves over into such a position as to lightly clamp the lacing between the plates 259 and 260 and closes the slot 260$^a$. The tying bill then coils the lacing about itself, as shown in Fig. 51. It is because of this that the clamping fingers do not tightly clamp the lacing, since it is necessary that additional lacing be withdrawn in order to supply the amount required for the coiling of the lacing about the tying bill. On the following revolution of the tying bill the waste ends of the lacing are sheared off. In order to locate the lacing so that this will be accomplished the arm 276 acts to position the lacing so that it will be grasped by the open shearing and clamping jaw of the tying bill 239, and at the same time the clamping finger 279 securely clamps the lacing between the plates 259 and 260. After the ends are sheared off, the hook 244 on the stripper disk 243 engages the lacing at a point between the clamp 259—260—279 and the tying bill and thus strips the knot from the tying bill and tightens the knot, said stripper hook 244 cooperating with the stripper guide blade 246 to accomplish the stripping. At the time the knot is drawn tight and released from the tying bill the clamping members act to release the lacing. The waste ends sheared off by the tying bill (in the manner described in said Peterson Patent No. 959,592) are drawn away by the suction in passage 249. The tying bill continues to rotate so that it will be in position to operate when the carriage is indexed.

Reference may now be made to various features designed to prevent breakage in certain contingencies.

The lacing chains 188 and 189 are connected to the vertically reciprocatory car 115 by means including two connectors 287 and 288 (Fig. 61), said connectors being attached to the upper end of a chain driver 290. The latter has a T-shaped rib 290$^a$ that slides in the chain-guiding passage 191$^a$ (Fig. 60) in the member 122. Above and below said rib the chain driver is shaped to provide recesses 290$^b$ and 290$^c$. The distance between said recesses is less than the distance between the slots 216 and 217, these recesses registering with said slots when the member 290 is in a position that causes the chains 188 and 189 to be entirely within the conduit blocks 149 and 152 and the member 151, thus permitting the passing-in fingers to travel in behind the member 122, for the purpose described.

A bearing 291 (Figs. 60 and 66) is located at one side of the car 115. A shaft 291' is journaled in the bearing 291, and keyed to one end of said shaft is a latching member 292. A boss 293 is located on the car 115 adjacent to bearing 291, and pivotally mounted thereon is the member 294, having a notch 295 adapted to receive the nose 292' of the latching member 292, as in Fig. 60. The members 292 and 294 are held in latched position by the spring 296 until the chains 188 and 189 are prevented from functioning normally. Member 294 has an extension provided with a rounded end 294', and the chain driver 290 has a cooperating recess 297. During normal operation of the device these parts are retained in latched position (Fig. 60). However, should some obstruction get in the way of the chains or should the chains bind, the car 115 will continue to travel while the chain driver 290 will be held stationary. This will cause the rounded end 294' to rock out of the recess 297, thus unlatching the members 294 and 292. Fig. 61 depicts the members in the position they will occupy should the car 115 and the chain driver 290 part while said car is traveling downwardly. If they were to part while the car 115 was traveling upwardly, the member 294 would assume the dot-dash position shown in Fig. 61.

Means is provided to stop the machine in the event of separation of the car 115 from the lacing chains. As shown in Fig. 63, a bracket 298 is fixed to the car 115. This bracket carries a clamp arranged to grip a stopping element in case of separation of the car and the lacing chains. One end of the bracket 298 constitutes a clamp member 298'. Pivoted on the bracket 298 at 298$^a$ (Fig. 66) is a member 299 having a clamping member 299'. On the member 299 is a projection 299$^a$ adapted to be held by a hook or latch 300 keyed on the shaft 291'. The clamp members 298' and 299' are arranged at opposite sides of a square stopping bar 301. When the members 299$^a$ and 300 are unlatched, the compression spring 302 expands and causes the members 298' and 299' to clamp the bar 301. The bar 301 is guided by a bracket 304 (Fig. 67) carried on the axle 141, and by a guide 304' (Fig. 64) carried on the bracket 144$^b$.

The bar 301 is provided with a pin 305 (Fig. 67) which lies in a slot 306 of a crank arm 307. The latter is secured to a shaft 308 that is carried in bracket 309 on the axle 141, said shaft 308 being provided with an enlarged end 310 (Fig. 64) that is cut away on one side. Secured to the axle 141 is a bearing 311 in which a shaft 312 is journaled. A dog 314 fixed on the shaft 312 engages the member 310. A hub 315 (Fig. 65) having an arm 316 is rigidly mounted on the shaft 312. A spring 313 (Fig. 64) extends between the members 316 and 141 and is adapted to hold the dog 314 in engagement with the member 310.

When the parts are unlatched and the members 298' and 299' clamp the bar 301, said bar is caused to move in the direction the car 115 is traveling. The movement imparted to the bar 301 is translated to shaft 308 through the pin and slot construction constituted of members 305 and 306 and member 307. When the shaft 308 is caused to turn, the dog 314 is forced upwardly, since the member 310 will be rotated and the cut-away portion of 310 is located on the center line and dog 314 is resting on this cut-away portion. When the dog 314 is caused to swing upwardly the member 316 is forced downwardly, which then acts on the stopping bar 317 to stop the machine, in a manner to be described hereinafter.

Figs. 68 to 71, inclusive, illustrate another safety mechanism used on the carriage C. Should the chains 188 and 189 be rendered inoperative while they are in the path of the passing-in fingers 214 and 215, these fingers will strike them. In view of this, means to be now described is provided for disconnecting the passing-in arm from the cam 211.

Pivotally mounted on the bearing sleeve 208 is a member 321, said member constituting the upper arm of the lever 209. The socket of the ball and socket joint 206ᶜ is carried at the upper end of member 321, the hub 322 comprising the lower end thereof. The lower portion of the lever 209 consists of an arm 323 carrying at its lower end the cam follower 210. The upper end of arm 323 comprises the hub 324 which is secured to the bearing sleeve 208.

An upwardly extending portion 325 is provided on the hub 324. Pivotally mounted in the upper end of projection 325 is the shaft 326 of the latching member 327. Latching member 327 carries a spring anchor 328, and the spring 329 extends between this anchor and an anchor on the hub 324. The latching member 327 has a notch 330 (Fig. 70) adapted to engage the pin 331 of the member 321, the spring 329 tending to hold these parts in engagement and thus latch arms 321 and 323 together. As long as the notch 330 and pin 331 are latched together, the members 323 and 321 are acting as a unit, or more specifically, as the before-mentioned lever 209.

Should the passing-in fingers strike the chains or some other obstruction and be withheld from normal operation, the cam 211 will continue to operate, and since the upper part of lever 209 will be held stationary by said fingers the notched portion 330 of the latch 327 will be caused to withdraw from engagement with pin 331, leaving the member 323 free to be rocked by cam 211, while the member 321 will remain stationary.

To stop the machine upon stoppage of the passing-in arm as just described, I provide the following described means. The latch 327 has a finger 332 (Fig. 70) which extends through an aperture in the sleeve 208 and is adapted to engage a shoulder 333ᵃ (Fig. 71) on a rod 333 slidably mounted in the sleeve 208. Normally the finger 332 of the latch 327 engages the shoulder 333ᵃ of said rod and holds the latter in the position illustrated in Fig. 68. A spring 334 extends between a collar 335 on the rod 333 and the bearing 207ᵃ on casting 35, and tends to force the rod 333 in the direction of a bell crank 337 mounted on a bracket 338 secured to the casting 35. At the time the notch 330 leaves the pin 331 the finger 332 will be withdrawn from engagement with the shoulder 333ᵃ. This will allow the spring 334 to force the rod 333 in the direction of the bell crank 337 and cause said bell crank to engage the stopping bar 317 and thus stop the machine.

Another safety mechanism is provided in connection with the lacing supply, for if no provision were made to halt the mechanism in the event of the lacing supply becoming exhausted, the carriage would continue to operate idly. Referring now to Fig. 18: Near the rear end and on the upper side of main casting 35, two bearings 339 and 340 are provided. A shaft 341 is journaled in these bearings, and secured to said shaft is a crank arm 343 (Fig. 7) to which a link 344 is pivotally mounted. The lower end of link 344 is attached to a pin 345 on the hub of cam follower arm 43. As the arm 43 is rocked, the motion is translated through members 344 and 343 to the shaft 341. On one end of the shaft is fixed an upwardly extended dog 347 (Fig. 18).

As is shown in Figs. 7 and 9, a drop wire or detector 348 having at its upper end an eye 349 through which the lacing L is directed, is provided between the tension device 17 and the pigtail guide 18. The detector extends through guide openings in the bracket 19, and its lower end passes through an aperture in the upper end of a lever 350 (Fig. 18). Said lever is pivoted on the casting 35 at 352. Rigid with the lever 350 is a latch member 352' (Figs. 9 and 120) which is adapted to engage a shoulder or lug 352ᵃ on a latch or lever arm 353 (Fig. 9). The latch 353 is pivoted on the carriage at 354 and is rigid with an oppositely extended arm 355 overlying the stopping bar 317. A spring 356 connected at one end to the carriage and at its opposite end to the lever 353—355 tends to force the arm 355 down against the bar 317, the spring being normally restrained by the latch 352'.

As the shaft 341 is rocked, oscillatory motion is imparted to the dog 347 which is in line with the lower end of the aperture in member 350 through which the detector 348 extends. Should the lacing break, or should the supply become exhausted (as indicated in Fig. 12), the detector 348 will be permitted to drop and will fall into the path of the dog 347. The dog 347 then engages the detector 348, and since said detector extends through the member 350 it will rock the member 350 about the pivot 352 which will cause the latching member 352' to leave the latch 353. This permits the spring 356 to draw the member 355 down into engagement with the bar 317 and stop the machine.

As has been described hereinbefore, the knotter unites the ends of the lacing of one skein while the lacing mechanism is lacing the skein in the van. In view of this, since there are twelve skeins, it is apparent that the knotter must operate an extra time in order to unite the ends of the lacing of the twelfth skein and it is apparent that the knotter makes an idle operation when the mechanisms are lacing the first skein. As has been stated, the passing-forward arms draw the lacing across the carriage, so as to position it for the looper, while the carriage is being indexed to the next skein. To prevent the lacing from being thus positioned when the carriage is being advanced from the twelfth skein to the position it occupies during the thirteenth operation, I provide the mechanism shown in Figs. 11, 18 and 72 to 76, inclusive.

A shaft 359 (Fig. 21) is journaled in bearings 360 and 360' (Fig. 72) in the main casting 35. Pivotally mounted on one end of the shaft 359 is a hub 361 (Fig. 11) having a counterweight 362 and an arm 363. The arm 363 extends into position to engage a plow or cam 364 (Fig. 75) adjustably secured to a bracket 364ᵃ on the main frame of the machine in position for engagement by said arm 363 as the carriage is traveling from the eleventh to the twelfth skein. Adjacent to the hub 361 is a hub 365 (Fig. 72) which is rigidly secured to the shaft 359, said hub having an arm 366 which terminates in the counterweight 366ᵃ. A pin 363ᵃ on the arm 363 underlies the arm 366. The weight 362 normally holds the arm 366 and the shaft 359 in the position shown in Fig. 73. A contractile spring 367 stretched between an anchor on the arm 363 and a cooperating spring anchor on the weight 366ᵃ yieldingly connects the arm 366 to the arm 363. Fixed to the shaft 359 is a stop arm 368 (Fig. 74) adapted to engage a hooked projection 369 on the cam follower arm 43. During normal operation this action does not take place, since the weight 362 normally holds the stop member 368 down out of the path of the projection 369; but when the arm 363 is forced down by the plow 364, as shown in Fig. 74, the spring 367 turns the shaft 359 sufficiently to lift the member 368 into the position shown in said figure, which will cause it to lie in the path of the projection 369, whereby the arm 43 is prevented from following the cam 45 farther than just sufficient to place the hook of the projection 369 under the stop arm 368; and the passing-forward arms 25 and 26 are left in the dot-dash position shown in Fig. 12. They will therefore be prevented from drawing a lacing across while the carriage is being indexed from the twelfth skein to the thirteenth position. Rigidly secured to the shaft 359 is another latching member 372 (Fig. 76) which is adapted to engage the arm 25 and hold it inoperative during this time in order that the shearing and clamping jaws shall not open and thus drop the lacing. Shortly after the stop arm 368 comes into the position shown in Fig. 74 the passing-forward arms 25 and 26 swing to the position shown in said figure, and the latching portion 373 of the arm 25 engages the latching member 372. This occurs just at the time the shearing and clamping jaws are severing the lacing for the twelfth skein. Members 372 and 373 are provided with cooperating notches, shown best in Fig. 76, which prevent these members from becoming unlatched before the desired time. It is apparent, however, that these parts must be unlatched in time to permit a lacing to be drawn across so as to be in position to be engaged by the looper 177 when the carriage comes into position under the first skein. This is accomplished during the later part of the thirteenth cycle. Just before the carriage has come into the thirteeth position; that is, while it is still in motion, the arm 363 passes the plow 364, and the weight 362 drops and causes the lever 363 to swing upwardly and thus reduce the tension in the spring 367. The weight 362 continues to fall until the pin 363ᵃ engages the arm 366, said arm being prevented from rising because the stop arm 368 is held by the hooked projection 369. During the time the carriage is performing its thirteenth operation the high point in cam 45 raises the roller 44 sufficiently to disengage the hooked projection 369 from the stop arm 368. However, the parts are still held in the position shown in Fig. 74 until the arm 66ᵈ (Fig. 21) is caused to swing into such a position as to be able to move the arm 25 sufficiently to disengage members 372 and 373. This allows the weight 362 to swing downwardly and causes the various parts carried by shaft 359 to assume their inoperative positions shown in Figs. 18 and 73. Before the completion of the thirteenth cycle the passing-forward arms will travel across the machine and position the lacing so that it may be engaged by the looper 177 when the latter travels upwardly for the lacing of the first skein.

Fig. 80 shows the system used to remove waste ends from the knotting mechanism. At the right-hand end of the machine frame (see Fig. 2) is mounted the blower 252 the air intake of which is adjacent to the tying bill of the knotting mechanism, this connection being through the medium of tubes 251, 374 and 375. The tubes 251 and 374 join each other in a bracket 374ᵃ (Fig. 7) provided on the side of the carriage C. The tube 375 is larger in diameter than the tube 374 and is connected directly to the blower 252. One end of a conduit 376 is connected to the discharge port of the blower, the other end being connected to a suitable receptacle (not shown) adapted to receive and collect the waste ends. Since the carriage is reciprocated back and forth below the flies, it is apparent that a yieldable connection must be provided between the stationary blower 252 and the traveling knotting mechanism. The tube 375 extends between the blower 252 and a bracket 377 (Figs. 2 and 80) carried by the upright 378 of the main frame. In the end of tube 375 which is mounted within the bracket 377, a sleeve of oilless bearing material 379 (such as, for example, genelite) is securely fitted, the tube 374 having a snug sliding fit in said sleeve. When the carriage is in its thirteenth position the tube 374 extends the entire length of tube 375, and when the carriage is at the other end of the machine the end of tube 374 is near the end of tube 375 that is contained within the bracket 377.

On the shaft 380 of the blower 252 is a pulley 381 that is engaged by a belt 382. This mechanism supplies a separate drive for the blower in order that it may be operated at a high speed.

As heretofore stated, the various mechanisms on the carriage are so arranged that they operate during periods which overlap, in order that high speed and, therefore, efficiency may be obtained in the operation of the machine. The relation between the various parts is indicated in the time table constituting Fig. 81. The operation of the carriage for the first eleven skeins is identical for each skein. However, during the latter part of the eleventh cycle, mechanisms come into play which alter the operation during the lacing of the twelfth skein and the thirteenth operation. The vertical lines on the chart indicate degrees of revolution of the cam shaft, the latter making one revolution for each cycle, the lines being arranged in twenty-degree steps. The horizontal divisions indicate the various mechanisms.

On the zero lines (those numbered 0 and 360) the parts are in the position they occupy when the carriage is midway between two successive skeins. As will be indicated, some of the parts are in motion while the others are at rest. Those parts which are in motion are so arranged that they may be arrested, at the end of the thirteenth operation of the carriage, in the positions designated on the chart as the zero position. The positions of the various parts, on the zero line, are as follows:

The inserting fingers 164 and 165 are in a dwell position;

The conduit blocks are in the position shown by the full lines in Fig. 44;

The crank 111 is in the position shown in Fig. 8;

The passing-in arm 200 has picked up the lacing that extended across the slots 216 and 217, and is carrying it, in the recesses in the fingers 214 and 215, towards the knotting mechanism;

The knotter thread clamps which are all rigidly mounted on the shaft 266, are on a dwell in open positions, while the tying bill is moving into the position shown in Fig. 50;

The passing-forward arms 25 and 26 are in a dwell in the full-line position of Fig. 12;

The shearing and clamping jaws of the arms 25 and 26 are opening and releasing the end of the lacing which has been carried across the carriage by said arms;

The looper clamp 55 is about to close and receieve the lacing that has been delivered thereto by the passing-forward arms, and which is being released by the shearing and clamping jaws.

As indicated in the sixth horizontal division of the time chart the point 392 represents the time at which the passing-forward arms 25 and 26 start to move from the full-line position of Fig 12 to the dotted-line position in the same figure. The point 394 indicates the time at which the looper clamp 55 will be entirely closed, and the point 396 indicates the time at which the shearing and clamping jaws will be entirely open. The lacing L is in a semi-taut condition and lies in the path of the looper 177 and also is located between the open shearing and clamping jaws as they travel across the machine.

At the point 393 the cam 272 will begin to operate the rock shaft 266 which actuates the knotter thread clamps, and start these clamps towards their first position.

At the point 395 the passing-in arm 200 will have delivered the preceding lacing into the knotter and said fingers dwell in their delivering positions for a very short time and then start to move out of the knotting mechanism. The point 398 indicates the time at which the lacing is actually received and retained within the knotter. The point 397 indicates the time in which the rock-shaft 266 ceases its movement temporarily and positions the various thread clamps in their first position, which has been described.

At the point 399 the cam 134 will have reached such a position as to start to close the conduit blocks 149 and 152.

At the time indicated by the point 401, the passing-forward arms 25 and 26 arrive in the dotted-line position shown in Fig. 12, where they dwell until a time near the close of the cycle.

At the point 405, the cam 272 will again actuate the shaft 266 and will start to move the various knotter thread clamps to their second clamping position, which they attain at the point 408.

At the point 406, the passing-in arm 200 will arrive at a point midway between the knotting mechanism and the chain-guiding member 122, where it dwells.

At the point 407, the conduit blocks will have been closed, and during this time the crank 111 will have traveled from the position shown in Fig. 8 a sufficient distance to move the car 115 upwardly, and at the point 407, just as the conduit blocks are closed, the crank 111 will cause the lacing chains 188 and 189 to enter the conduit blocks.

When the point 409 is attained the passing-in arm 200 will cease its dwell, and will start to move to its position behind the chain-guiding member 122, this point being attained at the time indicated by the point 421.

The point 416 indicates the maximum upright position of the crank 111 at which the chains are entirely within the conduit blocks. It will be noted by referring to the points 409, 421, and 416 that the arm 200 passes in behind the chain-guiding member 122 at a time when the chains are entirely within the conduit blocks.

At the point 412 the shearing and clamping jaws start to close so as to be enabled to sever and clamp the lacing. At the point 417, the shearing and clamping jaws cut the lacing for the skein being laced, and at the same time they securely clamp said lacing so as to be able to carry it across the carriage, in the manner described, for the next skein.

At the point 414 the looper clamp 55 starts to open and completes this movement at the point 418. (As has been described, the cam 58 which operates the looper clamp is adjustable; that is, the timing of its rises and falls may be varied. This adjustable period is shown on the chart as being between the points 414 and 418.) Then, since the shearing and clamping jaws have released the other end of the lacing, said lacing is in readiness to be delivered to the lacing chains. It should be noted that during the space of time indicated between the points 394 and 414, the looper 177 will have traveled upwardly and at the time indicated by the point 416 will have attained its maximum height. Therefore, at the point 413 the inserting fingers 164 and 165 start to move into the position from which they deliver the lacing into the hooks 186 and 187 of the lacing chains 188 and 189. They reach this position at the point 415 which, it may be noted, is identical in time with the point 416, which is the time the chains start to withdraw. The inserting fingers remain in this position until the point 422 is reached, when they start to return to their dwell position, which allows them ample time to deliver the lacing into the hooks 186 and 187, and at the point 423 they will have arrived at their dwell position where they remain until the point 413 is attained in the next cycle.

At the point 424, the cam 272 starts to actuate the shaft 266 and open the knotter thread clamps. This action is completed at the point 431 and during this time, at the point indicated by 426, the knotter will have completed tying the knot and said knot will be stripped from the tying bill.

At the point 427 the conduit blocks will start to open and they will complete this action at the point 435. During the time intervening between the points 427 and 435, as indicated by the point 432, the passing-in arm 200 will start to travel towards the knotting mechanism, carrying the lacing, said arm arriving at the knotting mechanism at point 395 in the next cycle.

At the point 433 the passing-forward arms 25 and 26 will start to move away from the dotted-line position of Fig. 12, towards the full-line position of the same figure. They arrive in this position at the time indicated at 439, where they dwell until the point 392 is attained in the next cycle.

At the point 438 the shearing and clamping jaws will start to open and at the point 437 the looper clamp will have started to close.

As has been described, the functions of the carriage are varied for the twelfth skein and the thirteenth operation. The time relations are shown on the chart in Fig. 81. The point 401 indicates the time at which the high point of the cam 45 comes into position so as to engage the roller 44. This permits the latch members 368 and 369 to assume the positions required so that they will be able to latch, when the arms 25 and 26 come into the proper position. As described, the latch comprised of the members 372 and 373 does not come into play at the same time as the latch 368—369, the time at which latch 372—373 operates being indicated by the point 417 on the chart. These mechanisms prevent a lacing being drawn over for the thirteenth operation of the carriage.

It should be noted that the 180° line is the mid-point of all operations and that it is on this line that the lacing chains reach their full extent through the conduit blocks and start to return.

The means for reciprocating the carriage C comprises the indexing bar 14 (Figs. 2 and 11), said bar being rigidly secured to the main casting 35 of the carriage. An upright 440 (Fig. 91) is secured to the carriage-indexing bar a suitable distance away from the casting 35. On the upper end of the member 440 is a projection 440ª (Fig. 83) that slides in a grooved guide bar 440ᵇ (Fig. 82) secured in the machine frame. Brace rods 441 and 442 extend from the upright 440 to the rear end of casting 144 of the carriage C, to which they are rigidly secured, as may be seen by referring to Figs. 7, 18 and 32. The bar 153 which supports the upper conduit block 152 is secured to the upper end of the upright 440. The brace rods 441 and 442 serve to steady the upright 440 and to maintain the rod 153 in alinement. Rollers 443 (Figs. 3, 82 and 83) are mounted on brackets 444 which are secured to the main frame of the machine, and are alined so as to carry the carriage-indexing bar 14. As can be seen in Fig. 91, blocks 445 are secured to the rear side of the carriage-indexing bar, the distance between centers of adjacent blocks being equal to the distance between centers of adjacent skeins.

The mechanisms which index the carriage are shown in detail in Figs. 85, 86, 88, 89 and 90. As is shown best in Fig. 90 a cam disk 446 is fixed on a shaft 447 that is journaled in bearings 448 and 449 (Fig. 86) in such a way as to be rotatable and yet slidable in a direction parallel with its axis. Mounted eccentrically on the face of the disk 446 is a roller 450 adapted to roll through the space between adjacent blocks 445 and to have rolling engagement with the leading block so as to advance the carriage C. The shaft 447 is mounted so that its center line is in the same horizontal plane as the top of the carriage-indexing bar 14. When the roller 450 travels down between the blocks 445, it is apparent that it will be rotated about a center lying in the same horizontal plane as the top of the blocks, and therefore its period of contact with said blocks will be equal to the time required for one-half of a revolution of the shaft 447, and it will move the carriage through a space equal to twice the distance from the center of the disk 446 to the center of the roller 450. The cam chart in Fig. 81 graphically indicates the time at which the roller 450 is indexing the carriage, the gap in the line between the points 450ª and 450ᵇ indicating the time the roller is out of engagement with the blocks, and thus the time at which the carriage is at rest.

It is desirable that the carriage C shall be accurately positioned for each lacing operation, in order that the recesses in the adjacent faces of the conduit blocks 149 and 152 shall register with the bundles of silk. Means is provided for thus accurately positioning the carriage and for locking the carriage while in operative relation to the successive skeins. Said means comprises a lever 451 (Fig. 90) pivoted in the machine frame at 452. The lever 451 carries at one end a locking member 453 having inclined sides adapted to fit between the inner walls of the blocks 445. To the other leg of the lever 451 one end of a spring 454 is secured, the other end of which is anchored at 455. The spring 454 tends to draw a roller 456 carried by the lever 451 into engagement with the periphery of the cam disk 446. The cam periphery of said disk is of such form that when the locking member 453 is positioned within one of the blocks 445, the roller 450 will be out of engagement with said blocks, but as soon as said roller engages said blocks the cam periphery of the disk 446 withdraws the locking member 453 from engagement with the block 445. On the cam chart in Fig. 81 the point 453ª indicates the time at which the member 453 starts to move toward its locking position, which position is reached at the point 453ᵇ. At the point 453ᶜ the member 453 starts to release the carriage, the releasing action being completed at 453ᵈ.

The means for returning the carriage C from the thirteenth position to the first position will next be described.

As shown in Fig. 83, the carriage-indexing bar 14 is L-shaped, and the horizontal portion of the L extends toward the front of the machine. A rack 457 on the horizontal portion of the bar meshes with a gear 458 carried on a shaft 459 (Fig. 87) that is journaled in bearings 460 and 461 (Fig. 3). Midway between these bearings the shaft 459 carries a pinion 462 (Fig. 87) that meshes with a rack 463 carried on a rod 464. At its lower end, the rod 464 carries a piston 465 operating in a dash pot 466 which is of a standard construction well known in the art. Mounted on the upper side of the dash pot 466 is a vertical supporting rod 467 carrying at its upper end a guide member 468 in which the cylindrical part of the rod 464 is slidably mounted. Carried on the upper end of the rod 464 is a cross head 469. Springs 470 and 471 are secured at their upper ends to the cross head 469 and are anchored at their lower ends at 472 and 473. As the roller 450 travels between the blocks 445, it causes the carriage to be progressed with a step-by-step movement. The rack 457 transmits the motion to the gear 458 which operates shaft 459, thus driving pinion 462 which causes the rack 463 to move upwardly and thereby stretches the springs 470 and 471.

From the foregoing it is apparent that energy will be stored in the springs 470 and 471 for the purpose of returning the carriage into position beneath the first skein. The locking member 453 prevents these springs from returning the carriage when the roller 450 is out of engagement with the blocks 445 while the carriage is being indexed step-by-step. When the carriage is being returned to its position below the first skein by the springs 470 and 471 the dash pot 466 serves to modify the movement so that its speed is more nearly uniform. As the carriage reaches its operative position beneath the first skein, a block 474 (Fig. 89) on the lower side of the indexing bar 14 strikes a buffer 474ª, the spring 474ᵇ of said buffer absorbing some of the shock.

The shaft 447 is driven from the spline shaft 100 (Fig. 86). A bevel gear 475 is keyed to the shaft 100 and meshes with a bevel gear 476 fixed to one end of a shaft 477 which is journaled in bearings 478 and 479. A pinion 480 fixed on the shaft 477 meshes with a spur gear 481 fixed upon the shaft 447.

The means for preventing the roller 450 from operating on the indexing bar 14 while the carriage C is being returned to initial position by the springs 470 and 471 and until after the first skein has been laced, comprises means for sliding the shaft 447 endwise so as to place the roller 450 out of position to engage the blocks 445. Secured to the rear end of the shaft 447 is a sleeve 482 having two collars 483 and 484 thereon. A lever 485 is pivoted in the machine frame at 486 and carries at one end a roller 487 that lies between the collars 483 and 484. A contractile spring 488 connected at one end to the lever 485—488' and anchored at its other end at 489 tends to swing the lever in the direction to slide the shaft 447 into inoperative position. The means for controlling the spring comprises a lever 490 pivoted in the machine frame at 491. One arm of the lever 490 is adapted to engage the adjacent arm of the lever 485 to hold the lever against movement under the influence of the spring 488. A contractile spring 492 connected to the lever 490 and anchored at 493 tends to move the lever 490 into locking engagement with the lever 485.

The means for withdrawing the lever 490 from locking engagement with the lever 485 comprises a bar 494 (Figs. 86 and 89) having in one end an elongated opening 495 adapted to receive a pin 496 on one end of the lever 490. The bar 494 is pivoted at 497 to the upper end of a lever 498 which is pivoted in the machine frame at 499. The bar 494 is normally held up out of engagement with the pin 496 by means of a bell crank 500 pivoted in the machine frame at 501. The arm 502 of said bell crank is adapted to support the bar 494. A contractile spring 503 connected to the bell crank and anchored at 504 normally holds the bell crank in such position that the bar 494 is up out of engagement with the pin 496. A cam or plow 505 (Figs. 59 and 89) is mounted on the carriage-indexing bar 14 in position to engage the arm 506 of the bell crank 500 as the carriage is traveling from the twelfth to the thirteenth position. The bar 494 is thereby permitted to descend by gravity into engagement with the pin 496. The lever 498 is swung by means of a cam 507 (Fig. 89) fixed on the shaft 447, a contractile spring 508 (Fig. 86) connected to said lever and anchored at 509 serving to hold a roller 510 on said lever in contact with the cam.

The means for sliding the shaft 447 in the direction to return the roller 450 into position to engage the carriage-indexing bar 14 comprises a cam 517 (Fig. 86) on the rear side of the disk 446, said cam being arranged to engage a roller 518 mounted on a bracket 519 attached to the machine frame. The cam 517 also prevents the spring 488 from violently sliding the shaft 447 into inoperative position. As shown in Figs. 92 and 93, the end of the lever 485 which coacts with the lever 490 is provided with a cam surface 519ª. When the lever 490 is being drawn away from the cam surface 519ª, the spring 488 is restrained by said cam surface and thus prevented from driving the cam 517 violently against the roller 518. The retreat of the cam 517 as it rolls past the roller 518 allows the spring 488 to withdraw the shaft 447 gradually. When the lever 490 is returned into engagement with the lever 485, the cam surface 519ª causes the lever 485 to be given a slight additional movement so that the cam 517 shall clear the roller 518 in the succeeding revolutions of the disk 446.

Referring again to Fig. 81: The carriage indexing roller 450 is in a position half-way through its effective movement. The indexing lock 453 is on a dwell in open position. The cams 507 and 517 perform their motions during each cycle of operations of the lacing mechanisms, but are prevented from effective operation by the members 500 and 490, respectively. During the thirteenth operation of the lacing mechanisms, when the point 519ᵇ is reached the cam 507 starts to unlatch the arm 485, which operation is completed at the point 519ᶜ. It should be noted that the point 519ᵈ that indicates the time at which the mechanism for withdrawing the indexing shaft 447 starts to function is slightly in advance of the point 519ᶜ that indicates the time that said mechanism is unlatched. This overlapping of time intervals is possible, since the first few degrees of movement of these cams produce very little movement of the parts, and inasmuch as it is desirable that the parts be under way in as short a time as possible they are started in advance of their becoming completely unlatched. Between the points 519ᵈ and 519ᵉ the indexing shaft 447 is withdrawn and dwells until the point 519ᶠ is reached in the first cycle of operations of the lacing mechanisms, when the cam 517 starts to come into play again and its operating point is attained at 519ᵍ. Between the points 519ʰ and 519ᵏ the mechanism controlling the latches for the indexing shaft starts back to its dwell position. From the foregoing it may be seen that the carriage indexing mechanism is not in position to function until the point 519ᵍ is attained in the first cycle of operations of the lacing mechanisms, and that when the point 450$^b$ (or 519$^c$) is reached the carriage-indexing mechanism starts to function.

As is shown in the cam chart in Fig. 81, a short time after the carriage has completed its indexing into the thirteenth position, the indexing lock 453 is withdrawn from engagement with one of the blocks 445. This would subject the carriage C to a return action caused by the springs 470 and 471. Therefore an additional latch is provided which is shown best in Fig. 82. A latching block 520 is attached to the lower side of the carriage-indexing bar 14 in position to be engaged by a latch arm 522 when the carriage is in the thirteenth position. The latch arm 522 is pivoted on a shaft 523 carried in bearings 523$^a$ (Fig. 119) in the machine frame. Rigid with the latch arm 522 is an arm 525 to which is attached a contractile spring 526 which tends to swing the latch arm 522 into engagement with the locking block 520.

When the carriage has laced all twelve skeins on one side of the fly and is halted in the thirteenth position, the upper conduit block 152 is out of the fly so that said fly may be raised and turned or discharged. The fly-handling apparatus is illustrated in Figs. 1, 2, 3, 82, 83, and Figs. 101 to 116 inclusive. As shown in Fig. 1 the main frame of the machine comprises two uprights 531 and 532. Secured to the upper end of uprights 531 and 532 is the comb-supporting beam 533, and secured to the top of the beam 533 near its front end is the vertically extended member 534. A bracket 535 is also secured to the beam 533, and detachably secured thereto is the horizontally disposed fly-guiding bar 536. A plate 534′ (Figs. 1 and 2) is secured to the inner side of the member 534, and a plate 535′ is secured to the bracket 535, these plates being spaced apart so as to provide a guide slot 537 for one end of the fly shaft b. The upper edge of the fly-guiding bar 536 is alined with the upper edges of the members 535′, 534′ and 534.

As shown in Fig. 105, the main frame of the machine includes the brackets 378 and 539 which carry the comb-supporting beam 540. The beams 533 and 540 are parallel and spaced apart a distance approximately equal to the length of a fly. Upwardly extending members 541 and 542 (Fig. 105) are secured to the beam 540; and detachably secured to the member 542 is the horizontally disposed fly-guiding bar 543. Said bar comprises two parallel flanges 544 and 545 (Fig. 104) which are spaced apart far enough to receive the measuring worm d. The worm d thus serves to hold the fly against endwise displacement. The upper edges of the fly-guiding flanges 544 and 545 and the members 541 and 542 are alined. There is a guide slot 546 between the members 541 and 542 directly opposite the guide slot 537. Referring to the plan view, Fig. 101, it may be seen that recesses 547 and 548 are formed in the members 541 and 542, respectively. These recesses provide clearance for the measuring worm. The longitudinal center of the skein-spacers 1 and the comb teeth or skein-piercers 2 is in the vertical plane of the guide slots 537 and 544.

In Figs. 105 and 106 it is shown that the fly-guiding bars 536 and 543 are pivotally attached to brackets 551 and 552, respectively, in order that they may be swung up to afford access to the mechanisms beneath them.

When the fly is seated in position for lacing, the ends of the fly shaft extend through the slots 537 and 546, and are held by arms 555 and 556 (Figs. 1 and 2). The sides of said arms which face each other are longitudinally channeled so as to hold the fly against vertical movement, the channels being long enough to extend across the guide slots 537 and 546. As shown in Figs. 105 and 106 the arms 555 and 556 are secured to arms 557 and 558, respectively. The arms 557 and 558 are fixed on a shaft 559 which is journaled in bearings 560 and 561 (Figs. 105 and 106) in the machine frame.

A shaft 562 (Fig. 105) is journaled in bearings 566 (Fig. 101) and 567 in the machine frame. Adjacent to the bearing 567 and mounted on the shaft 562 is a cam disk 569 (Fig. 105) having a cam groove 570. A pintle 571 is mounted on the arm 558 and carries a cam follower 572 which is adapted to travel in the cam groove 570. The contours of the cam 570 are so arranged that the arms 557 and 558 are caused to move from a receiving position where the channels in the ends of said arms are alined with the upper edges of the members 534′, 535′, 541 and 542, to a position wherein the fly is seated on the comb. A contractile spring 572$^a$ (Fig. 105) connected to the arm 556 takes up slack in the mechanism and holds the fly down firmly on the comb.

In Fig. 105 it is shown that the cam 570 is provided with a widened portion in its contour, indicated at 573. The purpose of this widened portion is to compensate for different widths of flies. The cam follower 572 is in this enlarged portion when the fly is fully seated and in operative relation to the comb; hence, when an extra wide fly is encountered the cam follower 572 will merely stand a little distance above the lower wall of the cam groove.

Means is provided to hold the fly against casual turning movement as it is being raised or lowered. This means comprises a shaft 574 (Fig. 108) journaled in bearings in the machine frame. Said shaft carries a peripheral cam 577 (Figs. 101 and 107) and a gear 578 (Figs. 101 and 108). This gear meshes with a pinion 579 (Fig. 101) which is formed integrally with the inner end of the shaft 562. In the upper end of the bracket 574 (Fig. 108) is journaled a shaft 581 (Figs. 101 and 108). The shaft 581 is also journaled in bearing 582 (Fig. 101) which is secured to the inner side of the comb-supporting beam 533 (Fig. 1). A collar 583 (Fig. 101) is fixed on the shaft 581, and secured to said collar are two outwardly extending arms 584 and 585, the ends of these arms terminating in the bearings 586 and 587, respectively. A seating plate 588 has studs 589 and 590 journaled in the bearings 586 and 587, respectively. Surrounding the shaft 581 and fixed to the bearing 582 is a tube 593 (Fig. 101). The tube 593 extends to a point adjacent to the collar 583 and is there supported on the shaft by means of a collar 593ª in which the shaft is rotatable. Integral with the bearing collar 593ª is a downwardly extending projection 594 (Fig. 108). The seating plate 588 has a downwardly extending portion 595 which is pivotally connected to the projection 594 by a link 596. As is shown best in Fig. 108, the arms 584 and 585 and the parallel link 596 maintain the seating plate 588 horizontal during its up and down movements.

On the inner end of the shaft 581 is fixed a lever 597 (Figs. 101 and 108) having a roller 598 that follows the peripheral cam 577. A spring anchor 599 (Fig. 108) is provided on the lever 597 and a spring 600 is secured thereto, the other end of said spring being connected to a spring anchor 601 which is fastened to the machine frame. The spring 600 serves to hold the roller 598 against the periphery of the cam.

Cooperating with the seating plate 588 is a seating plate 602 (Fig. 3) supported for horizontal movement up and down by means similar to that provided for the plate 588. Said means comprises a rock shaft 603 which is connected to turn in unison with the shaft 581 by means consisting of crank arms 604 (Fig. 106) fixed on said shafts and connected by a link 605. A contractile spring 606 cooperates with the cam 577 in raising and lowering the seating plates.

As has been stated, when the carriage is in the thirteenth position, the mechanisms are in readiness so that the fly may be turned or changed dependent upon the phase of the cycle. Further, it has been pointed out that the fly is carried on the arms 555 and 556 and that it is held against lateral movement by the slots 537 and 546. Rotation of the cam 570 (Fig. 105) actuates the arms 555 and 556 and causes them to lift the fly. At the same time the peripheral cam 577 (Fig. 108) is actuated. This cam causes the seating plates 588 and 602 to travel upwardly in a horizontal position trailing the fly, thus preventing it from turning. However, when the fly is turned, in a manner to be described presently, the seating plates must be dropped back an amount sufficient to clear the corners of the fly. This is provided for on the cam 577, and as soon as the corner of the fly has passed the plates, they again assume their highest position and are in readiness to precede the fly as it is caused to travel downwardly. It is apparent that the fly is turned only three times. Therefore the peripheral cam 577 is arranged so that it makes but one revolution to four operations of the arms 555 and 556. When the fly is to be discharged the seating plates follow the fly to its uppermost position and remain there until the next fly starts to travel downwardly.

The means for turning the fly comprises an angular member or hood 610 (Figs. 101 and 103) adapted to engage a corner of the fly, said hood being attached to an arm 611 which is fixed upon a shaft 612 journaled in bearings 612ª and 612ᵇ in the machine frame. Rigid with the arm 611 is a crank arm 613 which is connected by means of a link 614 to a crank arm 615 (Fig. 105). The crank arm 615 is rigidly attached to a tubular shaft 616 (Fig. 112) journaled in the machine frame. Rigid with said tubular shaft is another crank arm 617 (Figs. 105, 112 and 113) carrying a cam follower 618 which runs in the cam groove 619 (Fig. 105) of the main gear 6. The gear 6 is driven by means of a pinion 620 (Fig. 107) fixed on one end of a shaft 621 through which all of the fly-handling mechanisms are driven. One end of the shaft 621 is journaled in a bracket 622 (Figs. 82 and 103). The opposite end of said shaft is connected to the driving means as shown in Fig. 94. An intermediate bearing 623 for the shaft 621 is shown in Fig. 82.

The position shown in Figs. 103, 105, and the full lines of 107, is the position the arm 611 occupies during the time one side of a fly is being laced. When the fly is started upwardly, the hood 610 is caused to come into the dotted-line position shown in Fig. 107, which allows the hood to engage one of the right-angular corners of the fly when said fly reaches its upper position. The hood 610 then indexes or turns the fly through ninety degrees in the manner shown in Fig. 108. Fig. 108 also discloses how the seating plates 588 and 602 are dropped back to allow the corners of the fly to clear them when it is being turned. During the time the fly is being turned, or indexed, it is held in its upward position by the arms 555 and 556.

Means is provided for advancing a fly into register with the guide slots 537 and 546 and for discharging the laced fly onto the doffing conveyer. Said means includes two slides 630 (Fig. 106) and 631 (Fig. 105), said slides being mounted upon guide bars 632 (Fig. 106) and 633 (Fig. 105), respectively. The said guide bars are stationarily mounted in parallel position above and adjacent to the fly-guiding bars 536 and 543, respectively.

Bell cranks 634 and 635 (Figs. 105 and 106) are pivoted on the slides 630 and 631, respectively, the pivot point being indicated at 636. The lower arms of said bell cranks have downwardly opening recesses 637 adapted to receive the ends of the shaft of a fly. Contractile springs 638 (Fig. 107) connected to the upper arms of said bell cranks and to spring anchors 639 on the slides 630 and 631 tend to swing the bell cranks to place the lower arms thereof in contact with the fly-guiding bars 536 and 543. A pair of bell cranks 640 and 641, similar to those just described, are pivoted upon the slides 630 and 631 rearwardly of the first-mentioned bell cranks, the pivot point being indicated at 642. Contractile springs 643 arranged similarly to the springs 638 normally hold the bell cranks 640 and 641 in contact with the fly-guiding bars and the alined upper surfaces of the members 534', 535', 541 and 542. When the arms 555 and 556 raise the fly to its upper position the recessed ends of the bell cranks 640 and 641 serve to retain the fly against horizontal displacement.

The means for reciprocating the slides 630 and 631 comprises two arms 644 and 645 (Figs. 105 and 106) having at their upper ends rollers that engage channel blocks 646 on the slides. Said arms are fixed to a rock shaft 647 which is journaled in a bearing 648 (Figs. 101 and 106) in the framework and in the tubular shaft 616 (Fig. 112).

The means for swinging the arms 644 and 645 to reciprocate the slides 630 and 631 comprises a latch 649 (Fig. 111) which is mounted to swing on a pivot 650 on the arm 645. Said latch is arranged to engage the end 651 (Fig. 114) of an arm 652, said arm being adapted to lie between the hooked portion of said latch and an abutment surface 652' on a bracket 652ª on the arm 645, as shown in Fig. 113. The arm 652 is rigid with the tubular shaft 616 and therefore is oscillated by the cam 619 through the medium of the arm 617. It will be remembered that the crank arm 615 on the tubular shaft 616 operates the fly-turning hood 610, and that said hood is reciprocated once for each side of the fly. The slides 630 and 631, however, should be reciprocated only once for each fly. Consequently, the latch 649 is provided for intermittently connecting the arm 645 to the arm 652. The latch 649 is moved into and out of engagement with the arm 652 by means of an arm 653 (Figs. 111 and 114) which is pivoted in the machine frame on the axis 654. The arm 653 has a channel 655 which is curved on the arc of a circle. The latch 649 has a stud 656 (Fig. 111) which is adapted to slide in the channel 655. Rigid with the arm 653 is an arm 657 carrying a roller that runs in a cam groove 658 formed in the side of a gear wheel 659. The gear wheel 659 is mounted on a shaft 659' (Fig. 103) journaled in the machine frame, and meshes with a pinion 660 (Fig. 103) which is mounted on the shaft 562. In the rotation of the gear 659 the latch 649 is shifted into and out of engagement with the arm 652. In order to hold the slides stationary while the arm 645 is disconnected from the arm 652, a hooked detent 661 (Fig. 114) is provided on the machine frame in position to be engaged by the latch 649 when the arms 644 and 645 are in their normal forward position and the latch is raised out of engagement with the arm 652, as shown in Fig. 114. When in such position the bracket 652ª on the arm 645 rests upon a pad 662 on the machine frame, an adjusting screw 663 being provided on said bracket to bear against said pad and thus accurately position the slides. 664 is a set screw for locking the adjusting screw 663.

It will be understood from the foregoing that every fourth time the hood-actuating arm 615 is oscillated, the arm 645 is connected to and oscillated by the arm 652, thereby reciprocating the slides 630 and 631. In the rearward movement of the slides the hooked arms 634 and 635 move back into position to receive the ends of the shaft of the fly, the lacing of which has just been completed, and the hooked arms 640 and 641 move back into engagement with the ends of the shaft of the next fly (which occupies the position R—2 in Fig. 1). In the ensuing forward movement of the slides said arms push the laced fly onto the doffing conveyor and advance the next fly into register with the slots 537 and 546 and into engagement with the channeled ends 555 and 556 of the arms 557 and 558. As the slides come to rest in their normal position (shown in Figs. 105, 106 and 108), the hooked arms 634 and 635 are raised out of engagement with the shaft of the laced fly through contact of the upper bell cranks of said arms with adjustable stops 665 (Figs. 107 and 108) on the machine frame.

To prevent the lacings at the lower side of the fly from catching on the comb teeth 2ª as the fly is being doffed, I provide a guard rail 666 (Figs. 105 and 110) extending parallel with the fly rollers on the ends of said rail lying within the slots 666ª of cam plates located on the adjacent sides of the beams 533 and 540. The end portions of the rod 666 are attached to links 667 which are pivoted to arms 667ª fixed upon a rock shaft 667ᵇ journaled at the front side of the machine. Rigid with one of the arms 667ª is an arm 667ᶜ (Fig. 106) which is connected by means of a link 668 to an arm 669 that is rigid with the arm 557. When the arms 555 and 556 lift the completely laced fly, the guard rail 666 is moved up and back into position directly above the row of comb teeth 2ª. As the fly is doffed by the hooked arms 634 and 635, the lacings are drawn over the guard rail and thus prevented from fouling on the teeth 2ª.

As each fly reaches the position occupied by the fly R—2 (Fig. 1), it is yieldably retained in such position in readiness to be engaged by the hooked arms 640 and 641 by means to be now described.

To a rock shaft 670 journaled in the machine frame are rigidly connected two arms 671 and 672 (Figs. 105 and 106). The arms 671 and 672 are located adjacent to the fly-guiding bars 536 and 543, respectively. To the free end of each of the arms 671 and 672 is pivoted a detent 673 (Fig. 117), the pivot point being indicated at 674. An expansive spring 675 normally holds the detent 673 in the position shown in Fig. 117, the action of the spring being limited by a stop 676 on the detent engaging the upper side of the arm. The detents 673 cooperate with detents 677 (Figs. 105 and 107) pivoted to the fly-guiding members 536 and 543 at 678. For each detent 677 there is provided a contractile spring 679 which normally holds the detent in the position shown in Fig. 108, the detent 673 lying directly in front of the shaft of the fly R—2 and the latch 677 lying directly behind said shaft. A portion of the latch 677 engaging the lower edge of the fly-guiding bar 536 limits the action of the spring 679. When the flies are advanced by the loading conveyor the shaft of the leading fly depresses the detents 677, said detents springing up behind the shaft when the latter stops against the detents 673.

The means for withdrawing the detents 673 when a fly is to be advanced from the position shown in R—2 in Fig. 1 to take the place of a completely laced fly comprises an arm 681 (Fig. 103) fixed upon the shaft 670 and carrying a roller that travels in a cam groove 682 (Fig. 107) formed in the side of the gear wheel 659.

Means is provided for stopping the machine in case there is no fly in position R—2 when the time arrives for advancing a fly from that position into position for lacing. Said means comprises a feeler pin 690 (Fig. 117) mounted for vertical reciprocation in a bracket 691 on the machine frame adjacent to each of the arms 671 and 672. The right-hand feeler pin 690 is shown in Fig. 117, the left-hand pin being shown in Fig. 106. On the lower end of the detent 673 carried by each of said arms is a finger 692 which is held by the spring 675 in the path of the feeler pin 690 (as shown in dotted lines in Fig. 117) when there is no fly in engagement with said detent. When there is a fly in position R—2, as shown in Figs. 1 and 117, the finger 692 is held out of the path of the feeler pin 690. Said feeler pin is yieldingly moved upwardly just before a fly is to be advanced from position R—2. The feeler pin is pivoted to an arm 693 which is fixed to a rock shaft 694 (Fig. 101) that is journaled in the machine frame. Pivotally mounted on the shaft 694 is an arm 695 (Fig. 117) having a roller 696 that runs in the groove of a cam 697 (Figs. 101 and 107) which is fixed on one end of the shaft 574 (Fig. 107). Fixed to the rock shaft 694 is an arm 698 which is yieldingly connected to the arm 695 by means including a lever 699 (Figs. 101, 117 and 118) pivoted on a stud 700 on the arm 695. One arm of the lever 699 has a pin 701 (Fig. 117) which lies in a slightly elongated opening in the free end of the arm 698. The other arm of the lever 699 is normally held against a stop 702 (Figs. 101 and 117) on the arm 695 by means of a contractile spring 703 which is connected to said arm of the lever 699 and to the arm 695. The last mentioned arm of the lever 699 is connected through the medium of a rod 704 (Fig. 107) to a crank arm 705 pivoted on a pivot shaft 706 journaled in the machine frame. Fixed to the shaft 706 are arms 707 (Figs. 68 and 107) that carry the stopping bar 317. As shown in Fig. 77ª, the arm 705 has a lug 708 arranged to engage a lug 709 fixed on the pivot shaft 706. Said shaft is arranged to stop the machine.

Normally the spring 703 holds the lever 699 against the stop 702, the arms 695 and 698 and the lever 699 moving as a unit when the cam 697 swings the arm 695. The point of connection of the lever 699 and the rod 704 is so close to the rock shaft 694 that when the parts 695, 698 and 699 move as a unit no movement of practical consequence is imparted to the rod 704. However, if there be no fly in position R—2 when a fly is to be advanced to lacing position, the fingers 692 (Fig. 117) interfere with the upward movement of the feeler pins 690 and consequently with the upward movement of the arm 698. As the arm 695 continues to rise, the stud 700 lifts the lever 699. Since one arm of said lever is prevented by the arm 698 from rising, the other arm of said lever rises (the spring 703 yielding to permit such movement), thus pulling up the rod 704 (Fig. 107) and thereby turning the pivot shaft 706 and effecting stoppage of the machine.

As shown in Figs. 1, 3, 4, 5 and 104, continuously-operating conveyers are provided for loading flies into and doffing flies from the machine. The loading conveyer chain 710 (Fig. 104) runs between the flanges 544 and 545 of the fly-guiding bar 543, while the loading conveyer chain 711 is located between the ends of the bars c of the fly and the driving pulley e thereof. 712 and 713 (Fig. 3) are the doffing conveyer chains. The conveyers comprise channel bars 714 (Fig. 4) in which the chains travel. Guide bars 715 and 716 (Figs. 3 and 105) fixed in the machine frame just beneath the path of the flies prevent the latter from turning while being moved into and out of register with the guide slots 537 and 546.

The comb-supporting structure comprises two parallel bars 720 and 721 (Figs. 3, 42, 101 and 106) which are secured to the beams 538 and 540 (Figs. 105 and 106). Fixed to the bars 720 and 721 are two bars 722 and 723, respectively. The skein-spacers 1 (Figs. 42 and 116) are rigidly attached to the bars 722 and 723. The first and last comb sections are provided with structures which act as safety devices to insure that the fly is properly seated, for, if the fly were not in the proper position when the carriage is returned, the upper conduit block 152 would collide with the skeins. Figs. 115 and 116 illustrate this safety device as applied to the last comb structure (the one farthest to the right in Fig. 3). A plate 724 is pivotally mounted at 725 and is arranged so that it extends over the top of the horizontally projecting portion of the stationary teeth 2ª. A spring 725ª holds the plate 724 in the dotted position shown in Fig. 116 when the plate is not held down by a skein. A downwardly extending finger 726 is integral with the plate 724. As is shown best in Fig. 3, a feeler bar 727 extends slidably across the machine and has rearwardly extending lugs 728 and 729. A plate similar to the plate 724 is provided in the first comb structure. If the fly is properly seated these plates are held in the full-line position of Fig. 116, fingers 726 occupying the full-line position shown in said figure; and when the bar 727 is reciprocated, in the manner to be described hereinafter, the lugs 728 and 729 will clear the fingers 726. However, if the fly is not properly seated, either or both of the plates 724 will occupy the position shown by the dot dash lines in Fig. 116, and the finger or fingers 726 will lie in the path of the lugs 728 and 729 and will halt these lugs and therefore the feeler bar 727, and thereby prevent the carriage lock 522 (Fig. 82) from being disengaged from the latch block 520 on the indexing bar 14. The means for disengaging the locking arm 522 from the latch block 520 comprises a cam 730 (Fig. 102) on the side of the main gear 6, said cam being arranged to engage a cam follower 731 on an arm 732 fixed to one end of the shaft 523 (Fig. 119). A coiled expansive spring 732' (Fig. 102) holds the cam follower 731 against the cam. Fixed on the shaft 523 is an arm 733 to which is pivoted a dog 734 (Fig. 82) adapted to rest upon the upper end of and bear against a shoulder 735 on an arm 736.

The arm 736 is rigid with the locking arm 522 (Fig. 119). A spring 737 tends to raise the dog 734 out of position to engage the shoulder 735. Rigid with the dog 734 is a lug 738 which is arranged to be engaged by a roller 739 on the lower arm of a lever 740 which is pivoted in the machine frame at 741. The upper arm of said lever is pivoted to one end of the feeler bar 727. A contractile spring 742 connected to said lever and anchored at 743 furnishes the power for imparting the feeling stroke to the bar 727.

The cam 730 is positioned on the gear 6 so that it functions just before the fly-handling mechanisms complete their operations, i. e., when the carriage C is to be returned into position below the first skein. The cam moves the arms 732 and 733 toward the right in Fig. 82. If the fly is properly seated, the spring 742, acting through the lever 740, holds the dog 734 down behind the shoulder 735; and the arm 733 is thus enabled to swing the arm 736 toward the right in Fig. 82, thereby disengaging the latch arm 522 from the block 520, and permitting the springs 470 and 471 to return the carriage C into position to lace the first skein. If, however, the fly is not properly seated at both ends, the feeler bar 727 prevents the spring 742 from moving the lever 740; consequently, the spring 737 raises the dog out of position to engage the shoulder 735, and the latch arm 522 remains in engagement with the block 520.

It will be remembered that the mechanisms on the carriage are driven by means of the spline shaft 100, and that the fly-handling mechanisms are driven by the shaft 621 (Fig. 107). The means for supplying power to these shafts will now be described.

As shown in Figs. 3 and 82, a shaft 744 is journaled in bearings 745 and 746 (Figs. 82 and 83) in the machine frame. On the outer end of the shaft 744 is a loose pulley 747 and a tight pulley 748 to receive a drive belt 749. A belt shifter fork 750 (Fig. 3) is arranged in a well known manner to be operated by either of two hand levers 751 and 752 (Fig. 2) and a slide rod 753 connecting said levers and extending across the front of the machine. The shaft 744 carries at its inner end a pinion 754 (Figs. 83 and 84) which meshes with a spur gear 755 (Fig. 82) through which power is transmitted to the spline shaft 100.

Meshing with the spur gear 755 is a smaller gear 756 (Figs. 82 and 94) through which power is transmitted to the shaft 621. The gears 755 and 756 are continuously driven, means being provided whereby power is transmitted to the spline shaft 100 and the shaft 621 alternately. The means just referred to comprises a clutch and a brake interposed between the gear wheel 755 and the spline shaft 100, and a clutch and brake interposed between the gear wheel 756 and the shaft 621. While said clutches and brakes may be of any preferred construction, they are herein shown as of the common multiple disk type. The two sets of clutches and brakes may be, and herein are, similar in construction. The clutch for driving the spline shaft 100 is numbered 757 (Fig. 82) and the brake associated therewith is indicated at 758. The clutch for driving the shaft 621 is designated 759, the associated brake being numbered 760. The construction of the clutches and brakes and the manner in which they are mounted is illustrated in Fig. 94.

Referring first to the means for driving the shaft 621: A shaft 761 (Fig. 94) is mounted in bearings 762 and 763. One end of the shaft 761 has a driving connection with the shaft 621. Rotatably mounted upon the shaft 761 is a sleeve 764 to which the gear wheel 756 is fixed. At one end of the sleeve 764 is a flange 765 which forms one side of the friction clutch 759. This clutch consists of the metallic disks 766 and the fibrous disks 767. The metallic disks 766 have a splined connection with the shaft 761 so as to drive said shaft. The fibrous disks 767 are carried by bolts 768 supported by the flange 765 and a cooperating flange 769. Springs 769ᵃ of the usual character tend to hold the flanges 765 and 769 apart.

Interposed between the shaft 761 and the collar 770 of the flange 769 is a sleeve 771 provided with an enlarged portion 772 forming a shoulder 773. Adjacent to the shoulder 773 is a flange 774 forming one side of the brake 760. Rigid with the machine frame is an annular flange 775 forming the opposite side of the brake 760. A disk structure comprising the fibrous disks 776, expansive springs 776ᵃ and metallic disks 777 is provided between the flanges 774 and 775, the fibrous disks being nonrotatable with reference to the machine frame and the metallic disks having a spline connection with the shaft 761. A collar 778 (Fig. 94) is mounted upon the sleeve 771 adjacent to the shoulder 773, and has two studs 779 for engagement by an operating fork hereinafter described. It will be seen that movement of the collar 778 toward the right in Fig. 94 will throw in the friction clutch 759, thus causing the shafts 761 and 621 to be driven by the continuously rotated gear 756, and that movement of the collar 778 toward the left in Fig. 94 will throw out the clutch 759 and apply the friction brake 760, thus arresting the shafts 761 and 621.

To permit of driving the machine at a lower speed than that afforded by the pulley 748, a tight pulley 780 (Fig. 94) may be mounted on the sleeve 764 and driven from a low-speed source of power. 781 is a loose pulley on said sleeve.

The clutch 757 and the brake 758 are mounted upon a shaft 782 (Fig. 82) journaled in the machine frame parallel with the shaft 761, and are arranged to be operated by a collar 783 (Fig. 88) like the collar 778. One end of the shaft 782 is connected (as shown in Fig. 86) to the spline shaft 100.

The means for operating the clutches 757 and 759 and the brakes 758 and 760 comprises two forks 784 and 785 engaging the studs on the collars 778 and 783, respectively (Figs. 83 and 84). These forks are pivotally mounted on a vertical shaft 786. Rigid with the fork 785 is an arm 787 (Figs. 83 and 95) to which is connected a contractile spring 788 (Fig. 88) that tends to move said arm in the direction to throw out the clutch 757 and apply the brake 758. The means for moving the arm 787 to throw in the clutch 757 and release the brake 758 comprises an arm 789 (Figs. 83 and 95) pivoted on the shaft 786 and connected to a contractile spring 790 (Fig. 88) which is stronger than the spring 788. On the arm 789 is pivoted a dog 791 (Fig. 95). A contractile spring 792 tends to hold the dog in engagement with a lug 793 on the arm 787. The means for restraining the spring 790 comprises an arm 794 (Figs. 83, 84 and 95) which is rigid with the arm 789 and is arranged to be engaged by a latch arm 795 pivoted at 796. A contractile spring 797 (Fig. 95) tends to move the latch arm 795 toward the arm 794. Rigid with the latch arm is an arm 798 which is located in position to be moved by a pin 799 (Fig. 89) on the lower side of the carriage-indexing bar 14 as the carriage returns to operative position beneath the first skein. With the levers in the position shown in Fig. 97, impingement of the pin 799 against the arm 798 disengages the arm 795 from the arm 794, whereupon the spring 790 acting through the arm 789 and the dog 791 moves the arm 787 toward the right into the position shown in Fig. 95, thus throwing in the clutch 757 and releasing the brake 758. The carriage C will then be moved step-by-step beneath the fly.

When the carriage C has completed its step-by-step movement, means to be now described disengages the dog 791 from the lug 793, and thus allows the spring 788 to move the arm 787 and the fork 785 in the direction to throw out the clutch 757 and apply the brake 758. On one side of the gear wheel 481 (Fig. 86) are two diametrically opposite cams 800. When the carriage-indexing shaft 447 (Fig. 86) is slid out of operative relation to the indexing bar 14, the gear wheel 481 is placed in such position that one of the cams 800 may engage a roller 801 (Fig. 95) on one arm of a lever 802 pivoted in the machine frame at 803. An expansive spring 804 normally holds the other arm of the lever 802 out of contact with a pin 805 on a lug 806 attached to the dog 791. Engagement of the cam 800 with the roller 801 disengages the dog 791 from the lug 793, whereupon the spring 788 moves the arm, 787 and the fork 785 into the position shown in Fig. 96, thus throwing out the clutch 757, applying the brake 758 and stopping the spline shaft 100 and hence the shaft 447, the carriage C being then in its thirteenth position.

The means for operating the upper fork 784 comprises an arm 807 (Figs. 83, 84 and 98) rigid with said fork and connected to a contractile spring 808 that tends to move said arm and fork toward the right in Figs. 84 and 98 to throw in the clutch 759 and release the brake 760. To move the arm 807 in the opposite direction I provide an arm 809 (Figs. 83, 84, 88 and 98) pivoted on the shaft 786 and connected to a contractile spring 810. The spring 810 is more effective than the spring 808. A dog 811 (Figs. 98 and 98ᵃ) pivoted on the arm 809 at 812 is acted upon by a contractile spring 813 which tends to hold the dog behind a lug 814 on the arm 807 as shown in Figs. 98 and 100. When the carriage-indexing shaft 447 is slid into inoperative position, one of the cams 800 engages a roller 815 (Figs. 84 and 98) on one end of a lever 816 pivoted at 817, thus causing the other end of said lever to engage a pin 818 on the dog 811, and thereby disengage the dog from the lug 814. The spring 808 thereupon moves the arm 807 in the direction to throw in the clutch 759 and release the brake 760 as shown in Fig. 99. The fly-handling mechanism is thus set in operation to index or doff the fly. An expansive spring 818ᵃ (Fig. 98) normally holds the lever 816 out of engagement with the pin 818.

The means for placing the arms 789 and 809 in position where the dogs 791 and 811 may again engage the lugs 793 and 814, respectively, preparatory to moving the arm 787 to throw in the carriage clutch and moving the arm 807 to throw out the fly-handler clutch comprises a cam 819 (Figs. 82 and 83) fixed on the shaft 562 and engaging a roller 820 on one arm of a bell crank 821 which is pivoted at 822. The other arm of said bell crank is forked to engage a stud 823 (Fig. 84) on an arm 824 fixed on the shaft 786. Said shaft has a key 825 (Figs. 84ᵃ and 84ᵇ) that lies within a recess 826 in the hub of the bell crank 789—794. The shaft 786 also has a key 825ᵃ that lies within a recess 827 in the hub of the arm 809. These recesses are sufficiently large so that the shaft 786 may swing in one direction to restore the arm 789 without moving the arm 809, and may swing in the opposite direction to restore the arm 809 without moving the arm 789. When the shaft turns counterclockwise in Fig. 84, the bell crank 789—794 is moved so as to allow the latch 795 to snap into engagement with the arm 794, as shown in Fig. 97, the dog 791 being thus placed behind the lug 793. When the shaft 786 turns in the opposite direction the arm 809 moves into the position shown in Fig. 100 (the dog 811 being thereby placed behind the lug 814), in which position the arm 809 is retained by a latch 828 pivoted at 817 and acted upon by an expansive spring 829. The latch 828 is arranged to engage a notched lug 830 on the arm 809, as in Fig. 100.

A cycle of operations of the fly-handling mechanisms (i. e., a cycle of indexing operations or a cycle of changing operations) is complete in one revolution of the shaft 562. As said shaft completes a revolution, a cam arm 831 (Figs. 83, 84 and 88) fixed thereto engages a roller 832 on an arm 833 which is rigid with the latch 828, and thereby disengages the latch from the lug 830, whereupon the spring 810, acting through the arm 809 and the dog 811, moves the arm 807 and the fork 784 in the direction to throw out the fly-handler clutch 759 and apply the brake 760.

Fig. 109 is a cam chart for the fly-indexing and changing mechanisms. The chart is divided into four parts by the lines XY, ZW, UV and ST, the uppermost part representing a cycle in relation to one side of a fly, the next lower part indicating a cycle in relation to the next side of the fly, and so on, the lowermost part representing the cycle of operations incident to the changing of flies.

The line representing the fly-changing cam 619 is dotted through the entire first and second operations, and part of the third and fourth operations. This is to indicate the fact that the cam revolves during these times, but since the latch 649 (Fig. 111) controlled by the cam 658 (Fig. 114) is unlatched the arm 652 rocks back and forth without operating the fly-changing mechanism.

On the zero line of the cam chart, in the first of the four sections, the various mechanisms occupy these positions: Clutch and brake-resetting cam 819 (Fig. 83) is on a dwell; comb-oscillating cam 6ᵃ (Fig. 102) is on a dwell with the comb closed; fly-lifting cam 570 (Fig. 105) is on a dwell with fly seated; fly-indexing arm 611 is in the full line position of Fig. 107; latch 649, as noted above, is unlatched (as shown in Fig. 114); latch-shifting cam 658 is on a dwell; fly-detent cam 682 (Fig. 107) is on a dwell; cam 577 (Fig. 107) is on a dwell; and cam 697 (Fig. 117) is on a dwell. As indicated in the second and third sections of the chart, the fly-handling mechanisms go through the same operations for the third and fourth sides of the fly as for the second side.

Referring now to the first section of the chart, the point 840 indicates the time at which the arms 555 and 556 are caused, by the cam 570, to start lifting the fly. At the point 841, the cam 577 starts to raise the fly seating plates 588 and 602. At the point 842, the cam 6ᵃ starts to open the comb so that the laces may pass up between the tooth elements 2ᵃ and 2′, and at the point 843 this action ceases and a dwell on the cam causes the comb to remain at rest until the point 844 is reached, when the opening is again resumed.

At the point 845 the hood 610 will be occupying the dot-dash position of Fig. 107 so as to engage the corner of the fly, and at the point 846 it starts to turn or index the fly.

At the point 847, the fly seating plates will have reached their maximum height, whereupon they immediately start to travel downwardly so as to clear the corner of the fly, and at the point 848 they reach a position in which they dwell for a short time until the point 849 is reached, when they again travel upwardly to their top position, which is attained at the point 850, where they dwell.

At the point 851, the clutch and brake resetting cam 819 starts to reset the clutch 757 for the carriage, this action being completed at the point 852, whereupon the resetting mechanism starts to move into a position from which it will reset the fly-handler clutch 759, this position being reached at the point 853.

At the point 854 the comb is open its full extent and it dwells in this position until the point 855 is reached, whereupon it starts to close, this action being completed at the point 856. The point 857 is juxtaposed to the series of rises and falls in the cam 6ª. The follower of this cam immediately engages these and causes the comb to be vibrated, and thus enter the skeins without injury to the silk. This vibratory action is illustrated by the serrated portion of the line representing the cam 6ª.

At the point 858, the arms 555 and 556 will have raised the fly to its maximum upper position, where it dwells until the point 859 is reached. The arms then start to carry the fly downwardly and when the point 862 is attained, the fly will be seated in position to be laced.

At the point 863, the hood 610 will have completed turning the fly and it dwells until the point 864 is reached when it starts to return to the full-line position of Fig. 107, it being halted in this position at the completion of the cycle.

At the point 865, the fly-seating plates start to travel downwardly, preceding the fly so as to prevent its turning about in the arms 555 and 556. When the point 868 is reached, they will have assumed their at-rest position.

The clutch and brake resetting cam 819 will have reset the fly handler clutch 579 at the point 853, and thus, at this point, starts to travel to inoperative position, which is attained at the point 869 when it starts to dwell.

As the fly-handling mechanisms complete the cycle of operations, the cam arm 831 (Fig. 84) allows the spring 810 to throw out the fly-handler clutch 759 and apply the brake 760, whereupon said mechanisms stop in the zero position. They occupy this position until the carriage has laced the second side of the fly, whereupon they go through another cycle of operation which positions the parts for the lacing of the third side of the fly.

The next cycle (the third section of the chart) which positions the parts for the lacing of the fourth side of the fly is somewhat different from the preceding two cycles, although it is the same so far as parts 819, 6ª, 570, 611, 682 and 577 are concerned.

At the point 870, the latch 649 will lock the arms 645 and 652 together as shown in Fig. 113. This brings the fly-changing mechanism into operation. Referring to the cam chart, it may be seen that at the point 870, the latch 649 starts to function, and completes the latching at 871. At an almost identical time, indicated by 872, the fly-changing mechanisms start to function. Fig. 107 indicates the fly-changing mechanisms in the position they occupy at the point 873.

At the point 874 the fly detent safety cam 697 starts to move the feeler finger 690 upwardly so as to determine if the succeeding fly is in position, and at the point 875 the finger 690 will have attained its maximum upward position and starts to dwell.

In the fourth section of the chart (the changing cycle) the parts 819, 6ª, 570 and 611 function similarly to their operations in the first three cycles, which are the fly-indexing cycles. At the point 876, the arms 634 and 635 will have moved back so that they are over the slots 537 and 546. They are then in position to receive the shaft of the completely laced fly, when the latter is raised by the arms 555 and 556. Upon reaching this point, they dwell until the point 877 is attained, whereupon they start to move the fly forward onto the doffing conveyer. They continue this movement until the point 878 is attained, when the arms engage the pins 665, which cause them to be swung upwardly and releases the fly. The fly-changing mechanisms then dwell until the point 879 is reached when they are rendered inoperative until the point 872 is attained in the third cycle of the next fly.

At the point 880, the cam 658 starts to function so as to unlock the arms 645 and 652. It completes this action at the point 881, whereupon these mechanisms start to dwell until the point 870 is attained in the third cycle of the next fly.

At the point 882 the fly detents 673 start to move downwardly out of the path of the shaft of the fly so that when the arms 640 and 641 engage said shaft they will be able to carry it forward to the arms 555 and 556. The fly detents reach their lower-most position at 883 and dwell until the point 884, whereupon they start to rise. They assume their normal positions at the point 885, whereupon they dwell until the point 882 is attained in the fourth cycle of the next fly.

At the point 886, the finger 690 will cease its dwell in the upper position and will start its travel downwardly to its normal position, which is attained at the point 887.

The fly-seating plates 588 and 602 function similarly in this fourth cycle until the point 847 is reached, whereupon the cam 577, which makes only one revolution in the four cycles, as described, does not permit the seating plates to drop back, as the fly is not turned during this fourth cycle. At the point 865, the seating plates resume their normal functions.

In the event that the lacing chains are prevented from reciprocating, or the passing-in fingers 214 and 215 strike some obstruction, or the lacing supply becomes exhausted, or there is no fly in position R—2 at the necessary time, the carriage clutch 757 is thrown out by means of the mechanism shown in Fig. 68. A contractile spring 890 connected to an arm 891 rigid with the shaft 706 normally holds the arm 707 against a stop screw 892. The arm 891 carries a pin 893 which is arranged to push the lever 802 against the pin 805 on the portion 806 of the dog 791 (Fig. 95), thereby disengaging said dog from the lug 793 on the arm 787, and thus permitting the spring 788 to throw out the carriage clutch 757 and apply the brake 758. This suspends all operations of the machine. After the trouble has been corrected, the carriage clutch is manually thrown in by replacing the arm 787 in engagement with the dog 791.

As hereinbefore described, the return of the carriage into position below the first skein is controlled by the cam 730 (Fig. 102) acting through the arm 732, etc. The arrival of the carriage into position below the first skein normally causes the throwing in of the carriage clutch 757 through operation of the latch 795 (Fig. 95). The throwing out of the fly-handler clutch 759 and the application of the brake 760 is effected by the cam arm 831 (Fig. 84) acting on the roller 832 (Fig. 100). If after the cam arm 831 has acted upon the roller 832, the fly-handler brake 760 were to stop the fly-handling mechanisms before they had quite completed their operations, the carriage clutch 757 should not be thrown in, as the lacing mechanisms should not begin to operate until the fly-handling mechanisms have finished their operations. I, therefore, provide a bell crank 894 (Figs. 88 and 102ª) pivoted in the machine frame at 895, one arm of said bell crank being arranged to move the arm 891 (Figs. 68 and 88) to swing the dog 791 (Fig. 95) out of position behind the lug 793. The other arm of the bell crank 894 is connected through a link 896 (Fig. 102ª) to the arm 732 at 896ª (Fig. 102). If, after the cam arm 831 has engaged the roller 832, the fly-handling mechanisms stop before they have quite completed their cycle of operations and while the cam 730 (Fig. 102) is in engagement with the roller 731, the bell crank 894 will hold the dog 791 in ineffective position so that although the carriage C is permitted to return to position below the first skein the resulting disengagement of the latch 795 from the arm 794 will not cause the carriage clutch 757 to be thrown in, since the dog 791 will pass the lug 793 without pushing the arm 787 into the clutch-engaged position shown in Fig. 95.

The carriage remains in its thirteenth position during the entire time the fly-handling mechanisms are operating. During this time, lint and the like is blown from the conduit blocks by the means shown in Figs. 77, 78 and 79. A conduit 897 is mounted on the machine frame to slide in a path parallel with the path of the carriage. The conduit is reciprocated by means including a link 898 connected at one end to said conduit and at its other end to one arm of a bell crank 899 pivoted at 900 in the machine frame. The other arm of the bell crank is connected to a link 901 which is pivoted to a stud 902 on the hub of the cam arm 831. Said stud is long enough to allow the cam arm to clear the link 901. The conduit 897 is connected to a flexible conduit 903 which in turn is connected to a conduit 904 supported in the machine frame and connected to a source of air under pressure. A spring-closed valve 905 in the conduit 904 is arranged to be opened by means of a lever 906 (Figs. 77 and 83) pivoted at 907 and carrying a roller 908 adapted to run upon the periphery of the cam 819. In said cam is a depression 909 (Fig. 83) into which the roller runs to allow the valve to close at the end of the fly-handling cycle. The conduit 897 has a nozzle 910 (Fig. 79) provided with openings through which air is directed into the chain-guiding passages of the conduit blocks 149 and 152. The removal of lint from the conduit blocks makes for smoother and better operation of the lacing chains 188 and 189 and reduces the likelihood of these chains becoming covered with fuzz which otherwise would probably adhere thereto, since it is advantageous that the chains be covered with a film of oil.

Summarizing the operations of the machine, and assuming the carriage C to be standing idle in its thirteenth position, it may be stated that the cam 730 (Fig. 102) releases the carriage to the action of the returning springs 470 and 471 by operating the latch 522 (Fig. 82), provided both of the end skeins on the fly are far enough down on the comb. When the carriage stops against the buffer 474ª (Fig. 89), the pin 799 (Fig. 84) on the indexing bar 14, strikes the arm 798 and thus releases the spring 788, enabling the latter to throw in the carriage clutch 757 and release the carriage brake 758. In the meantime the cam arm 831 (Fig. 84) has thrown out the fly-handler clutch 759 and applied the brake 760. The spline shaft 100 is driven through the carriage clutch 757, thus actuating the mechanisms on the carriage and causing the carriage to move step by step along the fly. As the carriage is traveling from the twelfth to the thirteenth position the plow 505 (Figs. 59 and 89) on the indexing bar 14 engages the arm 506, thus lowering the bar 494 into engagement with the pin 496, whereupon the cam 507 moves the lever 490 away from the lever 485 (Fig. 86), thereby allowing the spring 488 to slide the shaft 447 into inoperative position. The travel of the carriage is thereby suspended, and the cams 800 (Fig. 86) on the side of the gear wheel 481 throw out the carriage clutch and throw in the fly-handler clutch. The fly-handling mechanisms now go through a cycle of operations, at the end of which the cam 730 (Fig. 102) again releases the carriage, and the cam arm 831 throws out the fly-handler clutch.

If a fly is not properly seated on the comb, the carriage remains latched in its thirteenth position, the fly-handling mechanisms complete their cycle, the fly-handler clutch is thrown out by the cam arm 831 acting on the roller 832 (Fig. 98), and the carriage clutch remains thrown out. The fly-handler clutch is then manually thrown in to cause the machine to discharge the defective fly, and place the next fly in lacing position.

While the present embodiment of the invention has been described in considerable detail, it will be understood that the invention is not limited to such details, but that, on the contrary, various changes may be made in the construction and relative arrangement of the several mechanisms without departing from the spirit and scope of the invention as defined in the appended claims. Moreover, it will be apparent that when a fully automatic machine such as herein disclosed is not desired, certain mechanisms, as, for example, the fly-handling mechanisms and their driving means may be omitted. Furthermore, the lacing mechanism may be adapted to the lacing of skeins having openings formed by means other than that herein shown. It may also be noted that the comb may be useful in an apparatus or appliance wherein the lacing is effected in a manner different from that herein disclosed.

I claim as my invention:

1. In a machine for lacing a series of skeins mounted upon a fly, a comb substantially coextensive with the series of skeins and comprising members to enter the spaces between skeins, and series of teeth between said spacing members to enter the skeins, each tooth comprising a relatively stationary member, and a hood to cover the point of said stationary member, said hood being vibratory longitudinally of the skein, there being an alined series of recesses extending through the series of spacing members and comb teeth from end to end of the comb, lacing guiding means arranged to travel through said series of recesses step by step within the skeins, and cooperating lacing guiding means having a similar traveling movement at the other side of the skeins.

2. In a machine for lacing a series of skeins mounted upon a fly, a comb substantially coextensive with the series of skeins and comprising members to enter the spaces between skeins, and series of teeth between said spacing members to enter the skeins, there being an alined series of recesses extending through the series of spacing members and comb teeth from end to end of the comb, lacing guiding means arranged to travel through said series of recesses step by step at the inner side of the skeins, and cooperating lacing guiding means having a similar traveling movement at the outer side of the skeins.

3. In a machine for lacing a series of skeins mounted upon a fly, a comb substantially coextensive with the series of skeins and comprising teeth to enter the skeins, each tooth comprising a relatively stationary member and a hood to cover the point of said stationary member, said hood being vibratory longitudinally of the skein, there being an alined series of spaces between said tooth members and hoods, lacing guiding means arranged to travel through said series of spaces step by step at the inner side of the skeins, and cooperating lacing guiding means having a similar traveling movement at the outer side of the skeins.

4. In a machine for lacing a series of skeins mounted upon a fly, a comb substantially coextensive with the series of skeins and comprising members to enter the spaces between the skeins, and series of teeth between said spacing members to enter the skeins, there being an alined series of recesses extending through the series of spacing members and comb teeth from end to end of the comb, a conduit block arranged to travel step by step through said series of recesses within the skeins, a cooperating conduit block arranged to travel at the outer side of the skeins, said blocks being arranged for movement toward and away from each other, and means including mechanisms mounted within said skein spacing members for moving the first conduit block toward the other conduit block.

5. In a machine for lacing a series of skeins mounted upon a fly, a comb substantially coextensive with the series of skeins and comprising members to enter the spaces between skeins, and series of teeth between said spacing members to enter the skeins, there being an alined series of recesses extending through the series of spacing members and comb teeth coextensive with the series of skeins, a conduit block arranged to travel step by step through said series of recesses at the inner side of the skeins, and a cooperating conduit block arranged to travel at the outer side of the skeins.

6. In a machine for lacing a series of skeins mounted upon a fly, a comb substantially coextensive with the series of skeins and comprising members to enter the spaces between skeins, and series of teeth between said spacing members to enter the skeins and divide the same into bundles, each tooth comprising a relatively stationary member and a hood to cover the point of said stationary member, there being an alined series of recesses extending through the series of spacing members and comb teeth from end to end of the comb, and means arranged to operate in said recesses for lacing the bundles, said tooth members and hoods being movable apart to permit the lacings to be withdrawn between them.

7. In a machine for lacing a series of skeins mounted upon a fly, a comb substantially coextensive with the series of skeins and comprising members to enter the spaces between skeins, and series of teeth between said spacing members to enter the skeins, each tooth comprising two parts one of which covers the point of the other, there being a space between said tooth parts, there being a series of recesses extending through the series of spacing members from end to end of the comb, in alinement with the spaces in the teeth, a conduit block arranged to travel step by step through said series of recesses and spaces at the inner side of the skeins, and a cooperating conduit block arranged to travel at the outer side of the skeins, said blocks being arranged for movement toward and away from each other.

8. In a skein lacing machine, the combination of means for dividing a skein into bundles, said dividing means being chambered to provide space within and outside of the skein, an upper conduit block adapted and arranged to enter the space between said dividing means within the skein, a lower conduit block adapted and arranged to enter the space outside of the skein, said blocks being recessed on their adjacent faces to accommodate the bundles, and means for drawing a lacing through said conduit blocks.

9. In a skein lacing machine, the combination of a comb for dividing a skein into bundles, the teeth of said comb being arranged to provide spaces within and outside of the skein, a conduit block adapted and arranged to enter the spaces in said teeth within the skein, a conduit block adapted and arranged to enter the space outside of the skein, said blocks being recessed on their adjacent faces to accommodate the bundles, and means for drawing a lacing through said conduit blocks.

10. In a skein lacing machine, the combination of means for dividing a skein into bundles, the bundles occupying the same plane, two members each having means to engage a lacing, means for guiding said members through wavy paths of opposite phase around the bundles, means for presenting to said engaging means the legs of a bight of lacing, and means to hold the midportion of the lacing while said members are drawing the legs of said bight of lacing around the bundles.

11. In a skein lacing machine, the combination of means for dividing a skein into bundles, the bundles occupying the same plane, two chains each having means at one end to engage a lacing, and two conduit blocks arranged to lie at opposite sides of the skein and having recesses in their adjacent faces to contain the bundles, said blocks having therein two wavy channels of opposite phase to guide said chains around the bundles.

12. In a skein lacing machine, the combination of means for dividing a skein into bundles, the bundles occupying the same plane, two devices each having means to engage a lacing, means for guiding said device to move through wavy paths of opposite phase around the bundles, and means for simultaneously reciprocating said devices along said paths.

13. In a skein lacing machine, the combination of means for dividing a skein into bundles, the bundles occupying the same plane, two chains each having means at one end to engage a lacing, and means for guiding said chains through wavy paths of opposite phase to carry the lacing around the bundles.

14. In a skein lacing machine, the combination of means for dividing a skein into bundles occupying the same plane, two conduit blocks recessed on their adjacent faces to accommodate the bundles, and means for drawing a lacing through said conduit blocks.

15. In a skein lacing machine, two conduit blocks adapted to be placed side by side and having registering recesses in their adjacent sides, each of said blocks having two slots intersecting said recesses, the walls of said slots having two wavy passageways of opposite phase therein extending around said recesses.

16. In a skein lacing machine, the combination of means for dividing a skein into bundles, two flexible inextensible lacing members, each having a hook on one end to engage a lacing, and means for guiding said members to carry the lacing around the bundles.

17. In a skein lacing machine, the combination of means for dividing a skein into bundles, two flexible inextensible lacing members having means at adjacent ends to engage a lacing, and means for guiding said members to draw the lacing around the bundles.

18. In a skein-lacing machine the combination of means for dividing a skein into bundles, an upper conduit block, a lower conduit block, said blocks being recessed in their adjacent faces to accommodate the bundles, means operable in the upward movement of the lower conduit block to engage and depress the upper conduit block to close said blocks together, two flexible lacing members, said blocks having passages adapted to guide said members around the bundles, and means for actuating said lacing members to draw a lacing around the bundles.

19. In a skein-lacing machine, the combination of means for dividing a skein into bundles, an upper conduit block, a lower conduit block, said blocks being recessed in their adjacent faces to accommodate the bundles, means operable in the upward movement of the lower conduit block to engage and depress the upper conduit block to close said blocks together, said blocks having two passages extending around the bundles, one passage going above and the other below a given bundle, and means for drawing a lacing through said passages.

20. In a skein-lacing machine, the combination of means for dividing a skein into bundles, an upper conduit block, a lower conduit block, said blocks being recessed in their adjacent faces to accommodate the bundles, and means operable in the upward movement of the lower conduit block to engage and depress the upper conduit block to close said blocks together.

21. In a skein-lacing machine, the combination of means for dividing a skein into bundles, an upper conduit block, a lower conduit block, said blocks being recessed on their adjacent faces to accommodate the bundles, means for closing the conduit blocks together, two flexible inextensible lacing members, said blocks having passages adapted to guide said members around the bundles, means at the end of each member to engage a lacing, means to support a lacing in the form of a bight with the legs of the bight in position to be engaged by said members, and means for passing the members through said passages into position to engage the lacing and for withdrawing the members from said passages to carry the lacing around the bundles.

22. In a skein-lacing machine, the combination of means for dividing a skein into bundles, said dividing means being chambered to provide space above and below the skein, means to embrace each bundle, said embracing means being adapted and arranged to enter said spaces, and means for drawing a lacing around said bundles.

23. In a skein-lacing machine, the combination of means for dividing a skein into bundles, said dividing means being chambered to provide space above and below the skein, means to embrace each bundle, the last mentioned means being adapted and arranged to enter said spaces, two lacing chains, said bundle-embracing means having passages adapted to guide said chains around the bundles, means at the end of each chain to engage a lacing, means to support a lacing in the form of a bight with the legs of the bight in position to be engaged by said chains, and means for passing the chains through said passages into position to engage the lacing and for withdrawing the chains from said passages to carry the lacing around the bundles.

24. In a skein-lacing machine, the combination of means for dividing a skein into bundles, said dividing means being chambered to provide space above and below the skein, an upper conduit block adapted and arranged to enter the space within said dividing means above the skein, a lower conduit block adapted and arranged to enter the space below the skein, said blocks being recessed on their adjacent faces to accommodate the bundles, means for closing the conduit blocks together, two lacing chains, said blocks having passages adapted to guide said chains around the bundles, means at the end of each chain to engage a lacing, means to support a lacing in the form of a bight with the legs of the bight in position to be engaged by said chains, and means for passing the chains through said passages into position to engage the lacing and for withdrawing the chains from said passages to carry the lacing around the bundles.

25. A skein-lacing machine having, in combination, means for holding a supply of cord, a tension device for the cord, a clamp, a combination clamp and shear, means to reciprocate said combination clamp and shear between said tension device and the first clamp, means to open the combination clamp and shear after the latter has inserted the cord in the first clamp and for closing said combination clamp and shear after the latter has been returned into position adjacent the tension device to cut off the portion of the cord held by the first clamp and retain the end of the cord adjacent said tension device in the combination clamp and shear, lacing means, and a device adapted to engage the cord and move the latter in the form of a bight to the lacing means, cord being supplied to said engaging device through slippage in the tension device, and the combination clamp and shear acting to sever the cord adjacent to the tension device after the engaging device has drawn the bight near the lacing means.

26. A skein-lacing machine having, in combination, means to hold a lacing in extended position, means to lace a skein, and a device adapted to engage the lacing and move the latter in the form of a bight to the lacing means.

27. A skein-lacing machine having, in combination, means for dividing a skein into bundles, two flexible lacing members, means for guiding said members around the bundles, means at the ends of said members to engage a bight of lacing material, and means for reciprocating said members in said guiding means, one member passing above and the other below a given bundle.

28. A skein-lacing machine having, in combination, means for dividing a skein into bundles, two flexible inextensible lacing members, means for guiding said members around the bundles, means at one end of each member to engage a bight of lacing material, and means engaging the opposite ends of said members for reciprocating said members in said guiding means, one member passing above and the other below a given bundle.

29. A skein-lacing machine having, in combination, means for dividing a skein into bundles, two flexible inextensible lacing members, means having passages for guiding said members around the bundles, means at the ends of said members to engage a bight of lacing material, and means for simultaneously reciprocating said members in said passages, one member passing above and the other below a given bundle.

30. In a machine for lacing a skein mounted upon a fly, the combination of a tooth for piercing the skein, means for causing a relative approaching movement between the skein and the tooth, and means for rapidly vibrating the tooth in a direction lengthwise of the skein as the tooth is entering the skein.

31. In a skein-lacing machine, the combination of a series of comb teeth for piercing a skein, each of said teeth comprising a hood and a stationary tooth member the point of which is covered by said hood.

32. In a skein-lacing machine, the combination of a series of comb teeth for piercing a skein, each of said teeth comprising a hood arranged for vibration lengthwise of the skein, and a stationary tooth member the point of which is covered by said hood.

33. In a machine for lacing a series of skeins mounted upon a fly, the combination of a series of spacers adapted to occupy the spaces between the skeins, and a series of comb teeth between every two skein-spacers for piercing the skeins, each of said teeth comprising a hood arranged for vibration lengthwise of the skein, and a stationary tooth member the point of which is covered by said hood.

34. In a machine for lacing a series of skeins mounted upon a fly, a comb substantially coextensive with the series of skeins and comprising a series of teeth to enter the skeins, each tooth comprising a member and a hood to cover the point of said member, said member and hood being movable apart to permit the withdrawal of a lacing.

35. In a machine for lacing a series of skeins mounted upon a fly, a comb substantially coextensive with the series of skeins and comprising a series of teeth to enter the skeins, each tooth comprising a relatively stationary member and a hood to cover the point of said stationary member, said hood being vibratory longitudinally of the skein.

36. The combination of means for supporting a lacing in extended position, means to draw the lacing into the form of a bight, a relatively stationary part near the end of the bight-forming stroke of said bight-forming means, two lacing devices each having hooks adapted to receive the legs of said bight, and means for laterally moving the legs of said bight into position at opposite sides of said stationary part where they may be taken by said hooks.

37. The combination of means for supporting a lacing in extended position, means to draw the lacing into the form of a bight, two lacing devices adapted to engage the legs of said bight, and means for laterally moving the legs of said bight into position to be taken by said hooks.

38. The combination of a guide for holding a cord under tension, a clamp, a combination clamp and shear, means to reciprocate said combination clamp and shear between said guide and the first clamp, means to open the combination clamp and shear after the latter has inserted the cord in the first clamp and for closing said combination clamp and shear after the latter has been returned into position adjacent the guide to cut off the portion of the cord held by the first clamp and retain the end of the cord adjacent said guide in the combination clamp and shear.

39. The combination of a guide for holding a cord under tension, a clamp, two pivoted arms, a clamp and shear on said arms adapted to clamp the cord adjacent to said guide, means to reciprocate said arms between said guide and the first clamp, means for closing the first clamp after the cord has been inserted therein by said arms, and means for opening the shear and clamp on said arms to release the cord after the latter has been received in the first clamp and for closing said shear and clamp after the latter have been returned into position adjacent said guide to cut off the portion of the cord held by the first clamp and retain the end of the cord adjacent said guide in the second clamp.

40. The combination of a guide for holding a cord under tension, a clamp, a combined clamp and shear adapted to clamp the end of the cord adjacent to said tension means, means to reciprocate said combined clamp and shear between said guide and the first clamp to insert the end of the cord in the first clamp, and means for operating the combined shear and clamp after the latter have been returned into position adjacent said guide to cut off the portion of the cord held by the first clamp and retain the end of the cord adjacent said guide in said combined shear and clamp.

41. A skein-lacing machine having, in combination, means to hold a lacing in extended position, a reciprocatory device adapted to engage the lacing and draw the latter into the form of a bight, two lacing members having means to engage the legs of said bight, and two swinging fingers adapted to move the legs of said bight laterally into position to be engaged by said lacing members.

42. A skein-lacing machine having, in combination, means to hold a lacing in extended position, a reciprocatory device adapted to engage the lacing and draw the latter into the form of a bight, two lacing members having means to engage the legs of said bight, and means to move the legs of said bight laterally into position to be engaged by said lacing members.

43. A skein-lacing machine having, in combination, means to divide a skein into bundles, means to hold a lacing in extended position, a reciprocatory device adapted to engage the lacing and draw the latter into the form of a bight, two lacing members having means to engage the legs of said bight, and means to guide said lacing members to draw the legs of said bight around the bundles.

44. A skein-lacing machine having, in combination, means for dividing a skein into bundles, two flexible lacing members, means for guiding said members to carry the ends of a bight of lacing material around said bundles and draw said ends out at one side of the skein, a knotter, and means to carry the ends of said lacing material laterally into the knotter.

45. A skein-lacing machine having, in combination, means for dividing a skein into bundles, two flexible lacing members, means for guiding said members to carry the ends of a bight of lacing material around said bundles and draw said ends out at one side of the skein, and means for tying said ends together.

46. A skein-lacing machine having, in combination, means for dividing a skein into bundles, and means for simultaneously drawing the ends of a bight of lacing material around said bundles, one end going over and the other end under a given bundle.

47. A skein-lacing machine having, in combination, means for dividing a skein into bundles, two flexible lacing members, means for guiding said members to draw the ends of a bight of lacing material around the bundles and out at one side of the skein, a tying bill, means at one side of the tying bill to clamp the ends of the lacing tightly, means at the other side of the tying bill for yieldably holding the ends of the lacing, a knot tightener and stripper operating to engage the lacing at a point between the clamp and the tying bill, and two fingers adapted to carry the ends of the lacing laterally into said clamp and the tying bill.

48. A skein-lacing machine having, in combination, means for dividing a skein into bundles, means to draw the ends of a bight of lacing material around the bundles and out at one side of the skein, a tying bill, means at one side of the tying bill to clamp the ends of the lacing tightly, means at the other side of the tying bill for yieldably holding the ends of the lacing, a knot tightener and stripper operating to engage the lacing at a point between the clamp and the tying bill, and means to carry the ends of the lacing into said clamp and the tying bill.

49. A skein lacing machine having, in combination, a comb for dividing skeins into bundles, a pair of pivoted arms for engaging the shaft of a fly, means for swinging said arms to move a fly into and out of operative relation to the comb, an arm adapted to engage a corner of the fly and pivoted upon an axis substantially coinciding with the shaft of the fly when the latter is out of operative relation to the comb for turning the fly to present the several sides thereof to the comb, means to lace the skeins while engaged by the comb, means to associate a fly with the first mentioned arms, and means to discharge the laced fly from the arms just mentioned.

50. A skein lacing machine having, in combination, means for dividing skeins into bundles, means engaging the shaft of a fly for moving the fly into and out of engagement with said dividing means, two seating plates supported for movement in the same direction as and close to the fly, means to turn the fly to present the several sides thereof to the dividing means, means to cause the seating plates to move with the fly when the latter is moved into and out of engagement with the dividing means and to clear the fly when the latter is turned, and means to lace the skeins while engaged by said dividing means.

51. A skein lacing machine having, in combination, means for dividing skeins into bundles, means engaging the shaft of a fly for moving the fly into and out of engagement with said dividing means, a seating plate supported for movement in the same direction as and close to the fly, means to cause the seating plate to move with the fly when the latter is moved into and out of engagement with the dividing means, and means to lace the skeins while engaged by said dividing means.

52. A skein lacing machine having, in combination, means for dividing skeins into bundles, means engaging the shaft of a fly for moving the fly into and out of engagement with said dividing means, means to prevent the fly from turning while being moved into and out of engagement with the dividing means, means to turn the fly to present the several sides thereof to the dividing means, and means to lace the skeins while engaged by said dividing means.

53. In a skein lacing machine, in combination, means for dividing skeins into bundles, means engaging the ends of the shaft of a fly for moving the fly into and out of engagement with said dividing means, an arm adapted to engage a corner of a fly and pivoted upon an axis substantially coinciding with the shaft of the fly when the latter is out of engagement with said dividing means, and means for swinging said arm to index the fly.

54. In a skein lacing machine, in combination, an arm having an angular plate to fit over a corner of a fly, said arm being pivoted upon an axis substantially coinciding with the shaft of the fly, and means for swinging said arm to index the fly.

55. In a skein lacing machine, in combination, an arm adapted to engage a corner of a fly and pivoted upon an axis substantially coinciding with the shaft of the fly, and means for swinging said arm to index the fly.

56. A skein lacing machine, having in combination, a comb for dividing skeins into bundles, a pair of pivoted arms for engaging the shaft of a fly, means for swinging said arms to move a fly into and out of operative relation to the comb, means to turn the fly to present the several sides thereof to the comb, means to lace the skeins while engaged by the comb, means to associate a fly with said arms, and means to discharge the fly from said arms.

57. A skein lacing machine having, in combination, means for dividing skeins into bundles, a pair of pivoted arms for engaging the shaft of a fly, means for swinging said arms to move a fly into and out of operative relation to said dividing means, means to turn the fly to present the several sides thereof to the dividing means, and means to lace the skeins while engaged by the dividing means.

58. A skein lacing machine having, in combination, a comb for dividing skeins into bundles, a pair of arms for engaging the shaft of a fly, means for moving said arms to move a fly into and out of operative relation to the comb, means to turn the fly to present the several sides thereof to the comb, and means to lace the skeins while engaged by the comb.

59. A skein lacing machine having, in combination, a comb for dividing skeins into bundles, a pair of pivoted arms for engaging the shaft of a fly, means for swinging said arms to move a fly into and out of operative relation to the comb, and means to lace the skeins while engaged by the comb.

60. A skein lacing machine having, in combination, a series of comb teeth for dividing skeins into bundles, means for moving a fly into and out of engagement with the comb, means to lace the skeins while engaged by the comb, said lacing means operating in the plane of the comb teeth, said comb teeth comprising parts which are relatively separable to clear the lacings as the fly is being moved out of engagement with the comb teeth, means to discharge the fly when laced, and a guard rail movable into and out of position adjacent to the comb teeth to prevent fouling of the lacings on the teeth as the fly is being discharged.

61. A skein lacing machine having, in combination, a series of comb teeth for dividing skeins into bundles, means for moving a fly into and out of engagement with the comb, and means to lace the skeins while engaged by the comb, said lacing means operating in the plane of the comb teeth, said comb teeth comprising parts which are relatively separable to clear the lacings as the fly is being moved out of engagement with the comb teeth.

62. A skein lacing machine having, in combination, a series of comb teeth for dividing skeins into bundles, each tooth comprising two parts which provide a space between them, means for moving a fly into and out of engagement with the comb, and means to lace the skeins while engaged by the comb, said lacing means operating in said spaces, and said tooth parts being movable away from each other to clear the lacings as the fly is being moved out of engagement with the comb teeth.

63. A skein lacing machine having, in combination, a series of comb teeth for dividing skeins into bundles, a structure providing two guide slots for guiding the ends of the shaft of a fly as the fly is moved into and out of engagement with the comb, and means to lace the skeins while engaged by the comb.

64. A machine for lacing a series of skeins mounted upon a fly comprising, in combination, fly handling mechanism, skein lacing mechanism, a drive for the fly handling mechanism, a drive for the skein lacing mechanism, means to reciprocate the skein lacing mechanism along the fly, said fly handling mechanism being arranged to initiate the operation of the reciprocating means, means actuated upon arrival of the skein lacing mechanism in starting position for throwing in the drive for the skein lacing mechanism, and means actuated upon arrival of the skein lacing mechanism in final position for throwing out the drive for the skein lacing mechanism and for throwing in the drive for the fly handling mechanism.

65. A machine for lacing a series of skeins mounted upon a fly comprising, in combination, a carriage, lacing means on the carriage, means to move the carriage step by step along the fly from first to final position, a drive for the lacing means and carriage moving means, a spring for returning the carriage to first position, energy being stored in said spring as the carriage is moved toward its final position, a latch for holding the carriage in final position, means actuated upon arrival of the carriage in first position for throwing in the drive, and means actuated upon arrival of the carriage in final position for throwing out the drive.

66. A machine for lacing a series of skeins mounted upon a fly comprising, in combination, a carriage, lacing means on the carriage, means to move the carriage along the fly from first to final position, a drive for the lacing means and carriage moving means, means for returning the carriage to first position, means to hold the carriage in final position, means actuated upon arrival of the carriage in first position for throwing in the drive, and means actuated upon arrival of the carriage in final poistion for throwing out the drive.

67. A machine for lacing a series of skeins mounted upon a fly comprising, in combination, a carriage, lacing means on the carriage, means to move the carriage from one skein to the next step by step along the fly from first to final position, a spring for returning the carriage to first position, energy being stored in said spring as the carriage is moved toward its final position, and means to hold the carriage in final position.

68. A skein lacing machine having, in combination, a structure providing guide edges for the ends of the shaft of a fly, and guide slots extending at an angle to said guide edges, two pivoted arms adapted to engage the ends of the shaft of a fly, said arms being movable from receiving position adjacent to said guide edges to carry the shaft of a fly into said guide slots and out again, a comb located in the plane of said guide slots in position to divide the skeins of the fly into bundles, and means to lace the divided skeins.

69. A skein lacing machine having, in combination, a structure having guide edges on which the ends of the shaft of a fly may slide, said structure having guide slots extending at an angle to said edges, a pair of pivoted arms having channeled ends arranged to be alined with said guide edges to receive the ends of the shaft of a fly and to swing along said slots to reciprocate said shaft in said guide slots, a comb located in the plane of said guide slots for dividing the skeins on the fly into bundles, means to lace the skeins while engaged by the comb, means for advancing flies on said structure, detents for retaining a fly on said structure, means for withdrawing said detents, means for advancing a fly which has been thus detained into engagement with said arms, and means for doffing a laced fly from said arms.

70. A skein lacing machine having, in combination, a structure having guide edges on which the ends of the shaft of a fly may slide, said structure having guide slots extending at an angle to said edges, means to reciprocate said shaft in said guide slots, a comb located in the plane of said guide slots for dividing the skeins on the fly into bundles, means to lace the skeins while engaged by the comb, means for advancing flies on said structure, detents for detaining a fly on said structure, means for withdrawing said detents, means for advancing a fly which has been thus detained into engagement with said reciprocating means, and means for doffing a laced fly from said reciprocating means.

71. A skein lacing machine having, in combination, a structure having guide edges on which the ends of the shaft of a fly may slide, said structure having guide slots extending at an angle to said edges, a pair of pivoted arms having ends arranged to be alined with said guide edges to receive the ends of the shaft of a fly and to swing along said slots to reciprocate said shaft in said guide slots, a comb located in the plane of said guide slots for dividing the skeins on the fly into bundles, and means to lace the skeins while engaged by the comb.

72. A skein lacing machine having, in combination, a structure having guide edges on which the ends of the shaft of a fly may slide, said structure having guide slots extending at an angle to said edges, members arranged to move along said slots to reciprocate said shaft in said guide slots, a comb located in the plane of said guide slots for dividing the skeins on the fly into bundles, and means to lace the skeins while engaged by the comb.

73. A skein lacing machine having, in combination, a structure providing guide edges for the ends of the shaft of a fly, and guide slots extending at an angle to said guide edges, means to divide the skeins into bundles, and means arranged to engage the ends of the shaft of a fly and movable from receiving position adjacent to said guide edges to carry the shaft of a fly into said guide slots to place said fly in operative relation to the dividing means.

74. A skein lacing machine having, in combination, means to divide a skein into bundles, two conduit blocks recessed to contain said bundles, two flexible inextensible lacing members reciprocable in said blocks, and means to stop the machine upon interference with the movement of one of said lacing members.

75. A skein lacing machine having, in combination, means providing wavy passages, two flexible inextensible lacing members reciprocable in said passages, and means to stop the machine upon interference with the movement of one of said lacing members.

76. A skein lacing machine having, in combination, a knotter, means for passing the ends of a lacing into the knotter, and means to stop the machine upon interference with the operation of said passing-in means.

77. A skein lacing machine having, in combination, lacing means, means to supply lacing to the lacing means, and means to stop the operation of the lacing means upon exhaustion of the lacing supply.

78. A fly handling mechanism having, in combination, guide means for a fly, a detent for detaining a fly on said guide means, and a stop motion actuated on the absence of a fly at said detent.

79. A skein lacing machine having, in combination, a comb for dividing skeins into bundles, means for placing a fly on the comb, and a stop motion actuated upon failure of the fly to be seated properly on the comb.

80. A skein lacing machine having, in combination, a comb for dividing skeins into bundles, means for placing a fly on the comb, lacing means, a drive for the lacing means, and means to prevent the drive from being thrown in upon failure of the fly to be seated properly on the comb.

81. A skein lacing machine having, in combination, a comb for dividing skeins into bundles, means for placing a fly on the comb, a feeler member located in position to be moved through contact with one of said skeins as the skein moves into proper relation to the comb, and a stop motion controlled by said feeler.

82. In a machine for lacing a series of skeins carried by a fly, in combination, a comb for dividing skeins into bundles, means for placing a fly on the comb, two feeler members located in position to be moved through contact with the end skeins as said skeins move into proper relation to the comb, and a stop motion controlled by said feelers.

83. A skein lacing machine having, in combination, fly handling mechanism, skein lacing means, a drive for the fly handling mechanism arranged to be thrown out by said fly handling mechanism, a drive for the skein lacing means arranged to be thrown in by said skein lacing means, and means controlled by the fly handling mechanism for preventing the skein lacing means from throwing in its drive unless the fly handling mechanism has completed its operations.

84. A skein lacing machine having, in combination, a lacing carriage, a rack bar attached to the carriage, a series of members on said bar, a rotatory member in the nature of a crank and having a roller adapted to engage said members to move the carriage step by step, a spring for returning the carriage, means including a pinion meshing with the rack bar for stretching the spring as the carriage is moved step by step, means to slide the rotatory member out of operative relation to said members, and means to lock the carriage against return by said spring.

85. A machine for lacing a series of skeins carried by a fly, having, in combination, a lacing carriage, a bar attached to the carriage, a series of members on said bar, a rotatory member in the nature of a crank and having a roller adapted to engage said members to move the carriage step by step along the series of skeins, and means to slide the rotatory member out of operative relation to said members when the carriage has traversed the series of skeins.

86. A skein lacing machine having, in combination, a lacing carriage, a rack bar attached to the carriage, means arranged to engage said bar to move the carriage step by step, a spring for returning the carriage, and means including a pinion meshing with the rack bar for stretching the spring as the carriage is moved step by step.

87. A machine for lacing a series of skeins carried on a fly, having, in combination, a lacing carriage, a bar attached to the carriage, a series of members on said bar, a rotatory member in the nature of a crank and having a roller adapted to engage said members to move the carriage step by step, a spring for returning the carriage, means actuated by said bar for stretching the spring as the carriage is moved step by step, means to disable the rotatory member when the carriage has traversed the fly, and means to lock the carriage against return by said spring.

88. In a machine for lacing a series of skeins carried by a fly, the combination of means for lacing a skein, a knotter to tie the ends of the lace, means for moving the lacing means and the knotter step by step along the fly, the lacing means being arranged to lace a skein while the knotter is tying the last preceding lace, means for supplying a lacing to the lacing means, and means for interrupting the operation of said supplying means after the lacing means has laced the last skein.

89. In a machine for lacing a series of skeins carried by a fly, the combination of means for lacing a skein, said means including conduit blocks which are vertically reciprocable into and out of operative relation to successive skeins; a non-reciprocable knotter to tie the ends of the lace; means for moving the lacing means and the knotter step by step along the fly, the lacing means being arranged to lace a skein while the knotter is tying the last preceding lace, and means for transferring the ends of a lace from the lacing means to the knotter.

90. In a machine for lacing a series of skeins carried by a fly, the combination of means for lacing a skein, a knotter to tie the ends of the lace, and means for moving the lacing means and the knotter step by step along the fly, the lacing means being arranged to lace a skein while the knotter is tying the last preceding lace.

91. A machine for applying a separate lacing to each of several skeins carried by a fly, said machine comprising a comb on which one side of the fly may be seated with the teeth of the comb dividing each skein into a plurality of bundles, a single lacing means insertable into and withdrawable from one end of the fly and movable longitudinally of the fly from one end thereof to the other and comprising members lying at opposite sides of the skeins at said side of the fly, means for reciprocating said lacing means with a continuous motion in one direction and a step-by-step motion in the opposite direction, and means for actuating the lacing means to lace successive skeins during the step-by-step travel of the lacing means.

92. In a skein-lacing machine, the combination of a series of comb teeth for piercing a skein, each of said teeth comprising two members the bases of which are spaced apart for the reception of a lacing, said members having points adapted to lie close together to pass through the skein, said members being relatively movable to separate said points to permit the withdrawal of the laced skein.

93. A skein-lacing machine having, in combination, means to deliver a lace in the form of a bight at one edge of a skein, a knotter at the other edge of the skein, and means to insert the ends of the bight through the skein and deliver them to the knotter.

94. In a skein lacing machine, a comb for dividing a skein into bundles, a conduit block adapted to lie at one side of the skein, a conduit block adapted to lie at the opposite side of the skein, means for moving one block toward the other, and means carried by the comb for actuation in the movement of said block for moving the other block toward the companion block.

95. The process of lacing a skein which consists in dividing the skein into bundles, and drawing both ends of a bight of lacing material simultaneously through the skein from one edge of the skein to the other, one end passing over and the other end below each bundle.

96. In a machine for lacing a plurality of bundles of strands, the combination of two members each having means to engage a lacing, means for guiding said members through wavy paths of opposite phase around the bundles, means for presenting to said engaging means the legs of a bight of lacing, and means to hold the mid-portion of the lacing while said members are drawing the legs of said bight of lacing around the bundle.

97. In a machine for lacing a plurality of bundles of strands, the combination of two chains each having means on one end to engage a lacing, and two conduit blocks arranged to lie at opposite sides of the plurality of bundles and having recesses in their adjacent faces to contain the bundles, said blocks having therein two wavy channels of opposite phase to guide said chains around the bundles.

98. In a machine for lacing a plurality of bundles of strands, the combination of two conduit blocks recessed on their adjacent faces to accommodate the bundles, and means traveling through said conduit blocks for drawing the lacing around said bundles.

99. A machine for lacing a plurality of bundles of strands having, in combination, two flexible lacing members, means for guiding said members to carry the ends of a bight of lacing material around said bundles and draw said ends out at one side of the skein, and means for tying said ends together.

100. A machine for lacing a plurality of bundles of strands having, in combination, two flexible lacing members for simultaneously drawing the ends of a bight of lacing material around said bundles, and means for guiding said members to draw one end over and the other under each bundle.

101. In a mechanism for lacing a series of bundles of strands, the combination of two flexible inextensible lacing members each having means at one end to engage a lacing, and means to guide said members to carry the lacing around the bundles.

102. In a mechanism for lacing a series of bundles of strands, the combination of members adapted to embrace the series of bundles, said members having therein two wavy channels of opposite phase, said channels extending one over and the other below a given bundle, and two flexible lacing members arranged to be reciprocated in said channels.

103. In a mechanism for lacing a series of spaced bundles of strands, means for forming two parallel wavy channels of opposite phase, said channels extending through the spaces between the bundles, said means including a conduit block arranged to be positioned at one side of the series of bundles, and means adapted to be positioned at the other side of the series to complete said channels.

104. In a mechanism for lacing a series of bundles of strands, separable members adapted to embrace the bundles and form within themselves two wavy channels of opposite phase, and means for drawing a lacing through said channels.

105. In a mechanism for lacing a series of skeins, each of which is divided into a plurality of bundles of strands, conduit members adapted to embrace a skein and form within themselves two wavy channels of opposite phase, means for drawing a lacing through said channels, means for moving said conduit members into and out of embracing relation to a skein, and means for causing relative traveling movement between the conduit members, lacing-drawing means and conduit-member-moving means on the one hand and the skeins on the other to establish operative relationship of said parts to successive skeins.

106. In a machine for lacing a series of skeins mounted on a fly, the combination of means to lace a skein, means to unite the ends of a lacing, and means to cause relative step-by-step movement between the lacing means and the uniter on the one hand and the series of skeins on the other to establish operative relationship of the lacing means and the uniter to successive skeins, the lacing means and the uniter being spaced and operated in timed relation to each other so that while the uniter is uniting the ends of the lacing of one skein the lacing means is lacing the next skein.

107. The process of lacing a skein that is divided into a series of bundles which consists in drawing both ends of a bight of lacing material simultaneously through the skein from one edge of the skein to the other, one end passing over and the other end below each bundle.

108. The process of lacing a skein that is divided into a series of bundles which consists in placing the midpoint of a piece of lacing material at one edge of the skein, detaining the midpoint of the lacing while drawing the portion of the lacing at each side of the midpoint in the form of a bight to the opposite edge of the skein, one bight passing over and the other bight below each bundle, and releasing the midpoint of the lacing after said bights have been pulled through the skein.

109. A comb substantially co-extensive with a series of skeins mounted upon a fly, and comprising members to enter the spaces between skeins, and series of teeth between said spacing members to enter the skeins, each tooth comprising a relatively stationary member and a hood to cover the point of said stationary member, said hood being vibratory longitudinally of the skein, there being an alined series of recesses extending through the series of spacing members and comb teeth from end to end of the comb.

110. A comb substantially co-extensive with a series of skeins mounted upon a fly and comprising teeth to enter the skeins, each tooth comprising a relatively stationary member and a hood to cover the point of said stationary member, said hood being vibratory longitudinally of the skein, there being an alined series of spaces between said tooth members and hoods.

111. A comb substantially co-extensive with a series of skeins mounted upon a fly and comprising members to enter the spaces between skeins, and series of teeth between said spacing members to enter the skeins, each tooth comprising two parts, one of which covers the point of the other, there being a space between said tooth parts, and a series of recesses extending through the series of spacing members from end to end of the comb in alinement with the spaces in the teeth.

112. The combination of a comb, the teeth of which are of two-part construction, the point of one part covering the point of the other part, means for causing relative approaching and receding movement between the comb and a skein, and means for vibrating one of said parts of each tooth during a portion of such relative movement.

113. The combination of a comb, the teeth of which are of two-part construction, the point of one part normally covering the point of the other part, means for causing relative approaching and receding movement between the comb and a skein, and means for vibrating one of said parts of each tooth during the approaching movement and for separating the points of said parts during the receding movement.

114. A skein-lacing machine comprising stationary skein-dividing means, a single skein-lacing means arranged to lace one skein after another, and mechanism for automatically presenting successive sides of a fly to said means, said mechanism including means for laterally moving a fly into and out of engagement with said dividing and lacing means, and means for indexing the fly.

115. A skein-lacing machine comprising stationary skein-dividing means, a single skein-lacing means reciprocable along a series of skeins mounted on a fly, and mechanism for automatically presenting successive sides of a fly to said means and for discharging the fly when the final side has been laced.

116. The combination of means for lacing skeins mounted on a fly, means for moving the lacing means from skein to skein and back to initial position, and means for indexing the fly to present successive sides to the lacing means.

In testimony whereof, I have hereunto affixed my signature.

HOWARD D. COLMAN.